United States Patent [19]

Hirai

[11] Patent Number: 5,444,640
[45] Date of Patent: Aug. 22, 1995

[54] NUMERICAL CONTROL METHOD FOR CONTROLLING VARIOUS KINDS OF MACHINE TOOLS BY CORRECTING FOR THERMAL DISPLACEMENT

[75] Inventor: Hayao Hirai, Nagoya, Japan

[73] Assignee: Mitsubishi Denki Kabushiki Kaisha, Tokyo, Japan

[21] Appl. No.: 4,057

[22] Filed: Jan. 13, 1993

[51] Int. Cl.⁶ .............................................. G05B 19/18
[52] U.S. Cl. ........................... 364/474.35; 364/474.34; 364/474.15; 364/474.16
[58] Field of Search ......... 364/474.35, 474.32–474.34, 364/474.15–474.16

[56] References Cited

U.S. PATENT DOCUMENTS

| 3,634,664 | 1/1972 | Valek | 364/474.15 |
| 4,382,215 | 5/1983 | Barlow et al. | 364/474.18 |

FOREIGN PATENT DOCUMENTS

| 56-97103 | 8/1981 | Japan . |
| 56-110105 | 9/1981 | Japan . |
| 57-48448 | 3/1982 | Japan . |
| 57-61906 | 4/1982 | Japan . |
| 57-76608 | 5/1982 | Japan . |
| 57-114342 | 7/1982 | Japan . |
| 57-127206 | 8/1982 | Japan . |
| 57-189750 | 11/1982 | Japan . |
| 58-109251 | 6/1983 | Japan . |
| 58-160043 | 9/1983 | Japan . |
| 59-81705 | 5/1984 | Japan . |
| 60-14110 | 1/1985 | Japan . |
| 60-114445 | 6/1985 | Japan . |
| 57-114343 | 7/1985 | Japan . |
| 60-230203 | 11/1985 | Japan . |
| 61-6705 | 1/1986 | Japan . |
| 61-14835 | 1/1986 | Japan . |
| 61-19540 | 1/1986 | Japan . |
| 61-44558 | 3/1986 | Japan . |
| 61-65312 | 4/1986 | Japan . |
| 61-65313 | 4/1986 | Japan . |
| 61-117050 | 6/1986 | Japan . |
| 61-131854 | 6/1986 | Japan . |
| 61-257719 | 11/1986 | Japan . |
| 62-39160 | 2/1987 | Japan . |
| 62-79947 | 4/1987 | Japan . |
| 62-84854 | 4/1987 | Japan . |
| 62-44803 | 6/1987 | Japan . |
| 63-34049 | 2/1988 | Japan . |
| 63-89253 | 4/1988 | Japan . |
| 63-99155 | 4/1988 | Japan . |
| 63-133699 | 6/1988 | Japan . |
| 63-133700 | 6/1988 | Japan . |
| 63-176703 | 7/1988 | Japan . |
| 63-177206 | 7/1988 | Japan . |
| 63-214807 | 9/1988 | Japan . |
| 63-237104 | 10/1988 | Japan . |
| 63-256336 | 10/1988 | Japan . |

Primary Examiner—James P. Trammell
Attorney, Agent, or Firm—Sughrue, Mion, Zinn, Macpeak & Seas; Richard C. Turner; Peter A. McKenna

[57] ABSTRACT

A numerical control method for controlling various kinds of machine tools by correcting for thermal displacement. Data relative to thermal displacement, thermal displacement sampling time, and processing cycle time is stored in memory. Before each process, the shift of an absolute position of a machine origin is measured to provide an initial value. The machine tool is energized and thermal displacement data is gathered according to a sampling time. The sampling time is varied according to the degree of thermal displacement. Processing is performed on the data to correct for the thermal displacement of the machine tool.

29 Claims, 31 Drawing Sheets (MACHINE-ORIGIN CORRECTING METHOD-1: FLOW CHART)

CHANGE OF WORKPIECE REFERENCE POSITION IN X, Y AND Z

NUMERICAL CONTROL METHOD FOR CONTROLLING VARIOUS KINDS OF MACHINE TOOLS BY CORRECTING FOR THERMAL DISPLACEMENT

FIELD OF THE INVENTION

The present invention relates to a numerical control method of controlling various kinds of machine tools, laser processing machines, electric discharge machining apparatus, robots, measuring instruments the like, that is, numerical control machines or the like and, more particularly, to the correction of thermal displacement.

BACKGROUND OF THE INVENTION

It is a well-known that the thermal displacement of a machine tool or a numerical control machine tool is influenced generally by the temperature environment in which the machine tool is installed, for example, the room temperature, the temperature distribution, or the radiant heat applied to the machine tool. The thermal displacement also depends on the heat generated by the machine tool per se such as, for example, heat due to running of a spindle system, a drive system or sliding parts. Other sources of heat may be heat from a hydraulic-pressure generating apparatus serving as a power source for the machine tool, heat of a hydraulic fluid transmitted to the machine tool through piping and hydraulic control instruments, heat generated due to machining or processing, heat of chips or machining oil, heat generated from a driving motor or a control apparatus, or the like.

As a countermeasure to prevent such thermal displacement, a direct compensation system has been proposed in which thermal displacement of a system is estimated. The system is then operated with an integrated power given to a drive system. Position correction is applied to correct for thermal displacement at each δt, as disclosed in Japanese Patent Laid-Open No. SHO 63-256336 entitled "A method of correcting thermal displacement of a ball screw in an NC machine". The periods δt are identical in this conventional embodiment.

Further, other indirect techniques are known. For example, there is a method in which a cooling oil maintained at low temperature is recirculated about a bearing structure for a spindle in order to suppress generated heat of the spindle, a method in which a cooling oil maintained at low temperature flows through a hollow ball screw to maintain the ball screw at predetermined or constant temperature in order to suppress generated heat of a drive system, a method in which a cooling oil maintained at low temperature flows through the inside of a sliding part to maintain the sliding part at predetermined or constant temperature in order to eliminate generated heat of the sliding part, a method in which a cooling oil maintained at low temperature flows through the inside of each structural part of a machine tool in order to cope with temperature distribution within a room, to reduce influence of a difference in the temperature distribution, a method in which temperature of a machining oil is maintained constant, and the like, these methods have already been put into practice in part.

In these methods, however, it is also a well-known fact that equipment and/or installation costs is raised with an increase in the correction accuracy. Further, where the above-described methods are used, it is also a fact that the correction accuracy under changing machining conditions fall short of expectations.

Prior to the present invention, thermal displacement in an existing system has been measured by simulated operation with a machining center serving as a model, according to the following methods and with the following results:

I. Operation No. 1

A. Measuring Method:
(1) The machine used was a vertical machining center having: a semi-closed feed-back control system.
(2) Simulated-running moving axes were X, Y and Z axes, as seen in FIGS. 21(a) and 21(b).
(3) Displacement measuring axes were the X-axis/Y-axis (each of which subject due to an absolute-value measurement by a laser-measuring system) as seen in FIG. 21(a).
(4) A workpiece 102 reference-position measurement was made for X-axis/Y-axis (both using the same first touch probe 101) and for spindle 104 along a Z-axis (using a second touch probe 103) as seen in FIGS. 21(a) and 21(b).
(5) The measurement procedure was executed in accordance with the following steps: First, the vertical machining center, the measuring instruments and the like were left alone in a room whose temperature was 20°±0.5° C. for seventy-two (72) hours or more. Secondly, a power source was turned on. Thirdly, returning to the origin was practiced. Fourthly, a workpiece reference position was measured: X, Y and Z. Fifthly, the laser measuring system was set to 0 (zero). Sixthly, the machine was moved to a 0 (zero) point. Seventhly, measurement was executed due to the laser measuring system having an accuracy at which the machine is in the 0 position. Eighthly, a workpiece reference position was measured. Ninthly, measurement was done due to the laser measuring system at a position of a 6-12 drilled bore. Tenthly, simulated running was done, one or five times. Eleventhly, the workpiece reference position was measured. Twelfthly, a position of a 6-12 drilled bore was measured by the laser measuring system. Thirteenthly, the above-described steps 2~12 were executed repeatedly. Fourteenthly, an electric power source was turned off.
(6) The simulated running conditions were such that a program was prepared with a workpiece illustrated in FIG. 22 being assumed, and idle-runs were conducted with the workpiece not being mounted. Processing was estimated such that an upper surface was rough-processed with five (5) divisions and was finish-milled, was 6-12 drilled, was 7-8.2 drilled, and was 7-10 thread machining (tapped).

B. Results:
(1) A change or variation of the machine 0-point position accuracy with time was experienced, as illustrated in FIG. 23 (X-Y measurement using a laser measuring system). Specifically, the X-coordinates move gently toward a minus direction through 4 μm substantially without fluctuation and, subsequently, are restored gently until 2.6 μm. Also, the Y-coordinates move gently toward a plus direction through 10.03 μm substantially without fluctuation.

(2) A change in X, Y and Z workpiece reference positions with time was experienced, as illustrated in FIG. 24. Specifically, the X-coordinates generally and steadily change by +12 μm over about eight (8) hours without fluctuation. However, the Y-coordinates experience an initial decrease with a gradual change of +11 μm over about eight (8) hours while the Y-coordinates are fluctuated a little through 3~5 μm. Thirdly, Z-coordinates retain a change of −8 μm over about eight (8) hours while the Z-coordinates are fluctuated a little through 1.1~2 μm.

(3) A change of a first bore, a fourth bore and a sixth bore of the 6-12 drilled bores is as illustrated in FIG. 25 (measurement is made by the laser measuring system). That is, first, a position of the first bore changes through 2.38 μm in an X-minus direction and, subsequently, is restored to plus 0.47 μm and changes through 6.83 μm in a Y-plus direction. Secondly, a position of the fourth bore changes through 8.22 μm in the X-minus direction and changes through 3.96 μm in the Y-plus direction. Thirdly, a position of the sixth bore changes through 2.22 μm in the X-minus direction and, subsequently, changes to plus 0.63 μm; it also changes through 3.96 μm in the Y-minus direction.

II. Operation No. 2

Another conventional measuring method will next be described below.

A. Measuring Method:

(1) The machine used was a vertical machining center having a semi-closed feed-back control system.

(2) The simulated-running moving axis was the X-axis.

(3) The displacement measuring axis was the X-axis (an absolute-value measurement due to a laser-measuring system).

(4) A workpiece 102 reference-position measurement was made for the X-axis/Y-axis (both using the same touch probe 101) and for the Z-axis (using a second 103 touch probe). Reference can be made to FIGS. 21(a) and 21(b) regarding installation or arrangement conditions.

(5) The measurement procedure was executed in accordance with the following steps: First, the vertical machining center, the measuring instruments and the like were left alone in a room whose temperature was 20°±0.5° C. for seventy-two (72) hours or more. Secondly, a power source was turned on. Thirdly, returning to the origin was practiced. Fourthly, a workpiece reference position was measured; X, Y and Z. Fifthly, the laser measuring system was set to 0 (zero). Sixthly, X-axis 10 mm-pitch position accuracy was measured (using laser measuring system). Seventhly, machine 0-point position accuracy was measured using the laser measuring system. Eighthly, simulated running was conducted a) one time of 250* 300 block processing program, b) continuously in accordance with a program of 250*300 block processing, c) continuously in accordance with a program of movement of rapid traverse and cutting feed through five (5) cycles, and d) continuously of a program of movement of rapid traverse and cutting feed through ten (10) cycles. Ninthly, measurement of machine 0-point position accuracy and measurement of X-axis 10 mm-pitch position accuracy due to the laser measuring system were executed. Tenthly, the workpiece reference position was measured for axes X, Y and Z. Eleventhly, the electric power source was turned off. Twelfthly, the above-described steps 2~11 were executed repeatedly.

(6) The simulated running conditions were such that a workpiece illustrated in FIG. 22 was assumed, and the aforesaid simulated running a) and b) were such that only movement of the X-axis was programmed, other axis movement was not practiced. Also, a program was prepared by dwell timing in place of the axis movement and movement energy of only the X-axis was the same as that of actual running. In short an attempt was made so as not to be influenced from axes other than the X-axis. The simulated running of the aforesaid c) and e) was such that 100 mm of rapid traverse and 50 mm (F200 mm/min) of cutting feed were repeated three times, and idle running was made without mounting of a workpiece with the above repeating serving as a program. Processing was estimated such that an upper surface was rough-processed with five (5) divisions and was finish-milled, was 6-12 drilled, was 7-8.2 drilled, and was 7-10 screw-drilled (tapped).

B. Results:

(1) A change or variation of the workpiece reference positions, that is, the X, Y and Z positions due to simulated running according to conditions a) and b) above, and the X-axis machine 0-point position accuracy is as illustrated in FIGS. 26 and 27. According to FIGS. 26 and 27, first, fluctuation of the workpiece reference position at running of only the X-axis is not limited to the X-axis, but fluctuates together with Y and Z. Secondly, if running is done continuously at a constant cycle, the workpiece reference position is stabilized or becomes stable. If, however, the machine is halted, the workpiece reference position is fluctuated sensitively. Thirdly, the change of the X-axis machine 0-point accuracy changes together with running, but gradually becomes stable with running time. It will be understood that a maximum value is about 7 μm.

(2) A change of a position for each moving point due to the results of the simulated running in according to conditions c) and d) is as illustrated FIGS. 28~31. According to FIGS. 28~31, it will be seen that, first, the position of each part of the X-axis is sensitively fluctuated with movement running of the X-axis; secondly, a change in position of the X-axis is restored at the considerable rate or ratio to the initial or early condition by halt of the simulated running, and the restoring differs due to intervals of the halt period or duration; thirdly, positional accuracy of X+200. mm is fluctuated unsteadily even at the continuous running of a constant cycle; and fourthly, the positional accuracy of X−250. mm becomes substantially stable at continuous running of a constant cycle.

As appearing from the data of the above-described experimental results which do not include cutting processing, in order to compensate or correct the machine position and the moving position which vary with time, i.e. hourly, use of only the simple methods proposed until now cannot provide the necessary correction of the positional fluctuation the entire machine. Further, it is impossible for the simple method to execute automatic correction under the control of an operator.

The conventional correction of thermal displacement is directed to a method in which generated heat is removed, as described previously, so that an objective temperature is approached as closely as possible. Alternatively, the conventional correction uses a method in which generated heat due to integrated power which causes thermal displacement is compensated by multiple position corrections. Since the conventional correction techniques do not compensate for compounded thermal displacement, the conventional correction has several problems. First, the accuracy of correction of the thermal displacement is low. Moreover, the former case necessitates a cooling device and structures, making the apparatus cost high.

In view of the aforesaid experimental results, it has been desired to apply the numerical control apparatus to a system which can cope with the above problems, in order to accurately or exactly grasp the accuracy of the machine position and the moving position which vary over time, to execute feed-back correction, and thereby to provide machining at high accuracy.

SUMMARY OF THE INVENTION

It is therefore an object of the present invention to provide a numerical control method which is capable of correcting compounded thermal displacement with high accuracy and, further, is capable of realizing such correction at low cost.

According to a first embodiment, there is provided a numerical control method comprising the steps of:
- possessing a plurality of thermal-displacement data, a thermal-displacement sampling time and a processing cycle time in memory means;
- causing a measurement reference position to serve as a machine origin;
- possessing data of the machine origin within the memory means;
- dividing an interior of the memory means such that input of a correction parameter can be executed with respect to the memory means in order to execute zero-point correction of measuring means;
- measuring shift of an absolute position of a machine origin as a measurement reference position before every processing, so that the shift of the absolute position serves as an initial value;
- turning of an electric power source;
- simultaneously executing collection of data of an amount of generated heat of thermal displacement of a ball screw and counting of a thermal-displacement sampling time;
- counting up the thermal-displacement sampling time;
- simultaneously executing adaptation processing which fluctuates the sampling time of the thermal displacement of the ball screw, depending upon whether or not the thermal displacement of the ball screw is within a range of an permissible error within processing cycle time, and comparison operation processing of the amount of thermal displacement;
- executing correction of the thermal displacement of the ball screw such that the error of the thermal displacement and a minimum movement setting unit are compared with each other to execute good or bad judgment of the processing;
- preparing interruption of correction of the thermal displacement of the ball screw, including promise items of breaks in a processing program of processing locations or processing groups during processing;
- always executing the interruption of correction of the thermal displacement of the ball screw at time other than the breaks or during running other than automatic running; and
- rewriting the plurality of thermal-displacement data to this-time data after correction of the thermal displacement, to execute thermal-displacement correction including processing of correction of the thermal displacement of the ball screw.

The method of thermal-displacement correction according to the first embodiment reduces positional displacement of the machine origin, and reduces thermal displacement of the ball screw.

Advantages of the first embodiment are as follows. That is, it is possible to bring the shift or deviation in position of the reference position to a value within 5 $\mu$m by the thermal displacement correction of the machine origin, if the permissible value is designated in the aforesaid experimental results. Further, it is possible to bring the shift or deviation in position of the reference position to a value within 5 $\mu$m by the thermal displacement correction of the machine origin, if the permissible value is designated in the aforesaid experimental results, and it is possible to process the thermal displacement of the ball screw with correction sensitivity within the minimum moving unit.

According to a second embodiment, there is provided a numerical control method including the steps of:
- initializing automatic correction after measurement of the machine origin;
- counting the measurement sampling time of the machine position and the moving position;
- counting up the measurement sampling time of the machine position and the moving position;
- executing adaptation processing which fluctuates the measurement sampling time of the machine position and the moving position depending upon a fact that operation processing of the displacement of the machine origin and the thermal displacement are within the permissible error within the processing cycle time;
- executing the adaptation processing of the measurement sampling time of the machine position and the moving position so as to be repeated until an electric power source is turned off, regardless of a main processing;
- executing the correction of the machine origin such that the error and an permissible error value per time are compared with each other to decide whether or not the machine origin is required to be measured and corrected;
- executing prediction of the displacement of the machine origin on the basis of the following equation:

$$\text{MotTcf} \propto \{|(\text{previous time}) - (\text{this time})|/(Tp)^p\} \cdot k\{Tc - (\text{processing running time until now})\}^p$$

- comparing a prediction value of the displacement of the machine origin until the entire processing is completed and the permissible error with each other;
- executing warning during the automatic operation, automatic judgment on interruption of machine halt, and the machine halt on the basis of the results in which the prediction value of the displacement of the machine origin and the permissible error are compared with each other;

after the machine halt is executed automatically, judging processing continuation by an operator;

preparing the interruption of the machine halt, including promise items of breaks in the processing program of the processing locations and the processing groups during processing;

always executing the interruption of the machine halt at time other than the breaks or during running other than automatic running; and executing the thermal-displacement correction including processing in which prediction, warning, measurement and correction are executed with respect to the displacement of the machine origin.

The method of thermal-displacement correction according to the second embodiment monitors the positional displacement of the machine origin and acts to bring the thermal displacement to a value within an permissible error.

Advantages of the second embodiment are as follows. That is, it is possible to bring the shift or deviation in position of the reference position to a value within 5 μm by the thermal displacement correction of the machine origin, if the permissible value is designated in the aforesaid experimental results, or, in addition to this advantage, it is possible to process the thermal displacement of the ball screw with correction sensitivity within the minimum moving unit. In addition, it is monitored whether or not it is possible to bring the displacement of the machine origin to a value within the permissible error till completion of the processing, and it is possible to prevent that the workpiece is brought to defective one, by warning, measuring and correction.

According to a third embodiment, there is provided a numerical control method including the steps of:
executing the measurement and correction of the machine origin every time interval sampling;

executing automatic judgment on the measurement interruption, the machine halt, and the displacement measurement and correction of the machine origin on the basis of results in which the prediction of the displacement of the machine origin is executed;

measuring shift of the absolute position of the machine origin every measurement sampling time of the machine position and the moving position;

reading this shift; and executing the thermal-displacement correction including correction processing of the machine origin from a subsequent machine operation.

The method of thermal-displacement correction according to the third embodiment reduces positional displacement of the machine origin.

Advantages of the third embodiment are as follows. That is, it is possible to bring the shift or deviation in position of the reference position to a value within the minimum movement setting unit by the thermal displacement correction of the machine origin, in the aforesaid experimental results, and it is possible to process the thermal displacement of the ball screw with correction sensitivity within the minimum moving unit. In addition, it is monitored whether or not it is possible to bring the displacement of the machine origin to a value within the permissible error till completion of the processing, and it is possible to prevent that the workpiece is brought to defective one, by warning, measuring and correction.

According to a fourth embodiment, there is provided a numerical control method comprising the steps of:
causing a measurement reference position to serve as a workpiece reference position;

possessing at least data of a machine origin and a workpiece reference position in memory means;

dividing an interior of the memory means so that input of a correction parameter can be executed with respect to the memory means in order to execute zero-point correction of measuring means;

always measuring the workpiece reference position when an electric power source is turned on;

bringing correction values entirely to zero with a value of the measurement serving as an initial value, to measure shift of an absolute position of the workpiece reference position every processing;

reading the shift; and executing correction of thermal displacement including correction processing of the workpiece reference position, from a subsequent machine operation.

The method of thermal-displacement correction according to the fourth embodiment reduces positional displacement of the workpiece reference position.

Advantages of the fourth embodiment are as follows. That is, centering is made by the specific position of the workpiece, and this is called "workpiece reference position", to execute processing. It is possible to bring the shift or deviation in position to a value within 5 μm by the thermal displacement correction of the reference position, if the permissible value is designated in the aforesaid experimental results.

According to a fifth embodiment, there is provided a numerical control method including the steps of:
possessing a plurality of thermal-displacement data, a thermal-displacement sampling time and a processing cycle time in the memory means;

simultaneously executing, together with turning-on of an electric power source, collection of an amount of generated heat of thermal displacement of a ball screw and counting of sampling time of thermal displacement;

counting up the sampling time of the thermal displacement;

simultaneously executing adaptation processing in which the thermal-displacement sampling time of the ball screw is fluctuated, depending upon a fact that the thermal displacement of the ball screw is within a range of an permissible error within processing cycle time, and comparison operation processing of the amount of thermal displacement;

executing correction of the thermal displacement of the ball screw such that the thermal displacement error and a minimum movement setting unit are compared with each other to perform good or bad judgment of the processing;

preparing correction interruption of the thermal displacement of the ball screw, including promise items of breaks in a processing program of processing locations and processing groups during processing;

always executing the interruption of correction of the thermal displacement of the ball screw at time other than the breaks or during running other than automatic running; and rewriting the plurality of thermal-displacement data to this-time data after correction of the thermal displacement, to execute thermal-displacement correction including correction processing of the thermal displacement of the ball screw.

The method of thermal-displacement correction according to the fifth embodiment reduces thermal displacement of the ball screw.

Advantages of the fifth embodiment are as follows. That is, centering is made by the specific position of the workpiece, and this is called "workpiece reference position", to execute processing. It is possible to bring the shift or deviation in position to a value within 5 μm by the thermal displacement correction of the reference position, if the permissible value is designated in the aforesaid experimental results. Further, it is possible to process the thermal displacement of the ball screw with correction sensitivity within the minimum moving unit.

According to a sixth embodiment, there is provided a numerical control method including the steps of:

possessing measurement sampling time of an permissible value of a position error, a machine position and a moving position in memory means;

initializing automatic correction after measurement of a workpiece reference position;

counting measurement sampling time of the machine position and the moving position;

counting up the measurement sampling time of the machine position and the moving position;

executing adaptation processing which fluctuates the measurement sampling time of the machine position and the moving position, depending upon a fact that operation processing of the displacement of the workpiece reference position and the thermal displacement are within the permissible error within the processing cycle time;

executing the adaptation processing of the measurement sampling time of the machine position and the moving position so as to be repeated until an electric power source is turned off, regardless of a main processing;

executing the correction of the workpiece reference position such that the error and an permissible error value per time are compared with each other to decide whether or not the machine origin is required to be measured and corrected;

executing prediction of the displacement of the workpiece reference position on the basis of the following equation:

$$MwtTcf \propto \{|(\text{previous time}) - (\text{this time})|/(Tp)^{p56} \cdot k\{Tc - (\text{processing running time until now})\}^p$$

where parameter "p" as used in this and other equations throughout this disclosure is a power factor having a value in the range of 0.5 to 10.0 and preferably 0.8 to 5.0, and is a measure of heat generation over heat emission comparing a prediction value of the displacement of the workpiece reference position until the entire processing is completed and the permissible error with each other;

executing warning during the automatic operation, automatic judgment on interruption of machine halt, and the machine halt on the basis of the results in which the prediction value of the displacement of the workpiece reference position and the permissible error are compared with each other;

after the machine halt is executed automatically, judging processing continuation by an operator;

preparing the interruption of the machine halt, including promise items of breaks in the processing program of the processing locations and the processing groups during processing;

always executing the interruption of the machine halt at time other than the breaks or during running other than automatic running; and executing the thermal-displacement correction including processing in which prediction, warning, measurement and correction are executed with respect to the displacement of the workpiece reference position.

The method of thermal-displacement correction according to the sixth embodiment monitors positional displacement of the workpiece reference position and acts to bring the thermal displacement to a value within an permissible error.

Advantages of the sixth embodiment are as follows. That is, it is possible to bring the shift or deviation in position to a value within 5 μm by the thermal displacement correction of the workpiece reference position, if the permissible value is designated in the aforesaid experimental results, or, in addition to this advantage, it is possible to process the thermal displacement of the ball screw with correction sensitivity within the minimum moving unit. In addition, it is monitored whether or not it is possible to bring the displacement of the workpiece reference position to a value within the permissible error till completion of the processing, and it is possible to prevent that the workpiece is brought to defective one, by warning, measuring and correction.

According to a seventh embodiment, there is provided a numerical control method including the steps of:

executing the measurement and correction of the workpiece reference position every time interval sampling;

executing automatic judgment on the measurement interruption, the machine halt, and the displacement measurement and correction of the workpiece reference position on the basis of results in which the prediction of the displacement of the workpiece reference position is executed;

measuring shift of the absolute position of the workpiece reference position every measurement sampling time of the machine position and the moving position;

reading this shift; and executing the thermal-displacement correction including correction and processing of the workpiece reference position from a subsequent machine operation.

The method of thermal-displacement correction according to the seventh embodiment reduces positional displacement of the workpiece reference position.

Advantages of the seventh embodiment are as follows. That is, it is possible to bring the shift or deviation in position to a value within the minimum movement setting unit, by the thermal displacement correction of the workpiece reference position, or, in addition thereto, it is possible to process the thermal displacement of the ball screw with correction sensitivity within the minimum moving unit. In addition, it is monitored whether or not it is possible to bring the displacement of the workpiece reference position to a value within the permissible error till completion of the processing, and it is possible to prevent that the workpiece is brought to defective one, by warning, measuring and correction.

According to an eighth embodiment, there is provided a numerical control method comprising the steps of:
- causing a measurement reference position to serve as a workpiece-mounting reference-block position;
- possessing at least data of a machine origin and a workpiece-mounting reference-block position in memory means;
- dividing an interior of the memory means so that input of a correction parameter can be executed with respect to the memory means in order to execute zero-point correction of measuring means;
- executing measurement of the workpiece-mounting reference-block position when an electric power source is turned on;
- bringing correction values entirely to zero with a value of the measurement serving as an initial value;
- measuring shift of an absolute position of the workpiece-mounting reference-block position before every processing:
- reading the shift; and
- executing correction of thermal displacement including processing of the correction of the workpiece-mounting reference-block position from a subsequent machine operation.

The method of thermal-displacement correction according to the eighth embodiment reduces displacement of the workpiece-mounting reference-block position.

Advantages of the eighth embodiment are as follows. That is, it is possible to bring the shift or deviation in position of the reference position to a value within 5 μm by the thermal displacement correction of the workpiece-mounting reference-block position, if the permissible value is designated in the aforesaid experimental results.

According to a ninth embodiment, there is provided a numerical control method including the steps of:
- possessing a plurality of thermal-displacement data, a thermal-displacement sampling time and a processing cycle time in memory means;
- simultaneously executing, together with turning-on of an electric power source, collection of an amount of generated heat of thermal displacement of a ball screw and counting of sampling time of thermal displacement;
- rewriting the thermal displacement data to this-time data after correction of the thermal displacement;
- counting up the sampling time of the thermal displacement;
- simultaneously executing adaptation processing in which the thermal-displacement sampling time of the ball screw is fluctuated, depending upon a fact that the thermal displacement of the ball screw is within a range of an permissible error within processing cycle time, and comparison operation processing of a thermal displacement error;
- executing correction of the thermal displacement of the ball screw such that the thermal displacement error and a minimum movement setting unit are compared with each other to perform good or bad judgment of the processing;
- preparing interruption of correction of the thermal displacement of the ball screw, including promise items of breaks in a processing program of processing locations and processing groups during processing;
- always executing the interruption of correction of the thermal displacement of the ball screw at time other than the breaks or during running other than automatic running; and
- rewriting the plurality of thermal-displacement data to this-time data after correction of the thermal displacement, to execute thermal-displacement correction including processing of correction of the thermal displacement of the ball screw.

The method of thermal-displacement correction according to the ninth embodiment reduces thermal displacement of the ball screw.

Advantages of the ninth embodiment are as follows. That is, it is possible to bring the shift or deviation in position of the reference position to a value within 5 μm by the thermal displacement correction of the workpiece-mounting reference-block position, if the permissible value is designated in the aforesaid experimental results. In addition thereto, it is possible to process the thermal displacement of the ball screw with correction sensitivity within the minimum moving unit.

According to a tenth embodiment, there is provided a numerical control method including the steps of:
- possessing measurement sampling time of an permissible value of a position error, a machine position and a moving position in memory means;
- after measurement of the workpiece-mounting reference-block position, initializing automatic correction;
- counting measurement sampling time of the machine position and the moving position;
- counting up the measurement sampling time of the machine position and the moving position;
- executing adaptation processing which fluctuates the measurement sampling time of the machine position and the moving position, depending upon a fact that operation processing of the displacement of the workpiece-mounting reference-block position and the thermal displacement are within the permissible error within the processing cycle time;
- executing the adaptation processing of the measurement sampling time of the machine position and the moving position so as to be repeated until an electric power source is turned off, regardless of a main processing;
- executing no correction of the workpiece-mounting reference-block position in the case where the error is smaller than an permissible error value per time;
- executing correction of the workpiece-mounting reference-block position such that the error and the permissible error value per time are compared with each other to decide whether or not the workpiece-mounting reference-block position is required to be measured and corrected;
- executing prediction of the displacement of the workpiece-mounting reference-block position on the basis of the following equation:

$$MwbtTcf \propto \{|(\text{previous time}) - (\text{this time})|/(Tp)^{p56} \cdot k\{Tc - (\text{processing running time until now})\}^p$$

- comparing a prediction value of the displacement of the workpiece-mounting reference-block position until the entire processing is completed and the permissible error with each other;

executing warning during the automatic operation, automatic judgment on interruption of machine halt, and the machine halt on the basis of the results in which the prediction value of the displacement of the workpiece-mounting reference-block position is compared;

after the machine halt is executed automatically, judging processing continuation by an operator;

preparing the interruption of the machine halt, including promise items of breaks in the processing program of the processing locations and the processing groups during processing;

always executing the interruption of the machine halt at time other than the breaks or during running other than the automatic running; and executing the thermal-displacement correction including processing in which prediction, warning, measurement and correction are executed with respect to the displacement of the workpiece-mounting reference-block position.

The method of thermal-displacement correction according to the tenth embodiment monitors displacement of the workpiece-mounting reference-block position and acts to bring the positional displacement to a value within an permissible error.

Advantages of the tenth embodiment are as follows. That is, it is possible to bring the shift or deviation in position to a value within 5 μm by the thermal displacement correction of the workpiece-mounting reference-block position, if the permissible value is designated in the aforesaid experimental results, or, in addition thereto, it is possible to process the thermal displacement of the ball screw with correction sensitivity within the minimum moving unit. In addition, it is monitored whether or not it is possible to bring the displacement of the workpiece-mounting reference-block position to a value within the permissible error till completion of the processing, and it is possible to prevent that the workpiece is brought to defective one, by warning, measuring and correction.

According to an eleventh embodiment, there is provided a numerical control method including the steps of:

executing the measurement and correction of the workpiece-mounting reference-block position every time interval sampling;

executing automatic judgment on the measurement interruption, the machine halt, and the displacement measurement and correction of the workpiece-mounting reference-block position, on the basis of results in which the prediction of the displacement of the workpiece-mounting reference-block position is executed;

measuring shift of the absolute position of the workpiece-mounting reference-block position every measurement sampling time of the machine position and the moving position;

reading the shift; and executing the thermal-displacement correction including correction and processing of the workpiece-mounting reference-block position, from a subsequent machine operation.

The method of thermal-displacement correction according to the eleventh embodiment reduces displacement in position of the workpiece-mounting reference-block position.

Advantages of the eleventh embodiment are as follows. That is, it is possible to bring the shift or deviation in position to a value within the minimum movement setting unit by the thermal displacement correction of the workpiece-mounting reference-block position, in the aforesaid experimental results, or, in addition thereto, it is possible to process the thermal displacement of the ball screw with correction sensitivity within the minimum moving unit. In addition, it is monitored whether or not it is possible to bring the displacement of the workpiece-mounting reference-block position to a value within the permissible error till completion of the processing, and it is possible to prevent that the workpiece is brought to defective one, by warning, measuring and correction.

According to a twelfth embodiment, there is provided a numerical control method comprising the steps of:

possessing a machine origin, a specific moving position, an permissible value of position errors, each of a plurality of thermal-displacement data, a plurality of sampling time data, and processing cycle time, in memory means;

simultaneously executing, together with turning-on of an electric power source, collection of an amount of generated heat of thermal displacement of a ball screw and counting of sampling time of thermal displacement;

necessarily measuring the machine position (the machine origin, the workpiece reference position, and the workpiece-mounting reference-block position), when the electric power source is turned on;

bringing correction values entirely to zero with a value of the measurement serving as an initial value;

counting up the sampling time of the thermal displacement;

executing adaptation processing in which the thermal-displacement sampling time of the ball screw is fluctuated, depending upon a fact that the thermal displacement is within a range of an permissible error within processing cycle time;

after measurement of the machine position (for example, the machine origin, the workpiece reference position and the workpiece-mounting reference-block position, which is used as a reference position), initializing the automatic correction;

executing counting of the measurement sampling time of the machine position and the moving position;

counting up the measurement sampling time of the machine position and the moving position;

executing adaptation processing of measurement sampling time of the machine position and the moving position;

counting up the measurement sampling time of the machine position and the moving position;

executing operation processing of the displacement of the moving position;

executing the correction of the displacement of the moving position such that the error and the permissible error value per time are compared with each other;

deciding whether or not measurement and correction of the moving position are required;

executing predication of displacement of the moving position on the basis of the following equation:

$$\mathrm{MmtTcf} \propto \{|(\text{previous time}) - (\text{this time})|/(\mathrm{Tp})^{p}56 \cdot k\{\mathrm{Tc} - (\text{processing running time until now})\}^{p}$$

executing judgment regarding the inside or the outside of the permissible value, such that the predication value of the displacement of the moving position and the permissible value are compared with each other;

executing no correction in the case where the permissible value is not exceeded;

executing warning during the automatic operation, automatic judgment on interruption of the measurement, and measurement and correction of the displacement of the moving position, on the basis of the results in which the prediction of the displacement of the moving position is executed;

using, as the moving-position measurement, any one of or using in combination a reference-block three-fixed-point method, a constant deciding method due to actually measured data and a machine-outside measuring method;

after correction of the thermal displacement, rewriting the plurality of thermal displacement data to this-time data;

measuring shift of the absolute position of the moving position at each measurement sampling time of the machine position and the moving position;

alternatively, computing a correction value of the moving position by the constant deciding method;

reading the operated correction value; and executing correction of the thermal displacement, including correction processing of the moving position from a subsequent machine operation.

The method of thermal-displacement correction according to the twelfth embodiment reduces positional displacement of the moving position.

Advantages of the twelfth embodiment are as follows. That is, it is possible to bring a shift or deviation in position of the moving position to a value within the minimum movement setting unit.

According to a thirteenth embodiment, there is provided a numerical control method including the steps of:

counting up the sampling time of the thermal displacement;

simultaneously executing adaptation processing which fluctuates the sampling time of the thermal displacement of the ball screw, depending upon a fact that the thermal displacement of the ball screw is within a range of the permissible error within the processing cycle time, and the comparative operation processing of the amount of thermal displacement;

processing the collection of the data of the amount of generated heat of the thermal displacement of the ball screw, start of the counting of the thermal-displacement of sampling time and adaptation processing of the sampling time of the thermal displacement of the ball screw so as to be repeated until the electric power source is turned off, regardless the main processing;

executing the correction of the thermal displacement of the ball screw such that the thermal-displacement error and the minimum movement setting unit are compared with each other to decide good or bad judgment of the processing;

preparing the interruption of the correction of the thermal displacement of the ball screw, including promise items of breaks in the processing program of the processing locations and the processing groups during processing; and always executing correction of the thermal displacement at time other than the breaks or during running other than automatic running to execute correction of the thermal displacement including correction processing of the thermal displacement of the ball screw.

The method of thermal-displacement correction according to the thirteenth embodiment reduces the thermal displacement of the ball screw.

Advantages of the thirteenth embodiment are as follows. That is, it is possible to bring a shift or deviation in position of the moving position to a value within the minimum movement setting unit. In addition thereto, it is possible to process the thermal displacement of the ball screw with correction sensitivity within the minimum moving unit.

According to a fourteenth embodiment, there is provided a numerical control method including the steps of:

possessing a machine origin, a workpiece reference position, a workpiece-mounting reference block position, and a plurality of thermal displacement data, in memory means;

dividing an interior of the memory means so that input of a correction parameter can be executed with respect to the memory means in order to execute zero-point correction of measuring means;

necessarily measuring the machine position (the machine origin, the workpiece reference position, and the workpiece-mounting reference-block position) when the electric power source is turned on;

bringing correction values entirely to zero with a value of the measurement serving as an initial value;

counting up the measurement sampling time of the machine position and the moving position;

executing the displacement correction processing of the machine position (the machine origin, the workpiece reference position, and the workpiece-mounting reference-block position) and the correction processing of the displacement of the moving position, in parallel relation to each other;

promising the measurement processing with the machine position (the machine origin, the workpiece reference position, and the workpiece-mounting reference-block position) having a priority;

executing the correction of the machine origin such that, in the case where the error is smaller than the error permissible value per time, no correction is made;

executing prediction of the displacement of the machine origin on the basis of the following equation:

$$\text{MotTcf} \propto \{|(\text{previous time}) - (\text{this time})|/(T_p)^p\} \cdot k\{T_c - (\text{processing running time until now})\}^p$$

executing prediction of the displacement of the workpiece reference position on the basis of the following equation:

$$\text{MwtTcf} \propto \{|(\text{previous time}) - (\text{this time})|/(T_p)^p\} \cdot k\{T_c - (\text{processing running time until now})\}^p$$

executing prediction of the workpiece-mounting reference-block position on the basis of the following equation:

$$MwbtTcf \propto \{|(\text{previous time}) - (\text{this time})|/(Tp)^p\} \cdot k\{Tc - (\text{processing running time until now})\}^p$$

executing warning during the automatic operation, automatic judgment on interruption of machine halt, the machine halt, and measurement and correction of the displacement of the machine origin, on the basis of the results in which the prediction of the displacement of the machine position (the machine origin, the workpiece reference position, and the workpiece-mounting reference-block position) is executed;

judging processing continuation by an operator, after the machine halt is automatically executed on the basis of the results in which the prediction of the displacement of the machine position (the machine origin, the workpiece reference position, and the workpiece-mounting reference-block position);

after correction of the thermal displacement, rewriting the plurality of thermal displacement data to this-time data;

using means corresponding to each of the machine positions to measure shift of the absolute position of the machine position (the machine origin, the workpiece reference position and the workpiece-mounting reference-block position) before every processing;

reading the shift; and executing correction of the thermal displacement, including correction processing of the machine position (the machine origin, the workpiece reference position, and the workpiece-mounting reference-block position), from a subsequent machine operation.

The method of thermal-displacement correction according to the fourteenth embodiment reduces positional displacement of the machine position.

Advantages of the fourteenth embodiment are as follows. That is, it is possible to bring a shift or deviation in position of the moving position to a value within the minimum movement setting unit, or, in addition thereto, it is possible to process the thermal displacement of the ball screw with correction sensitivity within the minimum moving unit. In addition, it is possible to bring a shift or deviation in position of the reference position to a value within 5 $\mu$m by the thermal displacement correction of the machine position (the machine origin, the workpiece reference position, and the workpiece-mounting reference-block position), if the permissible value is designated in the aforesaid experimental results.

According to a fifteenth embodiment, there is provided a numerical control method comprising the steps of:

possessing a machine origin, a specific moving position, an permissible value of position errors, a plurality of thermal displacement data, a plurality of sampling time data, and a processing cycle time, in memory means;

turning on an electric power source;

simultaneously executing collection of data of generated heat of the thermal displacement of a ball screw and counting of sampling time of thermal displacement;

counting up the sampling time of the thermal displacement;

executing adaptation processing which fluctuates the sampling time of the thermal displacement of the ball screw, depending upon a fact that the thermal displacement is within a range of the permissible error within the processing cycle time;

necessarily measuring the machine position when the electric power source is turned on;

bringing correction values entirely to zero with a value of the measurement value serving as an initial value;

initializing automatic correction after measurement of the machine position (the machine origin, the workpiece reference position, and the workpiece-mounting reference-block position);

executing counting of the measurement sampling time of the machine position and the moving position;

counting up the measurement sampling time of the machine position and the moving position;

executing adaptation processing of the measurement sampling time of the machine position and the moving position;

counting up the measurement sampling time of the machine position and the moving position;

executing operation processing of the displacement of the moving position;

executing the correction of the moving position such that the error and the permissible error value per time are compared with each other, to decide whether or not the measurement and correction of the moving position are required;

executing prediction of the displacement of the moving position on the basis of the following equation:

$$MmtTcf \propto \{|(\text{previous time}) - (\text{this time})|/(Tp)^p\} \cdot k\{Tc - (\text{processing running time until now})\}^p$$

executing judgment on the inside and outside of the permissible value such that the prediction value of the displacement of the moving position and the permissible value are compared with each other;

executing no correction in the case where the prediction value does not exceed the permissible value;

executing warning during the automatic operation, automatic judgment on measuring interruption, and measurement and correction of the displacement of the moving position, on the basis of the results in which the prediction of the displacement of the moving position is executed;

using, as the moving-position measurement, any one of or using in combination a reference-block three-fixed-point method, a constant deciding method due to actually measured data and a machine-outside measuring method;

judging processing continuation by an operator, after the machine halt is automatically executed on the basis of the prediction of the displacement of the moving position;

after correction of the thermal displacement, rewriting the plurality of thermal displacement data to this-time data;

computing the moving position or computing a correction value of the moving position by the constant deciding method, every processing, to correct the measured or operated moving position; and executing correction of the thermal displacement including prediction, warning, measurement, correction and the like of the displacement of the moving position The method of thermal-displacement correction according to the fifteenth embodiment reduces positional displacement of the moving position.

Advantages of the fifteenth embodiment are as follows. That is, it is possible to bring the shift or deviation in position of the moving position to a value within 5 μm, if the permissible value is designated in the aforesaid experimental results. It is monitored whether or not it is possible to bring the displacement of the moving position to a value within the permissible error till completion of the processing, and it is possible to prevent that the workpiece is brought to defective one, by warning, measuring and correction.

According to a sixteenth embodiment, there is provided a numerical control method including the steps of:

counting up the sampling time of the thermal displacement;

simultaneously executing adaptation processing which fluctuates the sampling time of the thermal displacement of the ball screw, depending upon a fact that the thermal displacement of the ball screw is within the range of the permissible error within the processing cycle time, and the comparative operation processing of the amount of generated heat;

processing the collection of the data of the amount of generated heat of the thermal displacement of the ball screw, the counting of the thermal-displacement sampling time, and the adaptation processing of the sampling time of the thermal displacement of the ball screw so as to be repeated until the electric power source is turned off, regardless the main processing;

executing the correction of the thermal displacement of the ball screw such that the thermal-displacement error and the minimum movement setting unit are compared with each other to decide good or bad judgment of the processing;

preparing the interruption of the correction of the thermal displacement of the ball screw, including promise items of breaks in the processing program of the processing locations and the processing groups during processing;

always executing the interruption of the correction of the thermal displacement at time other than the breaks or during running other than the automatic running; and executing correction of the thermal displacement, including processing of correction of the thermal displacement of the ball screw.

The method of thermal-displacement correction according to the sixteenth embodiment reduces the thermal displacement of the ball screw.

Advantages of the sixteenth embodiment are as follows. That is, it is possible to bring the shift or deviation in position of the moving position to a value within 5 μm, if the permissible value is designated in the aforesaid experimental results. It is monitored whether or not it is possible to bring the displacement of the moving position to a value within the permissible error till completion of the processing, and it is possible to prevent that the workpiece is brought to defective one, by warning, measuring and correction. In addition, it is possible to process the thermal displacement of the ball screw with correction sensitivity within the minimum moving unit.

According to a seventeenth embodiment, there is provided a numerical control method including the steps of:

possessing a machine origin, a workpiece reference position, a workpiece-mounting reference-block position, a plurality of thermal displacement data, and the like, in memory means;

dividing an interior of the memory means so that input of a correction parameter can be executed with respect to the memory means in order to execute zero-point correction of measuring means;

necessarily measuring the machine position when the electric power source is turned on;

bringing correction values entirely to zero with a value of the measurement serving as an initial value;

counting up the measurement sampling time of the machine position and the moving position;

executing the correction processing of the displacement of the moving position (the machine origin, the workpiece reference position, and the workpiece-mounting reference-block position) and the correction processing of the displacement of the moving position, in parallel relation to each other;

promising the measurement processing with the measurement of the machine position (the machine origin, the workpiece reference position, the workpiece-mounting reference-block position) having a priority;

executing the correction of the displacement of the machine position such that the error and the error permissible value per time are compared with each other to decide whether or not measurement and correction are required;

executing prediction of the displacement of the machine origin on the basis of the following equation:

$$MotTcf \propto \{|(\text{previous time}) - (\text{this time})|/(Tp)^p\} \cdot k\{Tc - (\text{processing running time until now})\}^p$$

executing prediction of the displacement of the workpiece reference position on the basis of the following equation:

$$MwtTcf \propto \{|(\text{previous time}) - (\text{this time})|/(Tp)^p\} \cdot k\{Tc - (\text{processing running time until now})\}^p$$

executing prediction of the workpiece-mounting reference-block position on the basis of the following equation:

$$MwbTcf \propto \{|(\text{previous time}) - (\text{this time})|/(Tp)^p\} \cdot k\{Tc - (\text{processing running time until now})\}^p$$

executing warning during the automatic running, automatic judgment on interruption of machine halt, the machine halt, and measurement and correction of the displacement of the machine origin, on the basis of the results in which the prediction of the displacement of the machine position (the machine origin, the workpiece reference position, and the workpiece-mounting reference-block position);

judging processing continuation by an operator, after the machine halt is automatically executed on the basis of the results in which the prediction of the displacement of the machine position (the machine origin, the workpiece reference position, and the workpiece-mounting reference-block position);

after correction of the thermal displacement, rewriting the plurality of thermal displacement data to this-time data;

measuring shift of the absolute position of the machine position (the machine origin, the workpiece reference position and the workpiece-mounting reference-block position) before every processing; reading the shift; and executing correction of the thermal displacement, including correction processing of the machine position from a subsequent machine operation.

The method of thermal-displacement correction according to the seventeenth embodiment reduces positional displacement of the machine position.

Advantages of the seventeenth embodiment are as follows. That is, it is possible to bring the shift or deviation in position of the moving position to a value within 5 μm, if the permissible value is designated in the aforesaid experimental results. It is monitored whether or not it is possible to bring the displacement of the moving position to a value within the permissible error till completion of the processing, and it is possible to prevent that the workpiece is brought to defective one, by warning, measuring and correction. Alternatively, in addition thereto, it is possible to process the thermal displacement of the ball screw with correction sensitivity within the minimum moving unit. Additionally, it is possible to bring a shift or deviation in position of the reference position to a value within 5 μm by the thermal displacement correction of the machine position (the machine origin, the workpiece reference position, and the workpiece-mounting reference-block position), if the permissible value is designated in the aforesaid experimental results.

According to an eighteenth embodiment, there is provided a numerical control method including the steps of:

judging reprocessing after measurement and correction depending upon presence of a finish margin;

bringing the reprocessing to alarm processing with n times of loops waited; and executing correction of the thermal displacement including processing in which position displacement is predicted, warned, measured, corrected and the like. The method of thermal-displacement correction according to the eighteenth embodiment enables reprocessing after measurement correction.

Advantages of the eighteenth embodiment are as follows. That is, it can be prevented that the workpiece, which cannot be finish-processed, is again finished. Further, it is possible to prevent such wasteful processing that, because the finish margin is too insufficient, the workpiece is not brought to a designated dimension even if the workpiece is processed again and again. Thus, even if there are no expensive equipments or installations, the thermal displacement correction is executed at high accuracy, so that the workpiece can be processed at high accuracy.

Other objects and features of this invention will become understood from the following description with reference to the accompanying drawings.

DESCRIPTION OF THE EMBODIMENTS

Figure 1:
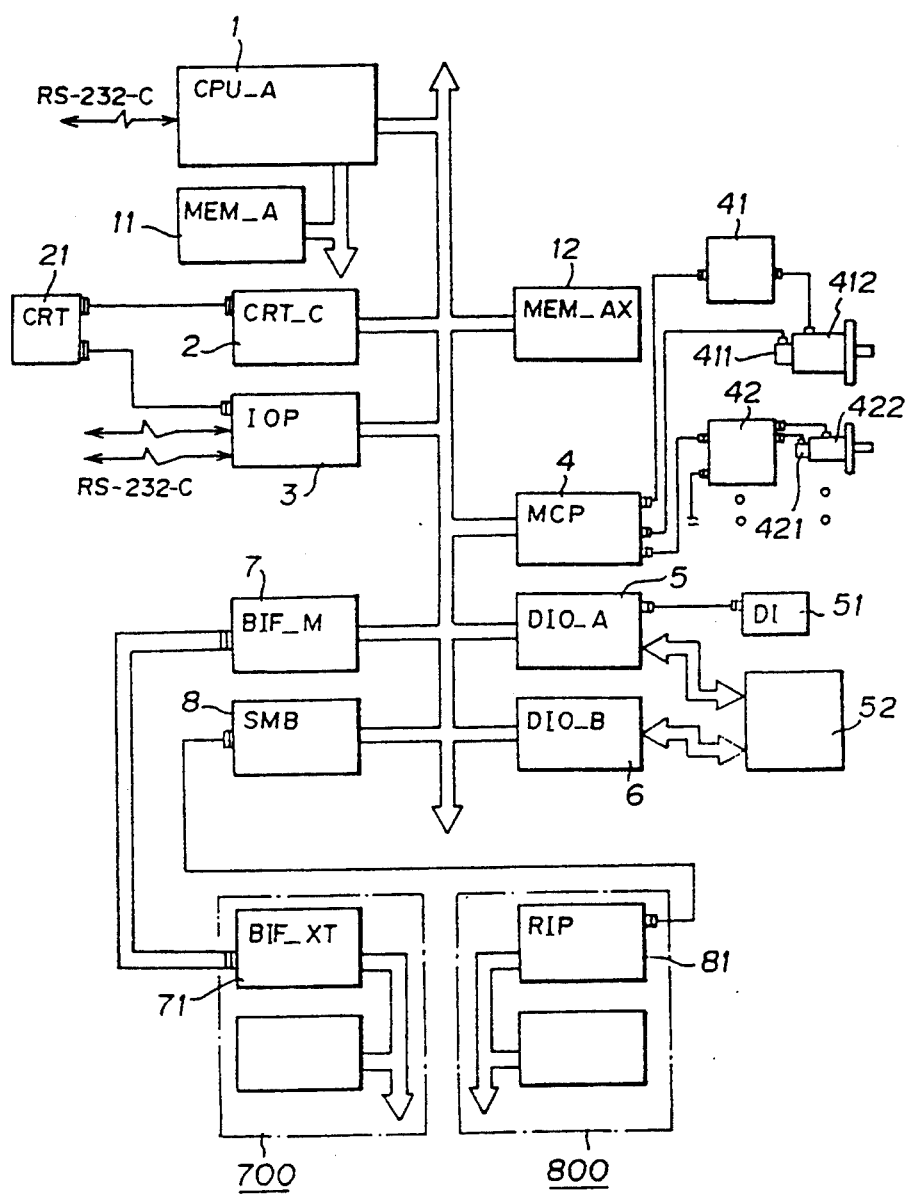
FIG. 1 is a block diagram showing an arrangement or constitution of a numerical control apparatus according to an embodiment of the invention.

Referring first to FIG. 1, there is shown a numerical control apparatus which realizes a numerical control method according to the invention. The numerical control apparatus uses the same hardware that is used in the a conventional numerical control apparatus. The numerical control apparatus is arranged as follows. That is, in FIG. 1, the reference numeral 1 denotes a main control section (CPU); 11, a main memory (ROM: read-only memory); 12, a data memory; 2, a color CRT controller; 21, a color CRT; 3, an input/output processor; 4, a servo interface processor; 41, a spindle amplifier; 411, a spindle encoder; 412, a spindle motor; 42, a group of servo amplifiers; 421, a group of servo encoders; 422, a group of servo motors; 5 and 6, main current input-/output interfaces; 52, a machine main current panel; 51, a measuring sensor; 7, an expanded bus interface; 71, a bus interface; 8, a remote I/O (input/output) interface; 81, a remote I/O (input/output) processor; 700, an expanded bus unit; and 800, a remote I/O (input/output) unit.

In accordance with the present invention, the control program differs from one in the conventional numerical control apparatus. A program of an example subsequently to be described is added to the conventional control program. A processing program for controlling movement of a machine tool or the like is stored in the main memory 11. Stored in the data memory 12 for respective required data areas in division are a machine origin, a workpiece reference position, a workpiece-mounting reference-block position, a specific moving position, an permissible value of an position error, a variety of thermal displacement data (for example, generated heat-amount data of thermal displacement of a previous sampling, generated heat-amount data of a this-time sampling, a previous-time amount of thermal displacement, a this-time amount of thermal displacement, an accumulated amount of thermal displacement, and the like), data of a variety of sampling times (for example, thermal displacement sampling time: Tt, measurement sampling time of the machine position and the moving position: Tp, and the like), cycle time and the like. The numerical control apparatus is constructed or arranged as described above.

Using the facts obtained on the basis of the aforesaid experimental results, correction of an absolute position of thermal displacement with the spindle serving as a reference is processed as follows: Principally, (1) Lapse time from start of running is taken as a parameter, and a change or variation of the machine position (for example, a machine origin, a workpiece reference position, a workpiece-mounting reference-block position, and the like) and the moving position (for example, a position of a specific fitting bore, a position of a specific fitting stem, and the like) due to heat is processed by time interval sampling.

The time interval sampling by the change of the machine position and the moving position due to heat is executed as follows. That is, the influence exerted by thermal displacement of a ball screw section, which is run under a constant or a predetermined condition from turning-on of a power source of the machine, directly upon machining accuracy is directly related to the time lapse from start of running. As, however, heat conduction begins to be spread to each part, each part of the machine has such a characteristic as to reach a temperature stable region with different time lag. Also relevant is the temperature of the heat source and the maximum value due to a product of certain coefficients for each machine, which depend upon the machine construction, heat dissipation, presence of isolating countermeasures, and the like. Accordingly, the position accuracy is dependent upon the in thermal displacement of the ball screw section and each machine section. Furthermore, a characteristic of the position accuracy and temperature, for the case where the machine is left alone after a halt of running, has a pattern substantially inverted from the pattern after start of the running.

For the reasons discussed above, only reading-out, comparison and judgment of a variety of thermal displacement data cause large errors. In order to prevent such errors, processing is made as follows:

① Adaptation processing of the thermal-displacement sampling time of the ball screw: an amount of thermal displacement of the ball screw is read every time of the sampling time "Tt", and a previous amount and a this-time amount are compared with each other. If the previous amount and the this-time amount are different from each other, a difference between them is taken, and is divided by "(Tt)p". This is brought to "C".

In this connection, reference should be made to the below equation (1):

$$|(\text{this time}) - (\text{previous time})|/(Tt)p = C \quad (1)$$

A set permissible value "D" of the position errors is divided by a machine constant "k1", and is compared with "C". In this connection, reference should be made to the below equation (2):

$$C > D/k1 \quad (2)$$

As a result, if "C" is large, it is operated from the below equation (3) whether or not "D" is within one cycle time "Tc" (a method of inputting a parameter of one cycle time relies upon manual input or automatic counter memory storage):

$$C*(Tc)p \geq D \quad (3)$$

If "D" is not within D, the sampling time every time "Tt" is modified to "Tt'" which is operated from the below equation (4):

$$(Tt')p = (D/k1)C \quad (4)$$

That is, the thermal-displacement sampling time "Tt" is lengthened or shortened with the permissible value "D" serving as a judgment reference.

② Optimum processing of the measuring sampling time of the machine position and the moving position: As a change or variation of the variety of thermal-displacement data of the ball screw is lost and the ball screw reaches the temperature stable range, it is not considered that the measuring sampling time "Tp" of the machine position and the moving position is required. As described above, however, the accuracy of the machine position and the moving position continues to vary, depending upon the time-lag characteristic of each part of the machine. In order to process this precisely or accurately, the previous machine position or moving position, the this-time machine position or moving position, and the position permissible error value are used to vary the measuring sampling time "Tp" of the machine position and the moving position. In this connection, the below equation (8) is used:

$$|(\text{position at this time}) - (\text{position at previous time})|/(Tt)p = G \quad (5)$$

$$G \geq D/k1 \quad (6)$$

$$G*(Tc)p \geq D \quad (7)$$

$$(Tt')p = (D/k2)G \quad (8)$$

Here, k2 is a machine constant. Also, here, Tp is so used as to be replaced with Tp' in the case where the adaptation processing of the sampling time is executed.

(2) A shift or deviation of the absolute position with the spindle serving as a reference is measured by a measuring unit. The shift or deviation is read into a coordinate position-error memory section within a memory unit of the numerical control apparatus. The machine position is corrected from the subsequent machine operation.

(3) In the case where the electric power source is turned off, the variety of collected data of the entire thermal-displacement correction is brought to initial values. In the case where the electric power source is not turned off, such a condition is retained or held so that correction every thermal-displacement sampling time and correction every measuring sampling time of the machine position and the moving position are always operated.

(4) The thermal-displacement correction time intervals in the lapse time are so decided as to be distributed every one workpiece or every certain time interval while the differences in value between the previous time and the this time are compared with each other with the maximum thermal-displacement correction value serving as a parameter. A reference for the distribution is set by a parameter so as to be capable of being designated by a user.

(5) The measuring reference position is one of the following three points: ① the machine origin (the reference block is required), ② the workpiece reference position (it is required that processing capable of ensuring accuracy is done at a location which is brought to a reference), and ③ the workpiece-mounting reference-block position (the reference block is required).

(6) As the moving-position measurement and "Mmt: moving-position correction, there are the following three methods including a reference-block three-fixed-point method, a constant deciding method due to the actually measured data, and a machine-outside measuring method. Any of the three method may be selected. The three methods execute the following respective processing.

Figure 2:
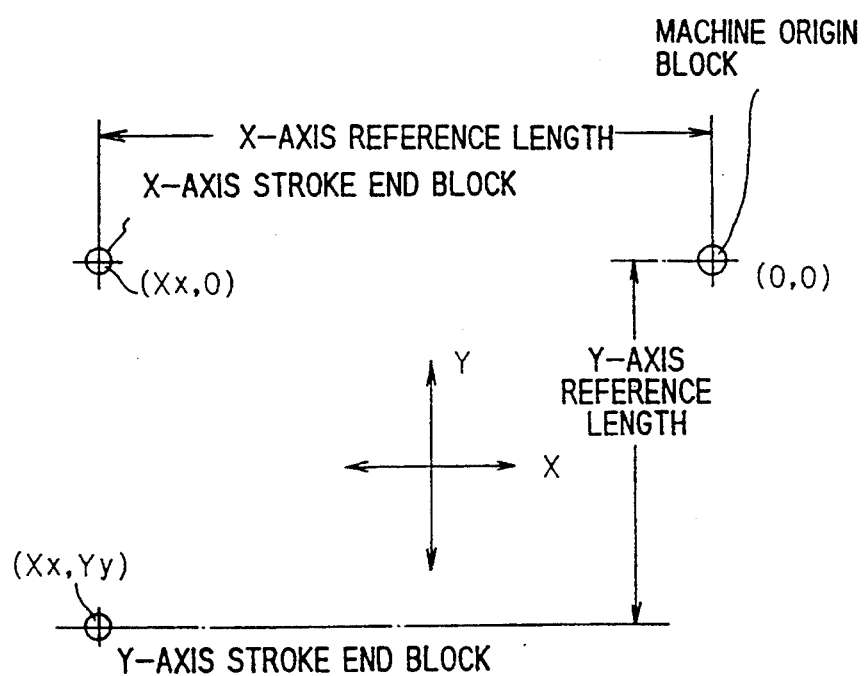
FIG. 2 is a view for explanation, showing an arrangement of each block in a reference-block three-point method according to an embodiment of the invention.

Reference-block three-fixed-point method:

This method is arranged such that, as an example illustrated in FIG. 2, the reference blocks are placed on three points including the machine origin, the neighborhood of the X-stroke end, and the neighborhood of the Y-stroke end, positions of the three points are measured every lapse time, and the specific moving-position correcting value is operated on the basis of data of an amount of generated heat of the thermal displacement of the ball screw, to execute correction. A detailed processing method is as follows. That is, the moving-position measurement due to the reference-block three-fixed-point method cannot be executed till completion of processing locations and processing groups during processing. Accordingly, the moving-position measurement is prepared, also including promise items of breaks into the processing program. Thus, the moving-position measurement is executed. For example, ① signals of tool replacement, ② discontinuity of sequence numbers, ③ every one of the fixed cycles, ④ connection between program links, ⑤ previous time before the finish-start block of the lap cycle, and the like can be used as the breaks. Measurement of the moving-position and the automatic correction are due to the following. That is, first, measurement of the reference-block three-fixed-point position, and the error operation and the specific moving-position error operation are executed. Secondly, in the case of the moving-position error<the minimum movement setting unit, no correction is done. Thirdly, in the case of the moving-position error≧the minimum movement setting unit, the moving-position correction is done (further, the moving-position displacement predictive operation till completion of entire processing is executed by the moving-position displacement prediction, and judgment is done by judgment of the inside and outside of the permissible value as to whether or not the permissible value is exceeded). In the case where correction is done, the specific moving-position data are automatically rewritten into data after correction. Finally, in the case where correction is done, the variety of thermal-displacement data is rewritten to data at this time.

The constant deciding method due to the actually measured data:

This method is arranged such that movement is done at specific pitch intervals as the aforesaid experiment, a constant for computing the variable value of the ball screw is decided on the basis of the moving-position measuring results and an amount of thermal displacement of the ball screw every lapse time, and a correcting value of the moving position is operated on the basis of the amount of thermal displacement of the ball screw, to execute correction. A detailed correcting method is as follows. That is, moving-position correction operation on the basis of the constant deciding method due to the actually measured data has such superiority as to be executed even during processing if there is a surplus capacity in the control section. Automatic correction and operation of the moving position are as follows. That is, first, error operation of the specific moving position is executed on the basis of the constant deciding method due to the actually measured data. Secondly, in the case of the moving-position error<the minimum movement setting unit, no correction is done and, in the case of the moving-position error≧the minimum movement setting unit, the moving-position correction is done (further, the moving-position displacement predictive operation till completion of entire processing is executed by the moving-position displacement-prediction, and it is judged by judgment of the inside and outside of the permissible value whether or not the permissible value is exceeded). In the case where correction is done, the specific moving-position data are automatically rewritten into data after correction. Thirdly, in the case where correction is done, the variety of thermal-displacement data is rewritten to data at this time.

The machine-outside measuring method:

The processed workpiece is measured on the outside of the machine, and the results of the measurement are used, as the correcting value, for the specific moving-position correction (this is limited to the case where an error in terms of the cycle time "Tc" is within the permissible value by judgment of the amount of thermal displacement). The detailed correction method is as follows. That is, the moving-position measurement by means of the machine-outside measuring method is executed after processing of a workpiece has entirely been completed and is so changed as to be mounted on a measuring unit from the machine tool. Accordingly, a workpiece, which is small in error range and long in cycle time "Tc", is inadequate. Automatic correction and measurement of the moving position are as follows. That is, first, measurement of the specific moving position and error operation are executed. Secondly, in the case of the error<the minimum movement setting unit, no correction is done and, in the case of the error≧the minimum movement setting unit, the moving-position correction is done (further, the moving-position displacement predictive operation till completion of entire processing is executed by the moving-position displacement prediction, and it is judged by judgment of the inside and outside of the permissible value whether or not the permissible value is exceeded). In the case where correction is done, the specific moving-position data are automatically rewritten into data after correction. Thirdly, in the case where correction is done, the variety of thermal-displacement data is rewritten to data at this time.

In connection with the above, regarding the control unit for the machine-outside measurement, in the case where processing is done within the numerical control apparatus for the machine tool, another control unit identical in type with the first-mentioned control unit, a control unit different in type from the first-mentioned control unit, and the like can be used in view of a system. It is constructed that, in any case, the measuring data are automatically transferred.

(7) The measuring unit uses the touch probe in the aforementioned experiment. In place of the touch probe, however, the measuring unit may use a detector of variable output type. Further, a detector of non-contact type can also perform identical functions. Accordingly, description will be made such that these are called "a gage head" or "a measuring probe" in the form of a touch probe.

(8) The thermal-displacement correction is executed for each of axes from which the data of the amount of generated heat such as x, Y, Z, A, B, C and the like are picked or collected.

(9) The measuring reference-position measurement is a four-point equalization method, or the like, for example.

(10) In order to facilitate machine regulation or adjustment, a zero-point correction memory section of a head of the measuring unit, for example, X, Y, Z or the like is provided within the memory device section of the numerical control apparatus, and input of the correction parameter can be executed for each of X, Y and Z.

(11) The reference position measurement is such that measurement is surely performed when the electric power source is turned on, and correcting values are all brought to zero with a measuring value serving as an initial value (that is, the measuring value is coincident with a zero-point correcting parameter of a head of the measuring unit under a condition after the machine dissipates heat due to running).

(12) Comparative Computation of Amount of Thermal Displacement.

The data of the amount of generated heat of the thermal displacement of the ball screw are integrated, for example, every control axis and every constant-distance interval. The data of the amount of generated heat of the thermal displacement of the machine origin are integrated, for example, with a distance from the reference position maintained every control axis. The data of the amount of generated heat of the thermal displacement of the workpiece reference position are integrated, for example, with a distance from the reference position maintained every control axis. The data of the amount of generated heat of the thermal displacement of the workpiece-mounting reference-block position are integrated, for example, with a distance from the reference position maintained every control axis. The data of the amount of generated heat of the specific moving-position thermal displacement are integrated, for example, with a distance from the reference position maintained every control axis.

Integration is divided every sampling time "Tt" to update the data in the memory section. Setting is made such that it can beforehand be processed to record data before and after updating. The data of the amount of the generated heat of the thermal displacement of the ball screw are read, and the this time data and the previous data are compared with each other by data prepared in this manner every sampling time. Thus, the amount of thermal displacement is computed. A computing equation for this purpose uses due to the following equations (modificated in accordance with Japanese Patent Laid-Open No. SHO 63-256336).

In the case of, for example, a single anchor system, the amount of thermal displacement of each part is obtained by the following equation:

$$\Delta X = \sum_{0}^{x} \alpha \cdot \theta(x) \cdot dx \qquad (9)$$

Here, $\theta$ is obtained by temperature distribution $\{\theta\}$ of each heat source section of the following equation:

$$[C]d\{\theta\}/dt + [H]\{\theta\} + \{Q\} = 0 \qquad (10)$$

Here,
[C]: heat-capacity matrix
[H]: heat-conduction matrix
$d\{\theta\}/dt$: $\theta$-time differential of temperature
$\{Q\}$: an amount of generated heat of the ball screw, a front bearing, a ball nut, a rear bearing, or the like
$\alpha$: coefficient of linear expansion of the ball screw
$dx$: length into which the ball screw is divided at constant-distance intervals

(13) Computation of Displacement of Machine Origin Position.

The data of the amount of generated heat of the thermal displacement of the machine origin are integrated with a distance from the reference position maintained every control axis, for example, as described previously. Accordingly, the data are used to operate the displacement of the machine origin on the basis of the equations (9) and (10).

(14) Computation of Displacement of Workpiece Reference Position.

The data of the amount of generated heat of displacement of the workpiece reference position are integrated with a distance from the reference position maintained every control axis, for example, as described previously. Accordingly, the data are used to operate the displacement of the workpiece reference position on the basis of the equations (9) and (10).

(15) Computation of Displacement of Workpiece-Mounting Reference-Block Position.

The data of the amount of generated heat of displacement of the workpiece-mounting reference-block position are integrated with a distance from the reference position maintained every control axis, for example, as described previously. Accordingly, the data are used to operate the displacement of the workpiece-mounting reference-block position on the basis of the equations (9) and (10).

(16) Computation of Error of Specific Moving Position

The data of the amount of generated heat of an error of the specific moving position are integrated with a distance from the reference position maintained every control axis, for example, as described previously. Accordingly, the data are used to operate the error of the specific moving position on the basis of the equations (9) and (10).

Operation and processing under a running condition are executed as follows. That is, correspondingly to the running condition, machine position correcting methods include machine-origin-position correcting methods-1 and -2, a workpiece-reference position correcting method, a workpiece-mounting reference-block position correcting method, and the like. Further, moving-position correcting methods include a lapse-time moving-position correcting method, an every-processing moving-position correcting method, and the like. These methods execute correcting operation by the following operation procedure.

(1) Machine-Origin-Position Correcting Method-1

Figure 3:
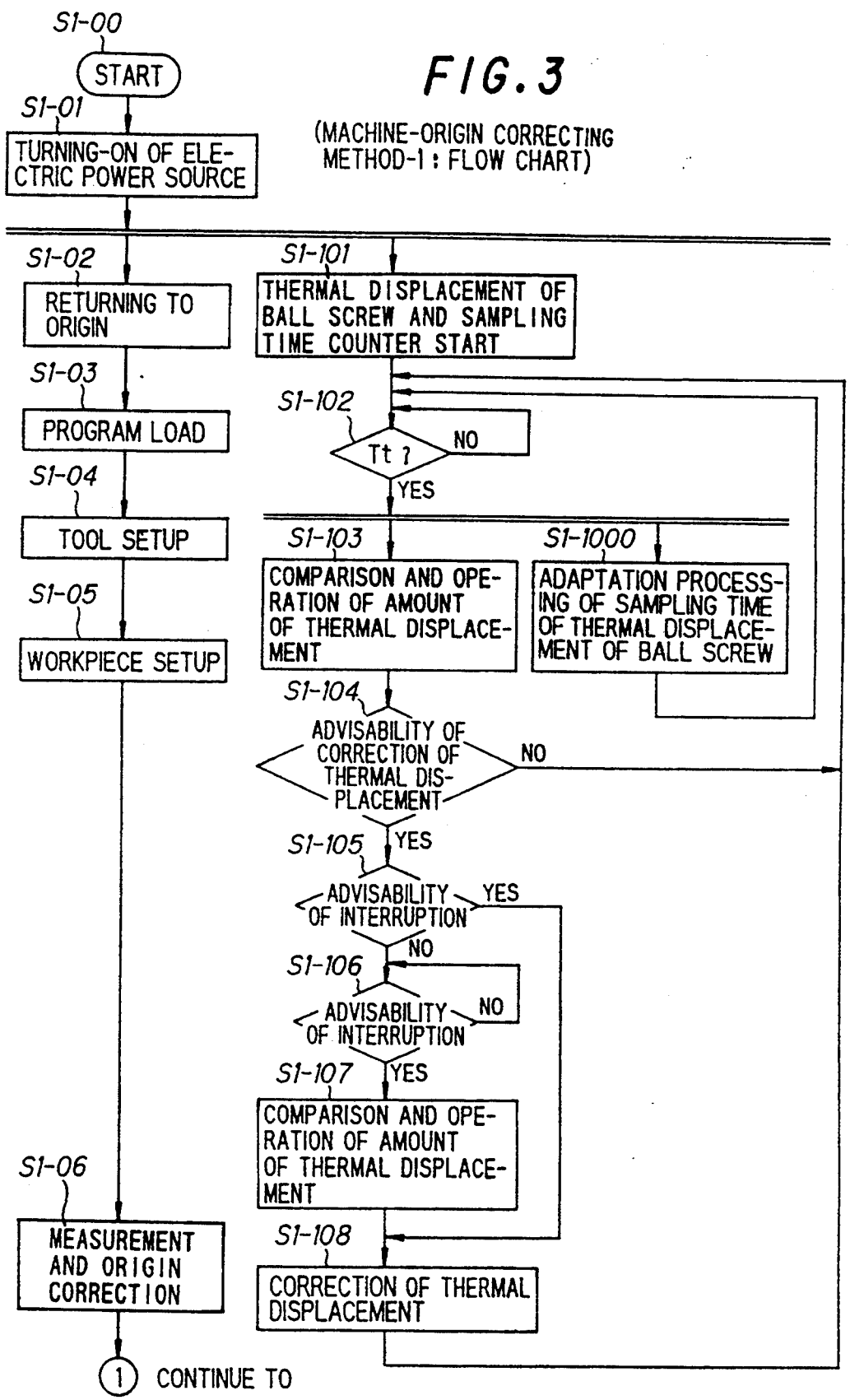
FIG. 3 is a flow chart showing operation of a machine-origin correcting method-1 according to an embodiment of the invention.
Figure 4:
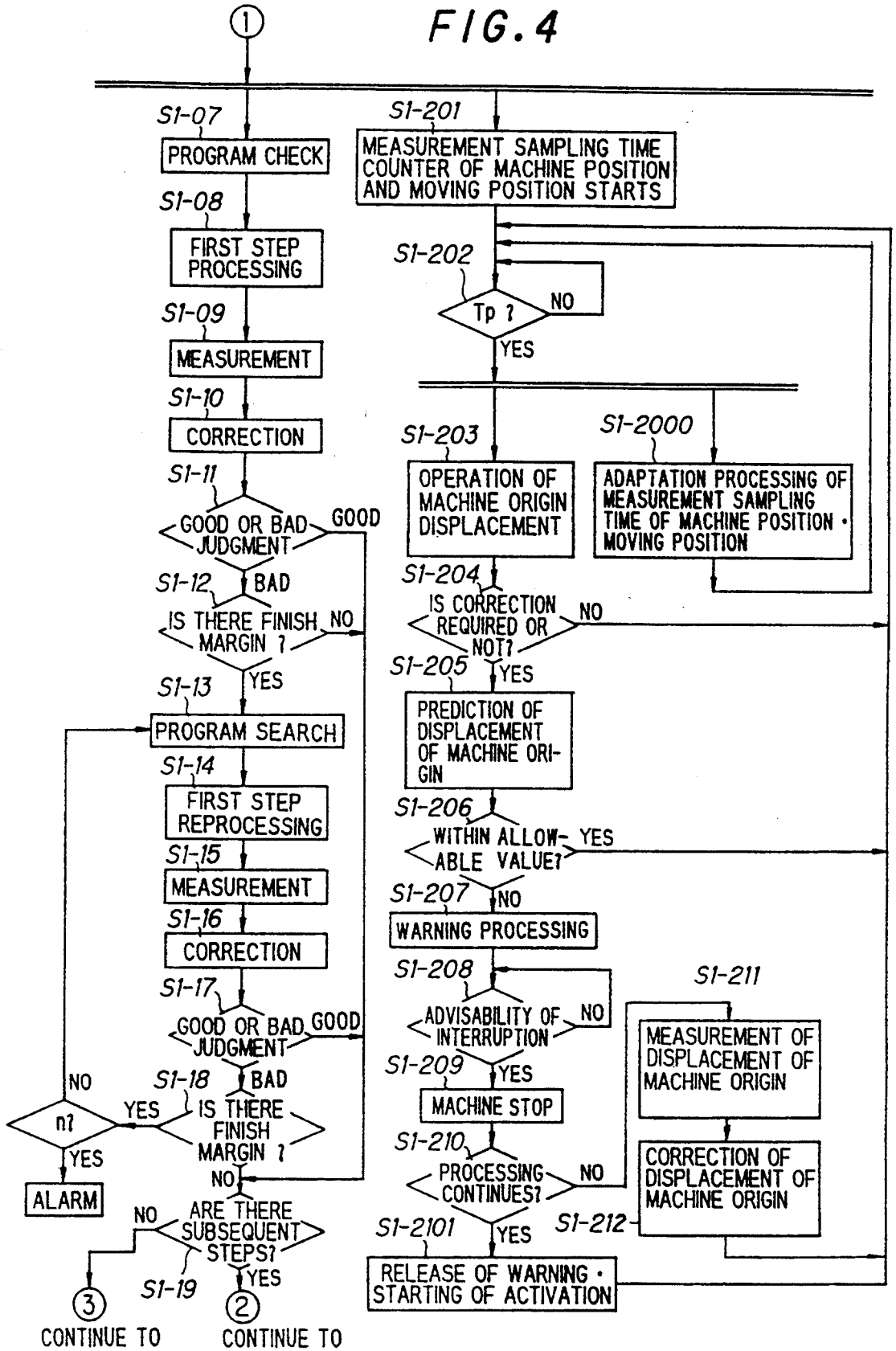
FIG. 4 as a flow chart showing operation of a machine-origin correcting method-1 according to an embodiment of the invention.
Figure 5:
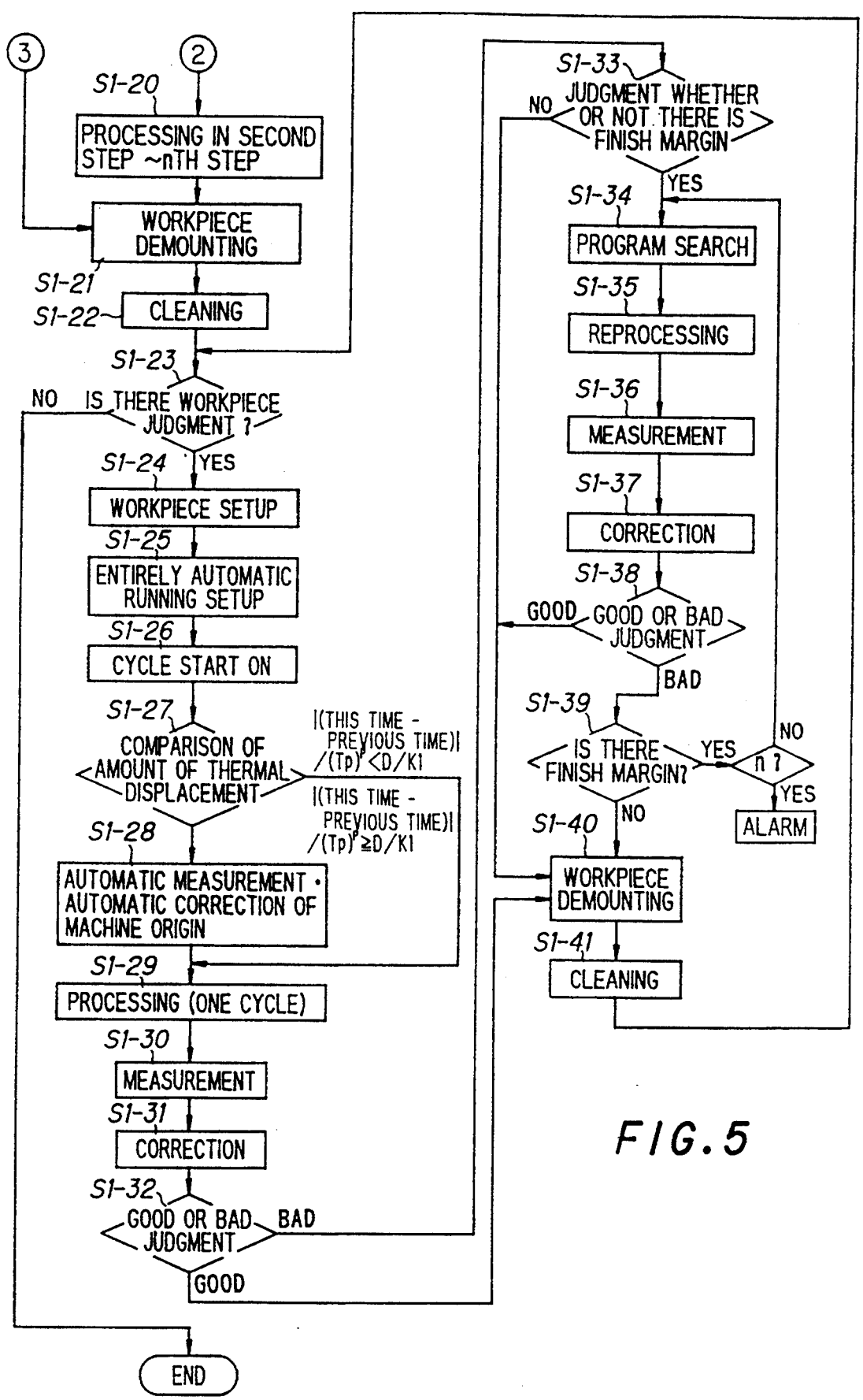
FIG. 5 as a flow chart showing operation of a machine-origin correcting method-1 according to an embodiment of the invention.

A machine origin is checked before every processing. Operation procedure is executed as follows by procedure indicated by flow charts illustrated respectively in FIGS. 3~5.

Operation starts in a step S 1-00. An electric power source is turned on in a step S 1-01. A numerical control apparatus and a programmable logic controller are initialized and readied up. The step S 1-01 is completed, and a step S 1-02~ and a step S 1-101~ are processed in parallel relation to each other. From the step S 1-101~ a step S 1-108, processing is repeated until the electric power source is turned off, regardless of the main processing.

Subsequently, in the step S 1-101, collection of the data of the amount of generated heat of the thermal displacement of the ball screw, sampling time counter of the thermal displacement, collection of the data of the amount of generated heat of the thermal displacement of the ball screw, and the sampling time counter of the thermal displacement start. In a step S 1-102, judgment on the sampling time of the thermal displacement is executed, and it is judged whether or not the sampling time of the thermal displacement is coincident with or in agreement with "Tt". In the case where the sampling time is coincident with "Tt", the program proceeds to subsequent step S 1-103/step S 1-1000. In the case where the sampling time is not coincident with "Tt", the program is returned to the step S 1-102, and judgment on counting-up is repeated. If the sampling time of the thermal displacement is coincident with "Tt" in the step S 1-102, and the step S 1-103~ the step S 1-1000 are processed in parallel relation to each other. The step S 1-1000 repeats the processing until the electric power source is turned off, regardless of the main processing.

In the step S 1-1000, adaptation processing of the aforesaid sampling time "Tt" of the thermal displacement of the ball screw is executed. If this processing is completed, the program is returned to the step S 1-102. Subsequently, in the step S 1-103, the amounts of thermal displacement are compared with each other and are processed by the aforesaid method. In a step S 1-104, judgment on advisability or propriety of the thermal-displacement correction is executed. In the case of the error < the minimum movement setting unit, no correction is made and the program is returned to the step S 1-102 so that the operation is repeated. On the contrary, in the case of the error ≧ the minimum movement setting unit, the program proceeds to subsequently steps in order to execute correction.

There is a method in which the thermal-displacement correction is executed without inclusion of a condition other than the aforementioned conditions every thermal-displacement sampling time "Tt". The method has various limitations in view of controlling, but is simple as processing procedure. Here, an example, which is complicated in processing procedure, will be described below. Hereunder, the same locations will be described as "due to the aforesaid processing procedure of thermal-displacement correction" for short.

In a step S 1-105, it is judged whether or not correction interruption can be made. A judging standard is as follows. That is, the correction interruption is always executed during running other than automatic running. If the correction interruption is executed during processing and during automatic running, inferiority in shape, dimension, finish surface or the like will occur due to shift or deviation of a processing shape or form, shift or deviation of a processing position or the like. For this reason, the correction interruption cannot be executed till completion of the processing locations or the group of processings during processing. Accordingly, the correction interruption is prepared including the promise items of breaks in the processing program, and is executed during processing and during automatic running in addition to running other than the automatic running. For example, it is possible to use, as the breaks, ① signals of tool replacement, ② discontinuity of sequence numbers, ③ every one of fixed cycles, ④ connection between program links, ⑤ previous time of the finish-start block of the lap cycle, and the like. This processing standard will hereunder be described in short as "processing timing of the correction interruption". Here, in the case where the interruption is possible, the program proceeds to the step S 1-108, while, in the case where the interruption is impossible, the program continues to the subsequent steps so that judgment on advisability or propriety of the interruption is repeated.

Subsequently, in a step S 1-106, it is judged whether or not the correction interruption is possible. The judging standard is due to the above-described step S 1-105. In the case where the interruption is possible, the program proceeds to the subsequent step, while, in the case where the interruption is impossible, the program is returned to the step S 1-106 where judgment on advisability or propriety of interruption is repeated. Subsequently, the amounts of thermal displacement are compared with each other and are operated in a step S 1-107. In the step S 1-108, the position data of each axis are corrected by the correction value, and the variety of thermal displacement data is rewritten to this-time data. If the processing is completed, the program is returned to the step S 1-102, and the step S 1-102~ the step S 1-108 are repeated.

In the step S 1-02, entirely automatic returning to the origin or returning to the origin due to manual operation by an operator is executed. A step S 1-03 is a program load in which a processing program is recorded into the memory device of the numerical control apparatus. A step S 1-04 is a tool setup in which tools required for the processing are mounted respectively on predetermined pots of a magazine on the basis of instructions from a processing program list or a tool list. Further, a step S 1-05 is a workpiece setup in which a workpiece is mounted on a reference position on a table. In a step S 1-06, initialization of machine-origin measurement/automatic correction is executed.

The step S 1-06 is completed, and the step S 1-07~ and a step S 1-201~ are processed in parallel relation to each other. Until a step S 1-202~ a step S 1-212, the processing is repeated until the electric power source is turned off, regardless of the main processing. In the step S 1-201, the measurement sampling-time counter of the machine position and the moving position starts. Furthermore, in the step S 1-202, it is judged whether or not the measurement sampling time of the machine position and the moving position is coincident with "Tp". In the case where the measurement sampling time is coincident with "Tp", the program is returned to step S 1-203/step S 1-2000, while, in the case where the measurement sampling time is not coincident with "Tp", the program is returned to the step S 1-202 where the judgment on the counting-up is repeated.

In the step S 1-202, the measurement sampling time of the machine position and the moving position is coincident with "Tp", and the step S 1-203~ the step S 1-2000 are processed in parallel relation to each other. In the step S 1-2000, the processing is repeated until the electric power source is turned off, regardless of the main processing. In the step S 1-2000, adaptation processing of the aforesaid measurement sampling time "Tp" of the machine position and the moving position is executed. If this processing is completed, the program is returned to the step S 1-202.

In the step S 1-203, the thermal displacement of the machine origin is operated by the aforementioned method. In a step S 1-204, judgment on which displacement correction of the machine origin is required or not is decided on the basis of the following equation. That is, in the case of the error < the permissible error value per time, no correction is made. The program is returned to the step S 1-202, and the steps 1-202~ 204 are repeated. On the contrary, in the case of the error ≥ the permissible error value per time, correction is made, and the program continues to subsequent steps for judgment on presence of requirement. In a step S 1-205, operation is made in order to predict displacement of the machine origin until the entire processing is completed. The displacement of the machine origin until the entire processing is completed (i.e. MotTcf) is calculated according to the following equation:

$$\text{MotTcf} \propto \{|(\text{previous time}) - (\text{this time})|/(\text{Tp})^p\} \cdot k\{\text{Tc} - (\text{processing running time until now})\}^p$$

Further, MotTcf described later is due to the above equation.

In a step S 1-206, it is judged whether or not the permissible value is exceeded. If the permissible value is not exceeded, the program is returned to the step S 1-202, and the step S 1-202~ the step S 1-206 are repeated. If the permissible value is exceeded, the program continues to the subsequent step. In a step S 1-207, a warning suggesting the fact that the error exceeds the permissible value is exhibited, and a alarm sound is generated.

Here, the warning processing is executed in the case where the amount of thermal displacement per unit time, which changes or varies between the previous-time sampling time and the this-time sampling time, is larger than the amount of permissible value per unit time, and exceeds the permissible value during the remaining processing cycle time. Generally, temporary or momentary halt or stop is made at the break of the processing processed by the machine tool (for example, ① signals of tool replacement, ② discontinuity of sequence numbers, ③ every one of fixed cycles, ④ connection between program links, and ⑤ previous time of the finish-start block of the lap cycle, as described previously). The warning sound is activated, and display on a screen is performed. Reactivation is made after the operator has executed operation in accordance with the manual instructions. Thus, reopening or resumption of the processing is executed.

In a step S 1-208, it is judged whether or not halt interruption is possible. A judgment standard is as follows. That is, the halt interruption is always executed during running other than the automatic running. If the halt interruption is executed during processing and during the automatic running, inferiority in shape, dimension, finish surface or the like will occur due to biting of a processing tool, shift or deviation of a processing position in the case of reprocessing, or the like. For this reason, the correction interruption cannot be executed till completion of the processing locations or the group of processings during processing. Accordingly, the correction interruption is prepared including the promise items of breaks in the processing program, and is executed during processing and during automatic running in addition to running other than the automatic running. For example, it is possible to use, as the breaks, ① signals of tool replacement, ② discontinuity of sequence numbers, ③ every one of fixed cycles, ④ connection between program links, ⑤ previous time of the finish-start block of the lap cycle, and the like. This processing standard will hereunder be described in short as "processing timing of the halt interruption". Here, in the case where the interruption is possible, the program proceeds to a step S 1-209, while, in the case where the interruption is impossible, the program is returned to the step S 1-208 where judgment on advisability or propriety of the interruption is repeated.

In a step S 1-209, the machine is halted. In a step S 1-210, it is judged whether or not the processing continues by the operator. In the case where the processing continues, the program proceeds to a step S 1-2101. In the case where the processing is interrupted to execute correction of the machine origin, the program proceeds to a subsequent step S 1-211. In the step S 1-211, displacement of the machine origin is measured (measurement of the machine origin, and operation of the error are executed). Subsequently, in the step S 1-212, the machine origin is corrected on the basis of the results of the measurement of the machine origin. The variety of the thermal displacement data of the machine origin is rewritten to the this-time data, and the machine is again activated. If this processing is completed, the program is returned to the step S 1-202 where the processing is repeated (in the case where correction is executed, the data of the machine origin are automatically rewritten to data after correction). Moreover, in the step S 1-2101, release of the warning and start of activation are executed. If this processing is completed, the program is returned to the step S 1-202 where the processing is repeated.

Further, in a step S 1-07, pass check and machine lock are performed by the CRT so that trace check of continuous block and trace check every one block are executed. In a step S 1-08, signal-block processing is performed by a first step tool. In a step S 1-09, the locations processed in the first step are measured on the machine. In a step S 1-10, the results measured in the step S 1-09 are compared with designated dimensions, and an error therebetween is corrected by tool correction and coordinate correction. If there is no error, the program proceeds to a step S 1-11. In a step S 1-11, it is judged whether or not the measurement results are within the permissible value. In the case of "good", the program proceeds to the step S 1-19, while, in the case of "bad", the program proceeds to a subsequent step S 1-12. In the step S 1-12, judgment of presence of a finish margin is executed. In the case where there is the finish margin, the program proceeds to a subsequent step S 1-13, while, in the case where there is no finish margin, the program proceeds to the step S 1-19.

Subsequently, in the step S 1-13, a program search, that is, a start sequence number in the first step is searched. In a step S 1-14, only the processing by the first step tool is executed continuously. In a step S 1-15, reprocessed locations are measured on the machine. In a step S 1-16, the results measured in the step S 1-15 are compared with the designated dimensions, and an error therebetween is corrected by the tool correction and the coordinate correction. In a step S 1-17, good or bad judgment is executed. If the measurement results are "good", the program proceeds to the step S 1-19, while, if the measurement results are "bad", the program proceeds to a subsequent step S 1-18. In the step S 1-18, judgment on presence of a finish margin is executed. In the case where there is the finish margin, processing from the step S 1-13 is repeated. In this connection, if loops exceed n times, the processing is brought to alarm processing. On the contrary, in the case where there is no finish margin, the program proceeds to the subsequent step S 1-19. The step S 1-19 judges presence of subsequent steps. If there are the subsequent steps, the program proceeds to the subsequent steps. On the contrary, there are no subsequent steps, the program proceeds to a step S 1-21.

In a step S 1-20, the step S 1-08 ~ the step S 1-19 are repeated every n step tool from a second step tool. Since processing of a first item has been completed, operation continues by the following procedure for next but one processing. That is, in the step S 1-21, the workpiece is demounted. In a step S 1-22, a location on which the workpiece is mounted is cleaned. In a step S 1-23, presence of a non-processed workpiece is judged. In the case where there is the non-processed workpiece, the program proceeds to subsequent steps, while, in the case where there is no non-processed workpiece, the program is completed. A step S 1-24 is a setup of the workpiece, where a second workpiece is mounted. In a step S 1-25, setting is made so as to be capable of entirely automatic running by operation such as single step-off, optional step-off or the like. In a step S 1-26, a cycle start button is depressed whereby the automatic running starts. In a step S 1-27, the cycle starts, and comparison of the amounts of thermal displacement is made. As a result, in the case where $|(\text{this time})-(\text{previous time})|/(Tp)^p$ is equal to or larger than $D/k1$, the program proceeds to subsequent steps, while, in the case where $|(\text{this time})-(\text{previous time})|/(Tp)^p$ is smaller than $D/k1$, the program proceeds to a step S 1-29.

Furthermore, in a step S 1-28, the machine origin is automatically measured and, subsequently, operation is executed on the basis of the following procedure to execute correction and rewriting of data. ① In the case of measurement and operation: an error < the minimum moving unit, no correction is made, while, in the case where the error ≧ the minimum moving unit, correction is made as a rule. In the case, however, where the results of operation of displacement of the machine origin until the entire processing is completed, on the basis of the MotTcf equation result being within the permissible value D, no correction is made (in the case where correction is made, the machine position data are automatically rewritten to data after correction). ② In the case where correction is made, the variety of thermal displacement data is rewritten into this-time data.

Moreover, in the step S 1-29, 1-cycle entire processing is executed. In a step S 1-30, a measurement designated location of processing locations is measured. In a step S 1-31, the results measured in the step S 1-30 are compared with the designated dimensions, and an error therebetween is corrected by the tool correction and the coordinate correction. Further, in a step S 1-32, good or bad judgment is executed. If the measurement results are "good", the program proceeds to a step S 1-40, while, in the case where the measurement results are "bad", the program proceeds to subsequent steps. Furthermore, in a step S 1-33, judgment on presence of the finish margin is executed. In the case where there is the finish margin, the program proceeds to subsequent steps, while, in the case where there is no finish margin, the program proceeds to the step S 1-40. In a step S 1-34, program search is executed, to call the sequence number of the program which is reprocessed. In a step S 1-35, the processing program searched in the step S 1-34 starts, and locations defective in dimension accuracy are processed in refinishing.

Further, in a step S 1-36, the reprocessed locations are measured. In a step S 1-37, the results measured in the step S 1-36 are compared with the designated dimensions, and an error therebetween is corrected by the tool correction and the coordinate correction. In a step S 1-38, good or bad judgment is executed. If the measurement results are "good", the program proceeds to the step S 1-40, while, in the case where the measurement results are "bad", the program proceeds to subsequent steps. Furthermore, in a step S 1-39, judgment on presence of the finish margin is executed. In the case where there is the finish margin, the program is repeated from the step S 1-34. In this connection, if loops exceed n times, the processing is brought to alarm processing. On the contrary, in the case where there is no finish margin, the program proceeds to subsequent steps. In the step s 1-40, the workpiece is demounted. In a step S 1-41, cleaning is made to a mark where the workpiece is demounted, and to chips scattering toward each section. If this processing is completed, the steps 1-23~ are repeated.

(2) Machine Origin Position Correcting Method-2

Figure 6:
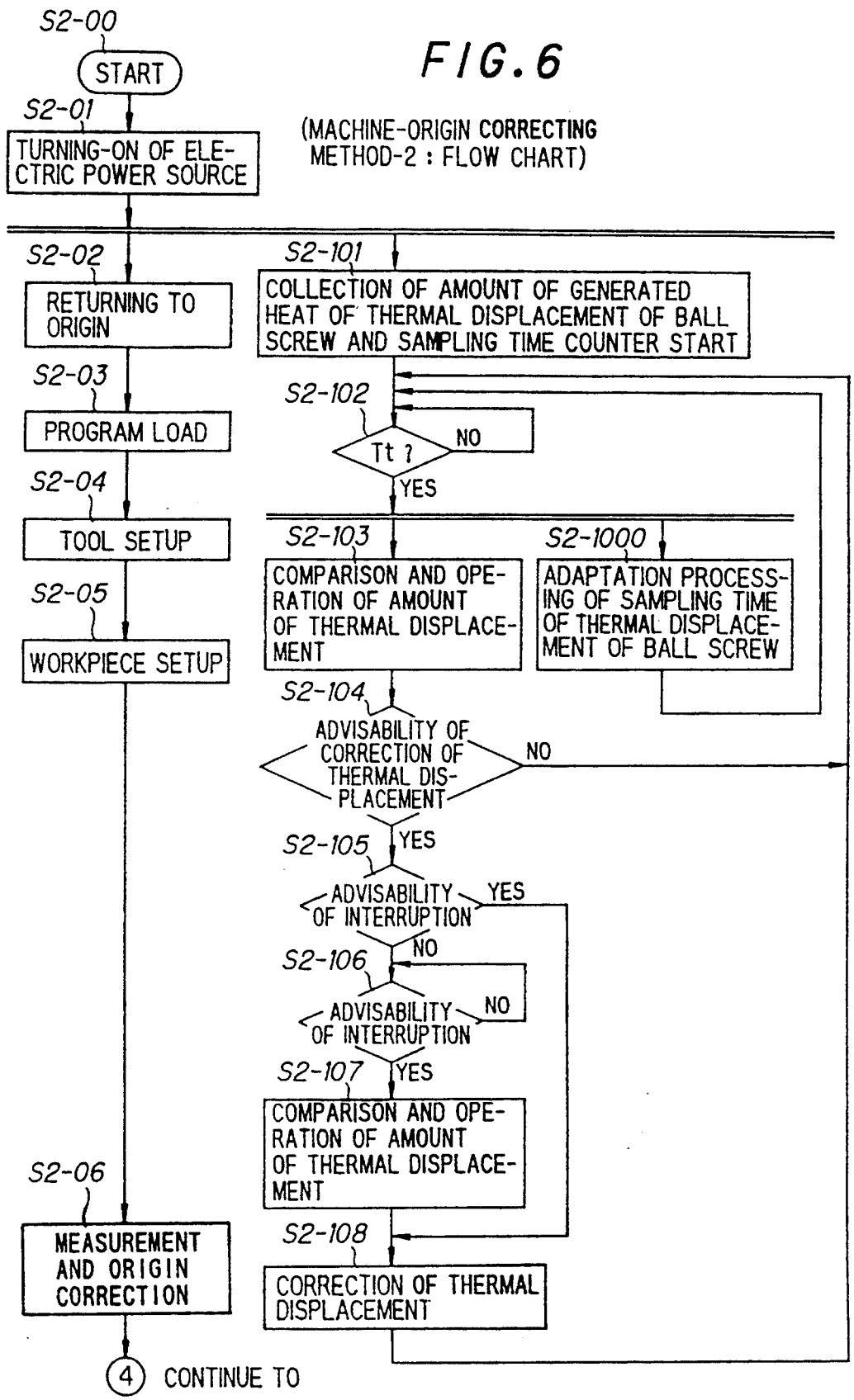
FIG. 6 as a flow chart showing operation of a machine-origin correcting method-2 according to an embodiment of the invention.
Figure 7:
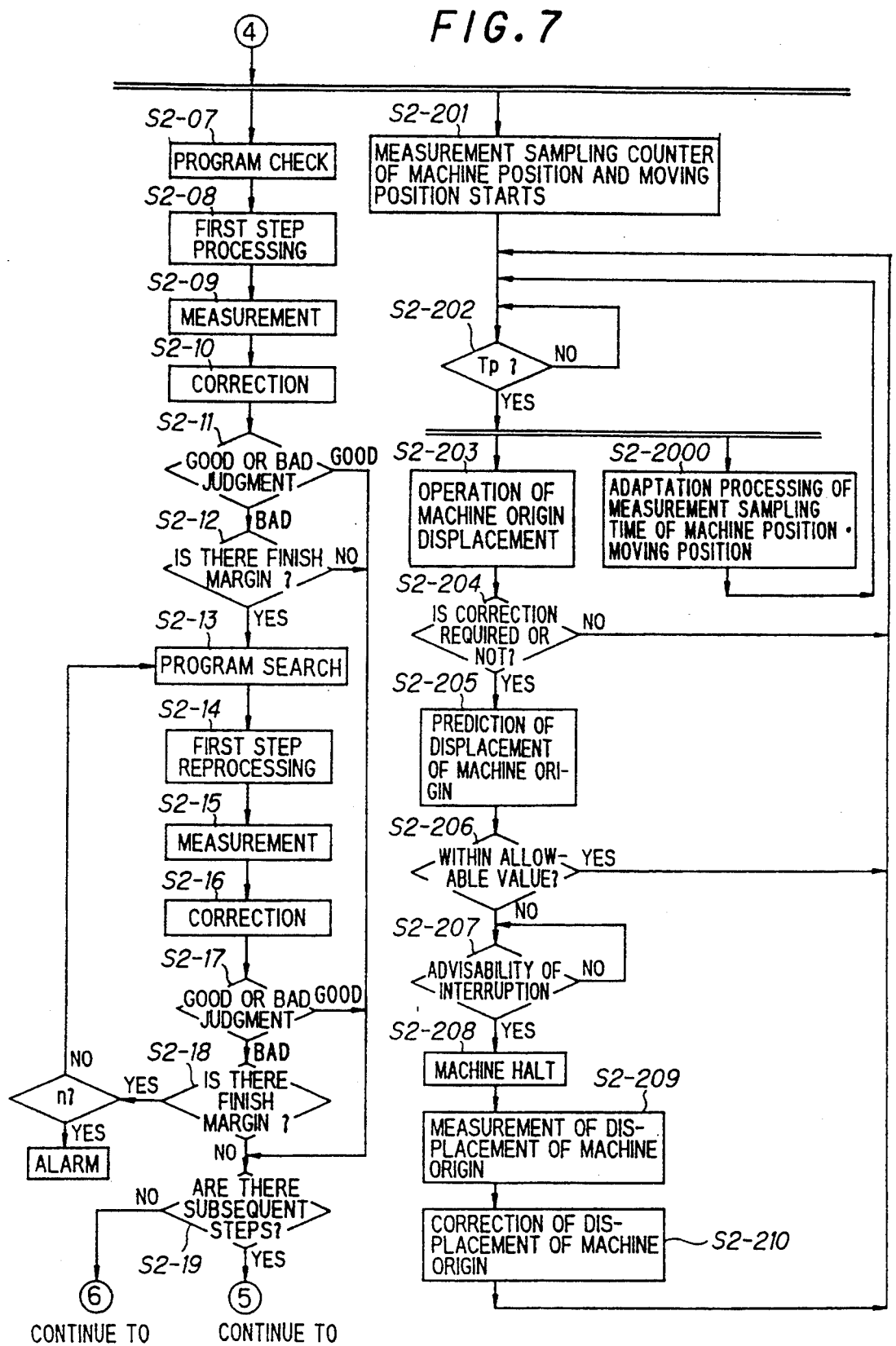
FIG. 7 is a flow chart showing operation of a machine-origin correcting method-2 according to an embodiment of the invention.
Figure 8:
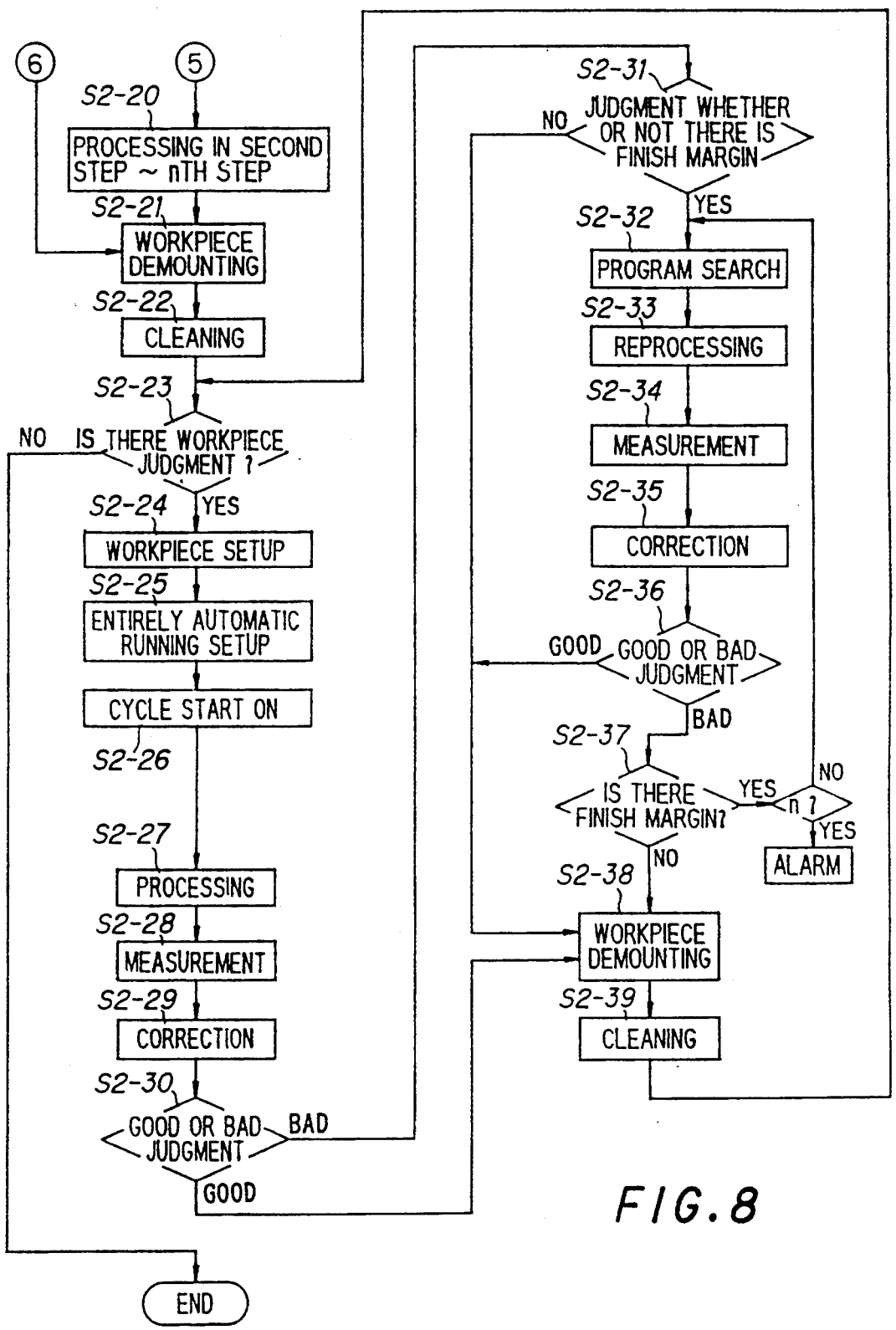
FIG. 8 is a flow chart showing operation of a machine-origin correcting method-2 according to an embodiment of the invention.

A machine origin is checked by a time parameter. Operation procedure is executed as follows by procedure indicated in flow charts illustrated respectively in FIGS. 6~8.

Operation starts in a step S 2-00. The electric power source is turned on in a step S 2-01. The numerical control apparatus and the programmable logic controller are initialized and readied up. The step S 2-01 is completed, and a step S 2-02~ and a step S 2-101~ are processed in parallel relation to each other. From the steps 2-101~108, processing is repeated until the electric power source is turned off, regardless of the main processing.

In the step S 2-101, collection of the data of the amount of generated heat of the thermal displacement of the ball screw, the sampling time counter of the thermal displacement, collection of the data of the amount of generated heat of the thermal displacement of the ball screw, and the sampling time counter of the thermal displacement start. In a step S 2-102, it is judged whether or not the sampling time of the thermal displacement is coincident with "Tt". In the case where the sampling time is coincident with "Tt", the program proceeds to subsequent step S 2-103 and step S 2-1000. In the case where the sampling time is not coincident with "Tt", the program is returned to the step S 2-102, and judgment on counting-up is repeated. The sampling time of the thermal displacement is coincident with "Tt" in the step S 2-102, and the step S 2-103~ and the step S 2-1000~ are processed in parallel relation to each other. The step S 2-1000 repeats the processing until the electric power source is turned off, regardless of the main processing.

In the step S 2-1000, adaptation processing of the aforesaid sampling time "Tt" of the thermal displacement of the ball screw is executed. If this processing is completed, the program is returned to the step S 2-102. Further, in the step S 2-103, the amounts of thermal displacement are compared with each other and are operated by the aforesaid method. In a step S 2-104, judgment on advisability or propriety of the thermal-displacement correction is executed, and advisability or propriety of correction is decided by the following equation. That is, in the case of the error<the minimum movement setting unit, no correction is made and the program is returned to the step S 2-102 so that the processing is repeated on the contrary, in the case of the error≧the minimum movement setting unit, the program proceeds to subsequently steps in order to execute correction (due to the aforementioned thermal-displacement correction processing procedure).

In a step S 2-105, it is judged whether or not correction interruption is possible. A judgment standard is due to the aforesaid "processing timing of the correction interruption". In the case where the interruption is possible, the program proceeds to the step S 2-108, while, in the case where the interruption is impossible, the program continues to subsequent steps where judgment on advisability or propriety of the interruption is repeated. In a step S 2-106, it is judged whether or not the correcting interruption is possible. A judgment standard is due to the aforesaid step S 2-105. In the case where the interruption is possible, the program proceeds to subsequent steps, while, in the case where the interruption is impossible, the program is returned to the step S 2-106 where judgment on advisability or propriety of the interruption is repeated. In a step S 2-107, the amounts of thermal displacement are compared with each other and are operated by the aforesaid method. In the step S 2-108, the position data of each axis are corrected by a correction value, and the variety of thermal displacement data is rewritten to this-time data. If processing is completed, the program is returned to the step S 2-102, and the step S 2-102~the step S 2-108 are repeated.

Moreover, in the step S 2-02, entirely automatic returning to the origin or returning to the origin due to manual operation by an operator is executed. In a step S 2-03, program load is executed, to record the processing program to the memory device of the numerical control apparatus. In a step S 2-04, a tool setup is executed in which tools required for the processing are mounted respectively on predetermined pots of a magazine on the basis of instructions of a processing program list or a tool list. In a step S 2-05, a workpiece setup is executed in which a workpiece is mounted on a reference position on a table. In a step S 2-06, the machine origin is automatically corrected on the basis of the results of the measurement of the machine origin and is initialized.

When the step S 2-06 is completed, a step S S2-07~ and a step S 2-201~ (treatment of "Mot: processing of the machine origin" (the machine origin is measured and corrected by time interval sampling of the amount of change or variation of the machine position due to heat)) are processed in parallel relation to each other. Till the step S 2-201~210, the processing is repeated until the electric power source is turned off, regardless of the main processing.

In the step S 2-201, the measurement sampling-time counter of the machine position and the moving position starts. Furthermore, in a step S 2-202, it is judged whether or not the measurement sampling time of the machine position and the moving position is coincident with "Tp". In the case where the measurement sampling time is coincident with "Tp", the program is returned to a step S 2-203 and a step S 2-2000, while, in the case where the measurement sampling time is not coincident with "Tp", the program is returned to the step S 2-202 where the judgment on the counting-up is repeated.

In the step S 2-202, the measurement sampling time of the machine position and the moving position is coincident with "Tp", and the step S 2-203~ and the step S 2-2000~ are processed in parallel relation to each other. In the step S 2-2000, the processing is repeated until the electric power source is turned off, regardless of the main processing.

In the step S 2-2000, adaptation processing of the aforesaid measurement sampling time "Tp" of the machine position and the moving position is executed. If this processing is completed, the program is returned to the step S 2-202. In the step S 2-203, the thermal displacement of the machine origin is operated by the aforesaid method. In a step S 2-204, judgment on which displacement correction of the machine origin is required or not is executed. It is decided on the basis of the following equation whether or not the correction is required. In the case of the error<the minimum movement setting unit, correction is not made. The program is returned to the step S 2-202 where the steps 2-202~204 are repeated. In the case of the error≧the minimum movement setting unit, the correction is made. The program continues to subsequent steps in order for required presence judgment. In a step S 2-205, operation is made on the basis of the previous equation (MotTcf) in order to predict the displacement of the machine origin until the entire processing is completed. In a step S 2-206, it is judged whether or not an permissible value is exceeded. Here, in the case of MotTcf<D, which does not exceed the permissible value, the program is returned to the step S 2-202 where the steps 2-202~206 are repeated. On the contrary, in the case of MotTcf>D, which exceeds the permissible value, the program continues to subsequent steps.

In a step S 2-207, it is judged whether or not correction interruption can be made. A judging standard is as follows. That is, the measuring interruption is always executed during running other than automatic running. If the measuring interruption is executed during processing and during automatic running, inferiority in shape, dimension, finish surface or the like will occur due to biting of the processing tool, shift or deviation of a processing position in the case of reprocessing, or the like. Accordingly, the measuring interruption cannot be executed during the automatic operation. For this reason, the measuring interruption cannot be executed till completion of the processing location or the group of processings during processing. Thus, the measuring interruption is prepared in the processing program, including the promise items of breaks, and is executed during processing and during automatic running in addition to running other than the automatic running. For example, it is possible to use, as the breaks, ① signals of tool replacement, ② discontinuity of sequence numbers, ③ every one of fixed cycles, ④ connection between program links, ⑤ previous time of the finish-start block of the lap cycle, and the like. This processing standard will hereunder be described in short as "processing timing of the measuring interruption". Here, in the case where the interruption is possible, the program proceeds to a step S 2-208, while, in the case where the interruption is impossible, the program is returned to the step S 2-207 where judgment on advisability or propriety of the interruption is repeated.

In the step S 2-208, the machine is halted. In a step S 2-209, displacement of the machine origin is measured (measurement of the machine origin, and error operation are executed). In the step S 2-210, the machine origin is corrected by the results in which the displacement of the machine origin is measured. The variety of the thermal displacement data at the machine origin is rewritten to this-time data, and the machine is again activated. If this processing is completed, the program is returned to the step S 2-202 where the processing is repeated (in the case where correction is made, the data of the machine origin are automatically rewritten to data after correction).

In the step S 2-07, program check is executed. Pass check and machine lock by means of CRT are performed so that trace check every one block and trace check of continuous blocks are conducted. In a step S 2-08, single-block processing is executed by a first step tool. In a step S 2-09, locations processed in the first step are measured on the machine. In a step S 2-10, the results measured in the step S 2-09 are compared with the designated dimensions, and errors therebetween are corrected by the tool correction and the coordinate correction. If there are no errors, the program proceeds to a step S 2-17. In a step S 2-11, good or bad judgment is executed. It is judged whether or not the measuring results are within the permissible value. In the case of "good", the program proceeds to a step S 2-19, while, in the case of "bad", the program proceeds to subsequent steps. In a step S 2-12, judgment of presence of a finish margin is executed. In the case where there is the finish margin, the program proceeds to subsequent steps, while, in the case where there is no finish margin, the program proceeds to the step S 2-19.

In a step S 2-13, program search is conducted to search a start sequence number of the first step. In a step S 2-14, only the processing by the first step tool continues. In a step S 2-15, the reprocessed locations are measured on the machine. In a step S 2-16, the results measured in the step S 2-15 are compared with designated dimensions, and errors therebetween are corrected by tool correction and coordinate correction. In the step S 2-17, good or bad judgment is executed. If the measuring results are "good", the program proceeds to the step S 2-19, while, if the measuring results are "bad", the program proceeds to subsequent steps.

In a step S 2-18, judgment of presence of a finish margin is executed. In the case where there is the finish margin, the program is repeated from the step S 2-13. In this connection, if loops exceed n times, the processing is brought to alarm processing. In the case where there is no finish margin, the program proceeds to the subsequent step. In the step S 2-19, it is executed to judge presence of the subsequent step, where it is judged whether or not there are subsequent steps. If there are the subsequent steps, the program proceeds to the subsequent steps, while, if there are no subsequent steps, the program proceeds to a step S 2-21.

In a step S 2-20, the step S 2-08~ the step S 2-19 are repeated every nth step tool from the second step tool. Since processing of a first item is completed, operation continues by the following procedure for next but one processing.

In the step S 2-21, the workpiece is demounted. In a step S 2-22, the workpiece mounting location is cleaned. In a step S 2-23, presence of a non-processed workpiece is judged. In the case where there is the non-processed workpiece, the program proceeds to subsequent steps, while, in the case where there is no non-processed workpiece, the program is completed. In a step S 2-24, a setup of the workpiece is executed, and a second workpiece is mounted. In a step S 2-25, setting is made so as to be capable of entirely automatic running by operation such as single step-off, optional step-off or the like. In a step S 2-26, a cycle start button is depressed whereby the automatic running starts. In a step S 2-27, one cycle entire processing is performed. In a step S 2-28, a measurement designated location of processing locations is measured. In a step S 2-29, the results measured in the step S 2-28 are compared with the designated dimensions, and errors therebetween are corrected by the tool correction and the coordinate correction. In a step S 2-30, good or bad judgment is executed. If the measurement results are "good", the program proceeds to a step S 2-38, while, in the case where the measurement results are "bad", the program proceeds to subsequent steps.

In a step S 2-31, judgment of presence of a finish margin is executed. In the case where there is the finish margin, the program proceeds to the subsequent steps, while, in the case where there is no finish margin, the program proceeds to the step S 2-38. In a step S 2-32, program search is conducted to call or invoke a sequence number of the reprocessed program. In a step S 2-33, the processing program searched in the step S 2-32 starts, and locations defective in dimension accuracy are processed in finishing. In a step S 2-34, the reprocessed locations are measured on the machine. In a step S 2-35, the results measured in the step S 2-34 are compared with the designated dimensions, and errors therebetween are corrected by the tool correction and the coordinate correction. In a step S 2-36, good or bad judgment is executed. If the measuring results are "good", the program proceeds to the step S 2-38, while, if the measuring results are "bad", the program proceeds to subsequent steps.

In a step S 2-37, judgment on presence of a finish margin is executed. In the case where there is the finish margin, the program is repeated from the step S 2-32. In this connection, if loops exceed n times, the processing is brought to alarm processing. On the contrary, in the case where there is no finish margin, the program proceeds to a subsequent step. In the step S 2-38, the workpiece is demounted. In a step S 2-39, cleaning is made to a mark where the workpiece is demounted, and to chips scattering toward each section. If this processing is completed, the program is repeated from the step S 2-23.

(3) Workpiece-Reference-Position Correcting Method

Figure 9:
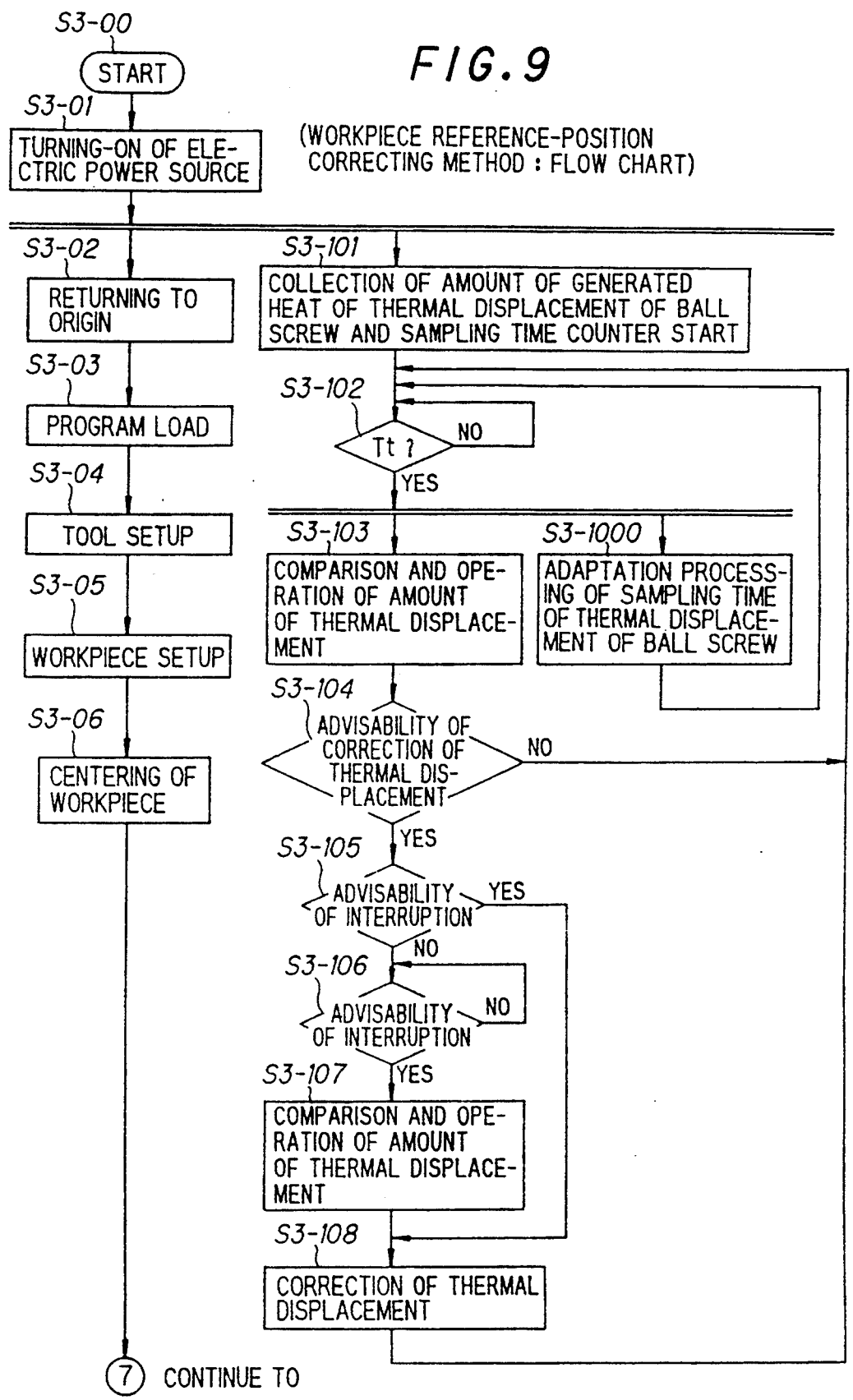
FIG. 9 is a flow chart showing operation of a workpiece reference-position correcting method according to an embodiment of the invention.
Figure 10:
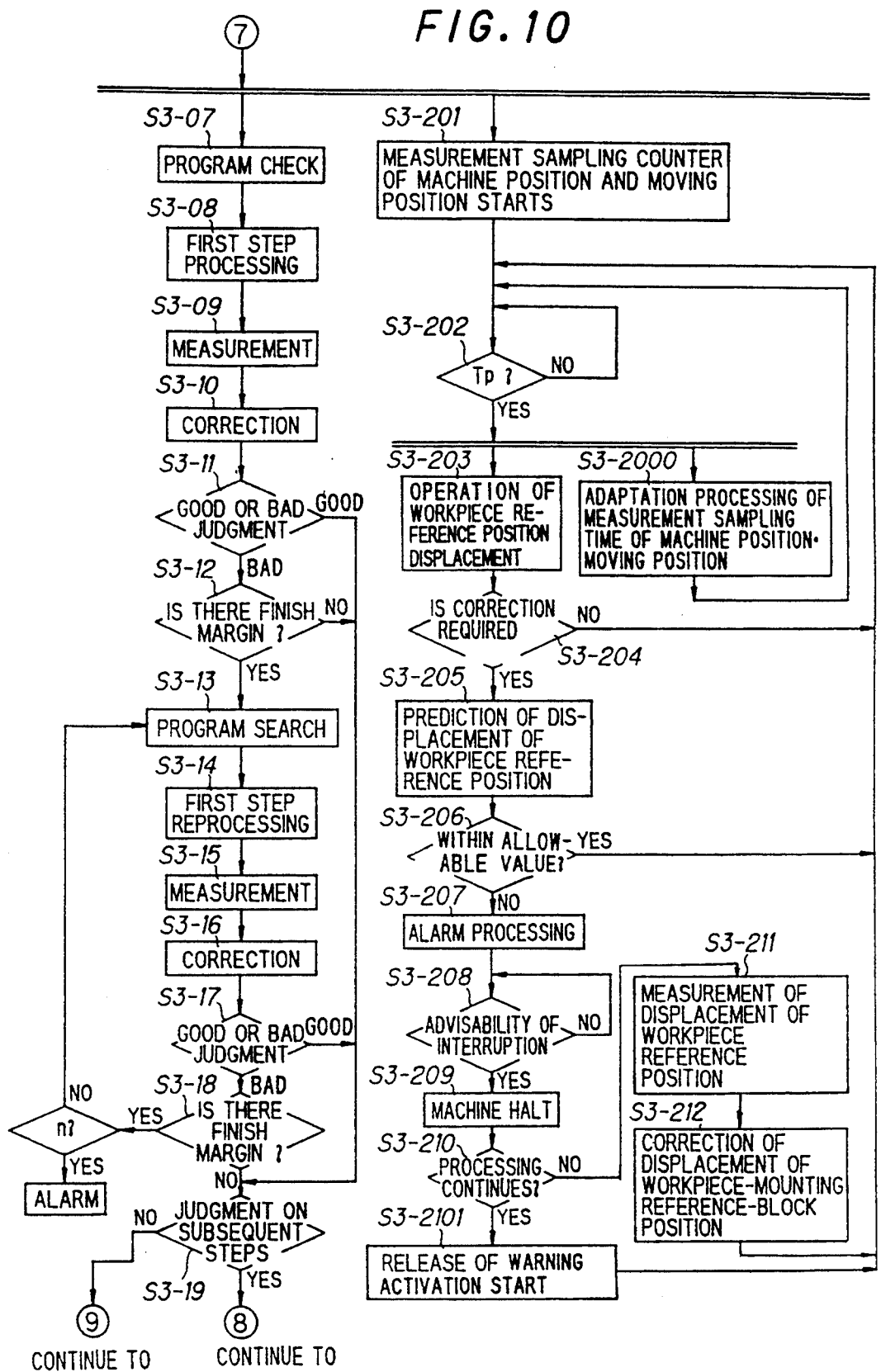
FIG. 10 is a flow chart showing operation of a workpiece reference-position correcting method according to an embodiment of the invention.
Figure 11:
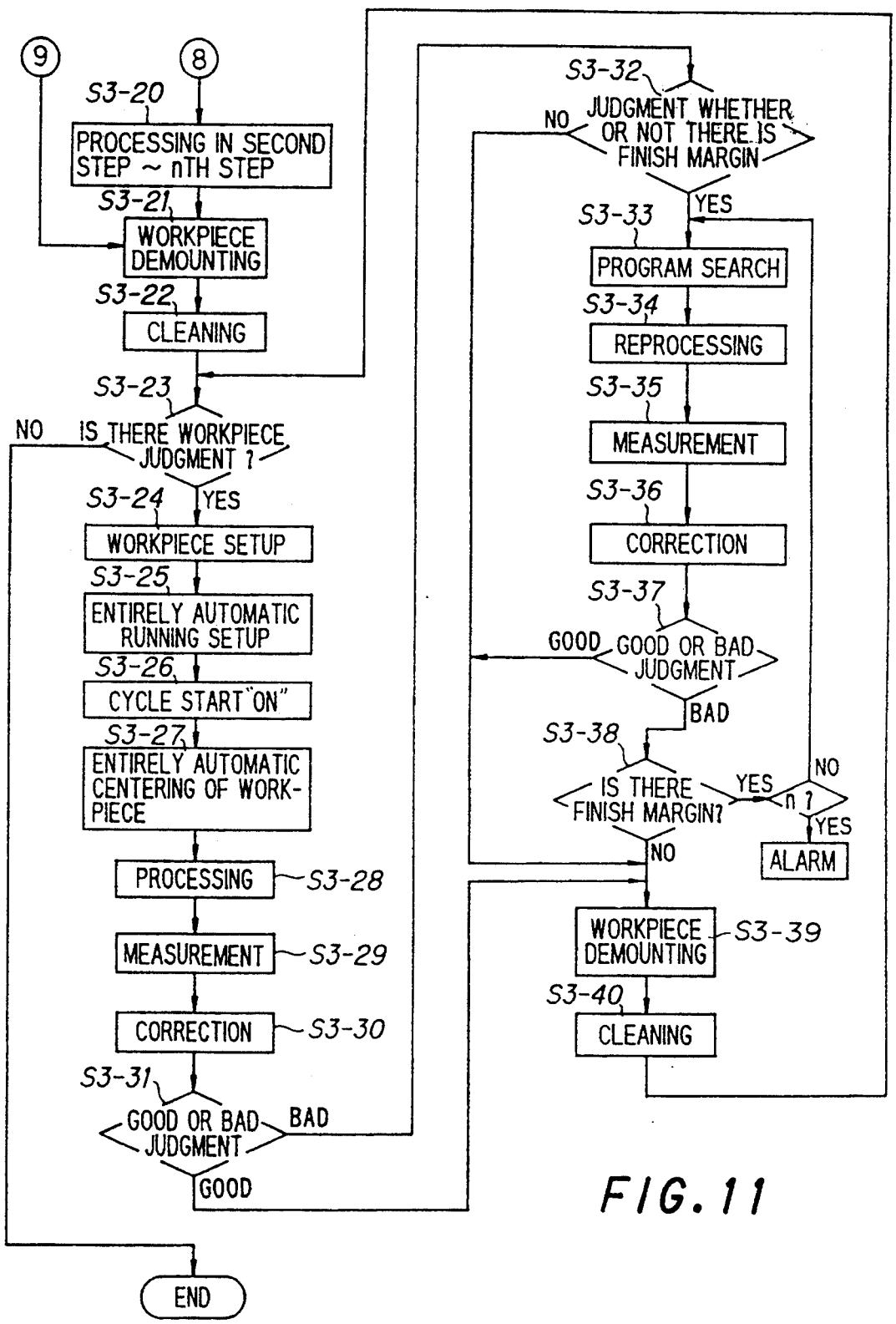
FIG. 11 is a flow chart showing operation of a workpiece reference-position correcting method according to an embodiment of the invention.

Centering is made by the workpiece, and processing is done with the centering serving as a reference position. Operation procedure is executed in the following manner, by procedure shown in flow charts illustrated respectively in FIGS. 9~11.

Operation starts in a step S 3-00. The electric power source is turned on in a step S 3-01. The numerical control apparatus and the programmable logic controller are initialized and readied up. The step S 3-01 is completed, and a step S 3-02~ and a step S 3-101~ are processed in parallel relation to each other. From the steps 3-101~108, processing is repeated until the electric power source is turned off, regardless of the main processing.

In the step S 3-101, collection of the data of the amount of generated heat of the thermal displacement of the ball screw and sampling time counter of the thermal displacement start. Collection of the data of the amount of generated heat of the thermal displacement of the ball screw, and the sampling time counter of the thermal displacement start. Further, in a step S 3-102, it is judged whether or not the sampling time of the thermal displacement is coincident with "Tt". In the case where the sampling time is coincident with "Tt", the program proceeds to subsequent step S 3-103 and step S 3-1000. In the case where the sampling time is not coincident with "Tt", the program is returned to the step S 3-102, and judgment on counting-up is repeated.

The sampling time of the thermal displacement is coincide with "Tt" in the step S 3-102, and the step S 3-103~ and the step S 3-1000~ are processed in parallel relation to each other. The step S 3-1000 repeats the processing until the electric power source is turned off, regardless of the main processing.

In the step S 3-1000, adaptation processing of the aforesaid sampling time "Tt" of the thermal displacement of the ball screw is executed. If this processing is completed, the program is returned to the step S 3-102. In the step S 3-103, the amounts of thermal displacement are compared with each other and are operated by the aforesaid method. In a step S 3-104, judgment on which correction is required or not is decided on the basis of the following equation. That is, in the case of the error < the minimum movement setting unit, correction is not made. On the contrary, in the case of the error ≧ the minimum movement setting unit, the program proceeds to subsequent steps to execute correction (due to the aforementioned processing procedure of correction of the thermal displacement). In a step S 3-105, it is judged whether or not correction interruption is possible. A judgment standard is due to the aforesaid "processing timing of correction interruption". In the case where the interruption is possible, the program proceeds to the step S 3-108, while, in the case where the interruption is impossible, the program continues to subsequent steps where judgment on whether or not the interruption is possible is repeated.

In a step S 3-106, it is judged whether or not correction interruption can be made. A judging standard is due to the above-described step S 3-105. If the interruption is possible, the program proceeds to subsequent steps, while, if the interruption is impossible, the program is returned to the step S 3-106 where judgment on whether the interruption is possible is repeated. In a step S 3-107, the amounts of thermal displacement are operated in comparison by the aforesaid method. In the step S 3-108, the position data of each axis are corrected by the correction value, and the data of the thermal displacement are rewritten to this-time data. If the processing is completed, the program is returned to the step S 3-102 where the steps 3-102~108 are repeated.

In the step S 3-02, entirely automatic returning to the origin or returning to the origin due to manual operation by an operator is executed. In a step S 3-03, program load is executed, to record the processing program to the memory device of the numerical control apparatus. In a step S 3-04, a tool setup is executed in which tools required for the processing are mounted respectively on predetermined pots of a magazine on the basis of instructions from a processing program list or a tool list. In a step S 3-05, a workpiece setup is executed in which a workpiece is mounted on a reference position on a table. In a step S 3-06, a workpiece core or center is measured by a measuring probe in the form of an ATC/touch probe, and the measured workpiece center is inputted into a memory device of the numerical control apparatus (a workpiece reference position/manual operation). ① The measuring probe in the form of the touch probe is mounted on a spindle bore. ② The measuring probe in the form of the touch probe approaches the workpiece by manual rapid traverse. ③ X/Y four-point contact measurement is executed. ④ Z four-point contact measurement is executed. ⑤ Input by means of a measurement completion key is executed (X,Y and Z are operated by the main computing section of the numerical control apparatus, and the measurement is displayed on CRT. The workpiece core or center is stored in a workpiece-coordinate memory section of the memory device in the numerical control apparatus).

The step S 3-06 is completed, and a step S 3-07 ~ and a step S 3-201~ are processed in parallel relation to each other. From the steps 3-201~212, processing is repeated until the electric power source is turned off, regardless of the main processing.

In the step S 3-201, the measurement sampling-time counter of the machine position and the moving position starts. In a step S 3-302, it is judged whether or not the measurement sampling time of the machine position and the moving position is coincident with "Tp". In the case where the measurement sampling time is coincident with "Tp", the program is returned to a step S 3-203 and a step S 3-2000, while, in the case where the measurement sampling time is not coincident with "Tp", the program is returned to the step S 3-202 where the judgment on the counting-up is repeated. In the step S 3-202, the measurement sampling time of the machine position and the moving position is coincident with "Tp", and the step S 3-203~ and the step S 3-2000~ are processed in parallel relation to each other. In the step S 3-2000, the processing is repeated until the electric power source is turned off, regardless of the main processing.

In the step S 3-2000, adaptation processing of the aforesaid measurement sampling time "Tp" of the machine position and the moving position is executed. If this processing is completed, the program is returned to the step S 3-202. In the step S 3-203, the thermal displacement of the workpiece reference position is operated by the aforesaid method. In a step S 3-204, judgment on which displacement correction of the workpiece reference position is required or not is decided by the following equation. That is, in the case of the error < the permissible error value per time, correction is not made. The program is returned to the step S 3-202 where the steps 3-202~3-204 are repeated. On the contrary, in the case of the error ≧ the permissible error value per time, the program continues to subsequent steps in order for judging whether or not it is required to execute correction.

In a step S 3-205, operation is made in order to estimate or predict the displacement of the workpiece reference position until the entire processing is completed. The equation of the displacement of the workpiece reference position until the entire processing is completed: MwtTcf is as follows:

$$MwtTcf \propto \{|(\text{previous time})-(\text{this time})|/(Tp)^p\} \cdot k\{Tc-(\text{processing running time until now})\}^p$$

In a step S 3-206, it is judged whether or not an permissible value is exceeded. In the case of MwtTcf<D, which does not exceed the permissible value, the program is returned to the step S 3-202 where the steps 3-202~3-204 are repeated. In the case of MwtTcf >D, which exceeds the permissible value, the program continues to subsequent steps. In a step S 3-207, warning indicating that the error exceeds the permissible value is exhibited, and a warning sound is generated. In a step S 3-208, it is judged whether or not halt interruption is possible. A judging standard is due to the aforesaid "processing timing of halt interruption". In the case where the interruption is possible, the program proceeds to a step S 3-209, while, the interruption is impossible, the program is returned to the step S 3-208 where judgment as to whether or not the interruption is possible is repeated.

In the step S 3-209, the machine is halted. In a step S 3-210, it is judged whether or not the processing continues by the operator. In the case where the processing continues, the program proceeds to a step S 3-2101. In the case where the processing is interrupted to execute correction of the workpiece reference position, the program proceeds to subsequent steps. In a step S 3-211, displacement of the workpiece reference position is measured (measurement of the workpiece reference position, and operation of the error are executed). In the step S 3-212, the workpiece reference position is corrected on the basis of the results of the measurement of displacement of the workpiece reference position. The variety of the thermal displacement data of the workpiece reference position is rewritten to the this-time data, and the machine is again activated. If this processing is completed, the program is returned to the step S 3-202 where the processing is repeated (in the case where correction is executed, the data of the workpiece reference position are automatically rewritten to data after correction). In the step S 3-2101, release of the warning and start of activation are executed. If this processing is completed, the program is returned to the step S 3-202 where the processing is repeated.

In the step S 3-07, program check is executed, and pass check and machine lock are performed by the CRT so that trace check every one block and trace check of continuous block are executed. In a step S 3-08, signal-block processing is performed by a first step tool. In a step S 3-09, the locations processed in the first step are measured on the machine. In a step S 3-10, the results measured in the step S 3-09 are compared with designated dimensions, and an error therebetween is corrected by tool correction and coordinate correction. If there is no error, the program proceeds to a step S 3-17. In a step S 3-11, good or bad judgment is executed, and it is judged whether or not the measurement results are within the permissible value. In the case of "good", the program proceeds to a step S 3-19, while, in the case of "bad", the program proceeds to subsequent steps.

In a step S 3-12, judgment of presence of a finish margin is executed. In the case where there is the finish margin, the program proceeds to subsequent steps, while, in the case where there is no finish margin, the program proceeds to the step S 3-19. In a step S 3-13, a program search is performed where a start sequence number of the first step is searched. In a step S 3-14, only the processing by means of the first step tool is executed continuously. In a step S 3-15, reprocessed locations are measured on the machine. In a step S 3-16, the results measured in the step S 3-15 are compared with the designated dimensions, and an error therebetween is corrected by the tool correction and the coordinate correction. In the step S 3-17, good or bad judgment is executed. If the measurement results are "good", the program proceeds to the step S 3-19, while, if the measurement results are "bad", the program proceeds to subsequent steps.

In the a 3-18, judgment of presence of a finish margin is executed. In the case where there is the finish margin, processing from the step S 3-13 is repeated. In this connection, if loops exceed n times, the processing is brought to alarm processing. On the contrary, in the case where there is no finish margin, the program proceeds to subsequent steps. In the step S 3-19, it is judged whether or not there is presence of subsequent steps. If there are the subsequent steps, the program proceeds to the subsequent steps, while, if there are no subsequent steps, the program proceeds to a step S 3-21.

In a step S 3-20, the step S 3-08~ the step S 3-17 are repeated every an n step tool from a second step tool. Here, since processing of a first item has been completed, operation continues by the following procedure for next but one processing.

In the step S 3-21, the workpiece is demounted. In a step S 3-22, a location where the workpiece is mounted is cleaned. In a step S 3-23, presence of a non-processed workpiece is judged. In the case where there is the non-processed workpiece, the program proceeds to subsequent steps, while, in the case where there is no non-processed workpiece, the program is completed. In a step S 3-24, a setup of the workpiece is executed where a second workpiece is mounted. In a step S 3-25, setting is made so-as to be capable of entirely automatic running by operation such as single step-off, optional step-off or the like. In a step S 3-26, a cycle start button is depressed whereby the automatic running starts. In a step S 3-27, automatic workpiece centering is executed by a program in place of the manual operation in the step S 3-6 (workpiece reference position).

In a step S 3-28, one cycle entire processing is performed. In a step S 3-29, a measurement designated location of processing locations is measured. In a step S 3-30, the results measured in the step S 3-29 are compared with the designated dimensions, and errors therebetween are corrected by the tool correction and the coordinate correction. In a step S 3-31, good or bad judgment is executed. If the measurement results are "good", the program proceeds to a step S 3-39, while, in the case where the measurement results are "bad", the program proceeds to subsequent steps. In a step S 3-32, judgment on presence of a finish margin is executed. In the case where there is the finish margin, the program proceeds to subsequent steps, while, in the case where there is no finish margin, the program proceeds to the step S 3-39. In a step S 3-33, program search is conducted to call or invoke a sequence number of the reprocessed program.

In a step S 3-34, the processing program searched in the step S 3-33 starts, to process in refinishing defective locations of the dimension accuracy. In a step S 3-35, the locations reprocessed in the step S 3-34 are measured on the machine. In a step S 3-36, the results measured in the step S 3-34 are compared with designated dimensions, and an error therebetween is corrected by tool correction and coordinate correction. In a step S 3-37, good or bad judgment is executed. If the measurement results are "good", the program proceeds to the step S 3-39, while, if the measurement results are "bad" the program proceeds to subsequent steps. In the step S 3-38, judgment on presence of a finish margin is executed. In the case where there is the finish margin, processing from the step S 3-33 is repeated. In this connection, if loops exceed n times, the processing is brought to alarm processing. In the case where there is no finish margin, the program proceeds to subsequent steps. In the step S 3-39, the workpiece is demounted. In a step S 3-40, cleaning is made to a mark where the workpiece is demounted, and to chips scattering toward each section. If this processing is completed, the program is repeated from the step S 3-23.

(4) Workpiece-Mounting Reference-Block Position Correction Method

Figure 12:
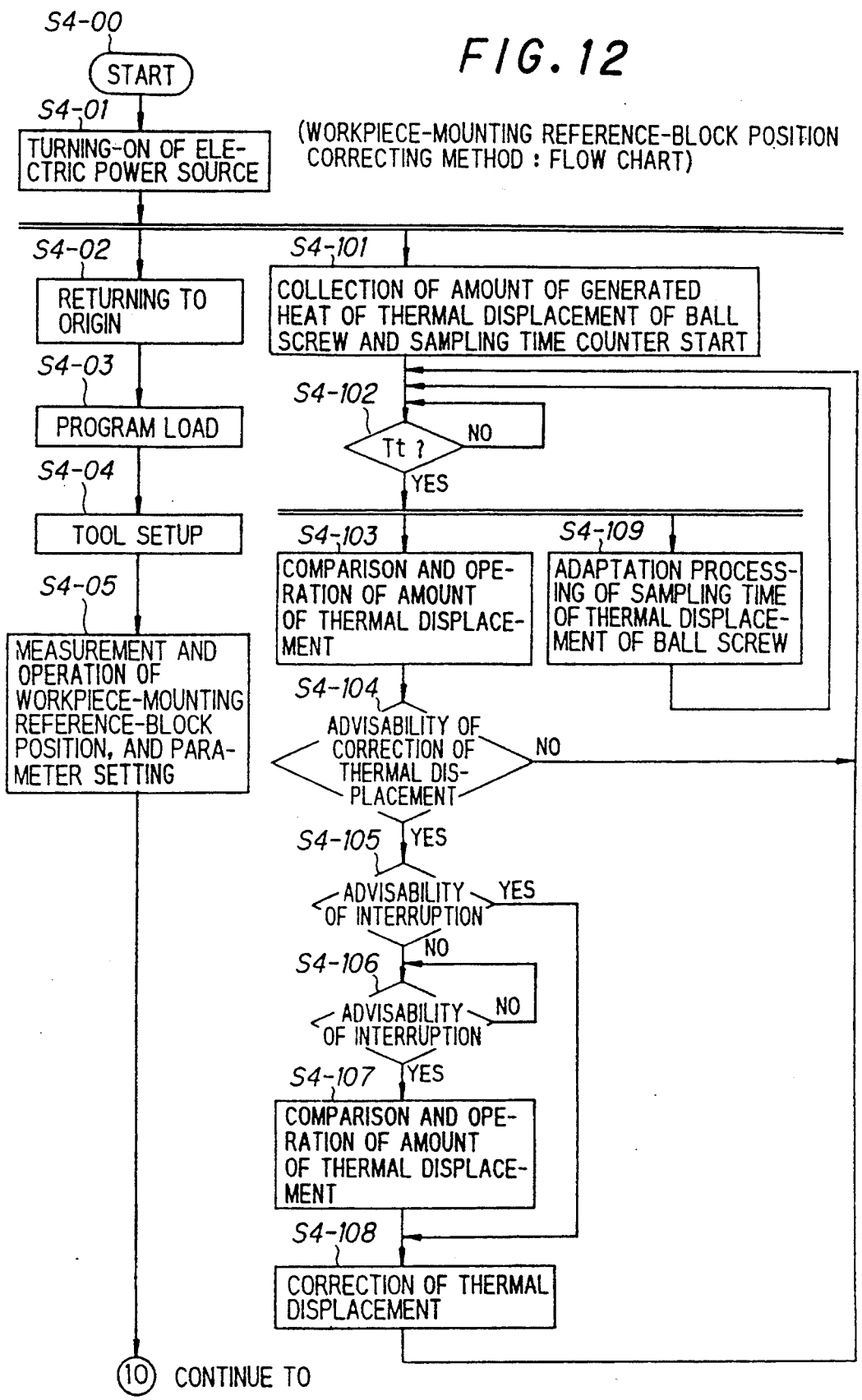
FIG. 12 is a flow chart showing operation of a workpiece-mounting reference-block position correcting method according to an embodiment of the invention.
Figure 13:
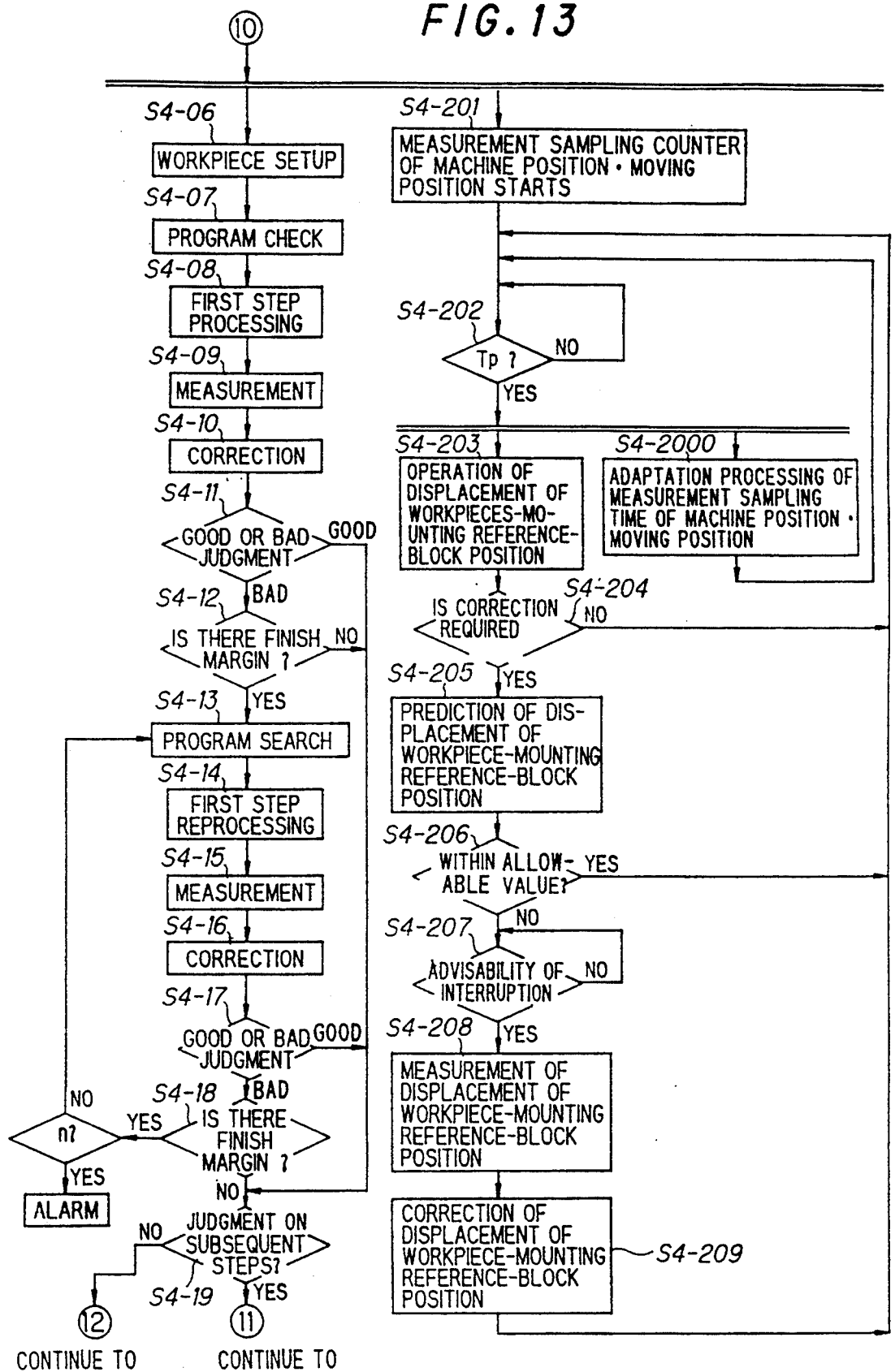
FIG. 13 is a flow chart showing operation of a workpiece-mounting reference-block position correcting method according to an embodiment of the invention.
Figure 14:
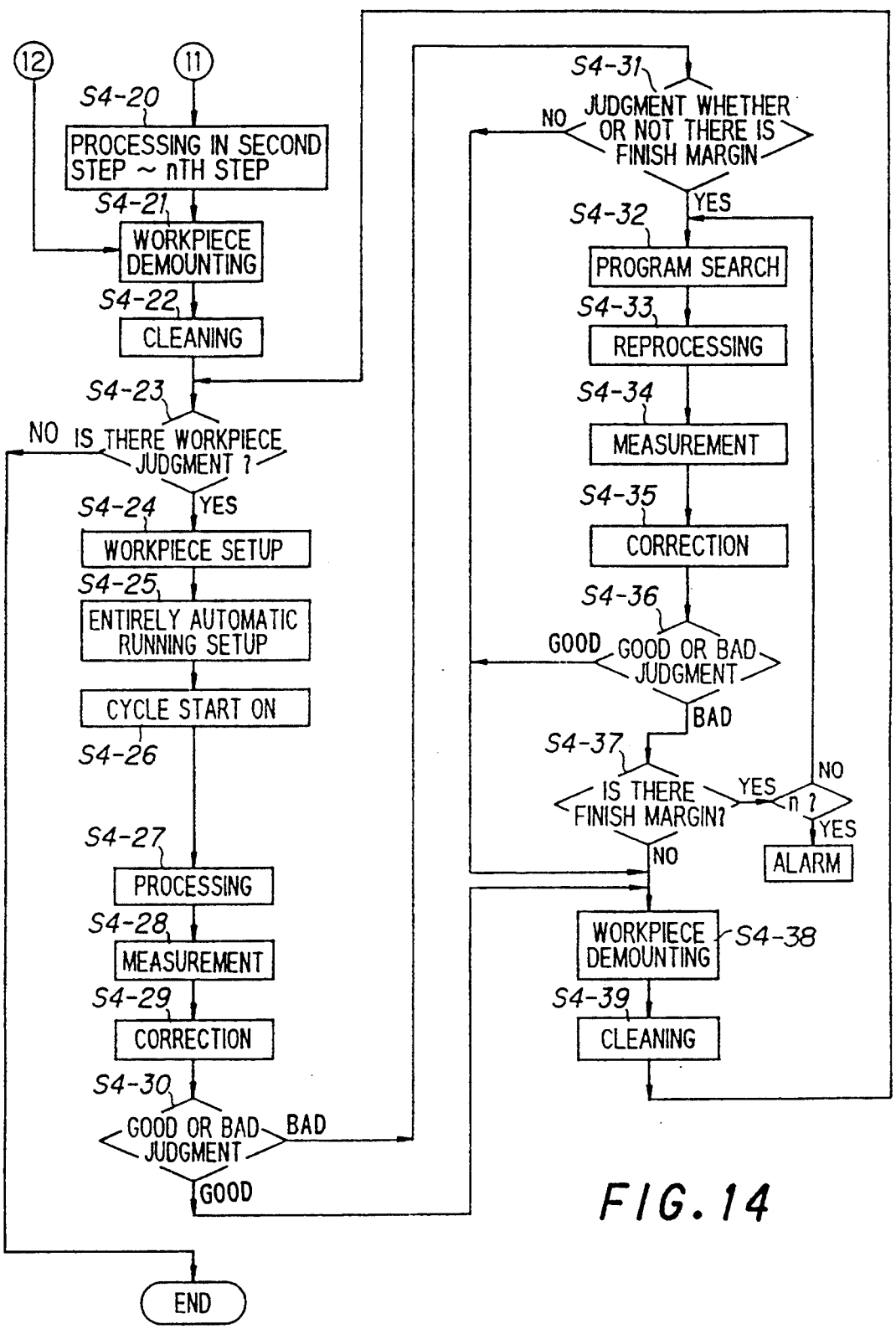
FIG. 14 is a flow chart showing operation of a workpiece-mounting reference-block position correcting method according to an embodiment of the invention.

The above method is a processing method in which a reference solid block is placed on the outside of the workpiece, and correction and measurement of a position can any time be executed with the reference solid block serving as a reference point. Operation procedure is practiced as follows by procedure shown in flow charts illustrated in FIGS. 12~14.

Operation starts in a step S 4-00. The electric power source is turned on in a step S 4-01. The numerical control apparatus and the programmable logic controller are initialized and readied up. The step S 4-01 is completed, and a step S 4-02~ and a step S 4-101~ are processed in parallel relation to each other. From the step S 4-101~ the step S 4-108, processing is repeated until the electric power source is turned off, regardless of the main processing.

In the step S 4-101, collection of the data of the amount of generated heat of the thermal displacement of the ball screw and sampling time counter of the thermal displacement start, and collection of the data of the amount of generated heat of the thermal displacement of the ball screw and the sampling time counter of the thermal displacement start. In a step S 4-102, it is judged whether or not the sampling time of the thermal displacement is coincident with "Tt". In the case where the sampling time is coincident with "Tt", the program proceeds to subsequent step S 4-103 and step S 4-1000. In the case where the sampling time is not coincident with "Tt", the program is returned to the step S 4-102, and judgment on counting-up is repeated. The sampling time of the thermal displacement is coincident with "Tt" in the step S 4-102, and the step S 4-103~ and the step S 4-1000~ are processed in parallel relation to each other. The step S 4-1000 repeats the processing until the electric power source is turned off, regardless of the main processing.

In the step S 4-1000, adaptation processing of the aforesaid thermal-displacement sampling time "Tt" of the ball screw is executed. If this processing is completed, the program is returned to the step S 4-102. In the step S 4-103, the amount of thermal displacement is operated in comparison by the aforesaid method. In a step S 4-104, judgment on which correction of the thermal displacement is required or not is decided by the following equation. That is, in the case of the error < the minimum movement setting unit, correction is not made. On the contrary, in the case of the error ≧ the minimum movement setting unit, the program proceeds to subsequent steps in order to execute correction (due to the aforesaid thermal-displacement correction processing procedure). In a step S 4-105, it is judged whether or not correction interruption can be made. A judging standard is due to the aforementioned "processing timing of correction interruption". In the case where the interruption is possible, the program proceeds to the step S 4-108, while, in the case where the interruption is impossible, the program continues to subsequent steps where good or bad judgment on the interruption is repeated.

In a step S 4-106, it is judged whether or not the correction interruption is possible. A judging standard is due to the above-described step S 4-105. In the case where the interruption is possible, the program proceeds to a subsequent step, while in the case where the interruption is impossible, the program is returned to the step S 4-106 where judgment on advisability or propriety of the interruption is repeated. In a step S 4-107, the amounts of thermal displacement are operated in comparison by the aforesaid method. In the step S 4-108, the position data of each axis are corrected by the correction value, and the variety of thermal displacement data is rewritten to this-time data. If the processing is completed, the program is returned to the step S 4-102, and the step S 4-102~ the step S 4-108 are repeated.

In the step S 4-02, entirely automatic returning to the origin or returning to the origin due to manual operation by an operator is executed. In a step S 4-03, a program load is executed in which a processing program is recorded into the memory device of the numerical control apparatus. In a step S 4-04, a tool setup is executed in which tools required for the processing are mounted respectively on predetermined pots of a magazine on the basis of instructions from a processing program list or a tool list. Further, in a step S 4-05, measurement and operation of a workpiece-mounting reference-block position, and parameter setting are executed. The workpiece-mounting reference-block position is measured, and the measured workpiece-mounting reference-block position is written, as a parameter, into the workpiece-mounting reference-block position memory section of the memory device section after the position has been operated. In this manner, initialization of the workpiece-mounting reference-block position has been completed. The step S 4-05 has been completed, and a step S 4-06~ and a step S 4-201 are processed in parallel relation to each other. From the step S 4-201~ the step S 4-212, the processing is repeated until the electric power source is turned off, regardless of the main processing.

In the step S 4-201, the measurement sampling-time counter of the machine position and the moving position starts. In a step S 4-202, it is judged whether or not the measurement sampling time of the machine position and the moving position is coincident with "Tp". In the case where the measurement sampling time is coincident with "Tp", the program proceeds to a step S 4-203 and a step S 4-2000, while, in the case where the measurement sampling time is not coincident with "Tp", the program is returned to the step S 4-202 where the judgment on the counting-up is repeated. In the step S 4-202, the measurement sampling time of the machine position and the moving position is coincident with "Tp", and the step S 4-203~ and the step S 4-2000~ are processed in parallel relation to each other. In the step S 4-2000, the processing is repeated until the electric power source is turned off, regardless of the main processing.

In the step S 4-2000, adaptation processing of the aforesaid measurement sampling time "Tp" of the machine position and the moving position is executed. If this processing is completed, the program is returned to the step S 4-202. In the step S 4-203, the amounts of thermal displacement of the workpiece-mounting reference-block position are operated by the aforesaid method. In a step S 4-204, judgment on advisability or propriety of the correction of the displacement of the workpiece-mounting reference-block position is decided by the following equation. That is, in the case of the error < the permissible error value per time, no correction is made and the program is returned to the step S 4-202 so that the steps 4-202~204 are repeated. On the contrary, in the case of the error ≧ the permissible error value per time, correction is made, and the program proceeds to subsequently steps for judgment on presence of the necessity.

In a step S 4-205, operation is made in order to predict displacement of the workpiece-mounting reference-block position until the entire processing is completed. The displacement of the workpiece-mounting reference-block position until the entire processing is completed: MwbtTcf is due to the following equation:

MwbtTcf{|(previous time)−(this time)|/(Tp)$^p$}·k{Tc−(processing running time until now)}$^p$ In a step S 4-206, it is judged whether or not the permissible value is exceeded. If the case of MwbtTcf<D, in which the permissible value is not exceeded, the program is returned to the step S 4-202, and the steps 4-202~4-204 are repeated. On the contrary, if MwbtTcf>D, in which the permissible value is exceeded, the program continues to subsequent steps. In a step S 4-207, it is judged whether or not measuring interruption is possible. A judgment standard is as follows. That is, the measurement interruption of the workpiece-mounting reference-block position is always executed during running other than automatic running. If the measurement interruption is executed during processing and during automatic running, inferiority in shape, dimension, finish surface or the like will occur due to biting of a processing tool, shift or deviation of a processing position in the case of reprocessing or the like. For this reason, the measurement interruption of the workpiece-mounting reference-block position cannot be executed till completion of processing locations and groups of processings during processing. Accordingly, the measurement interruption of the workpiece-mounting reference-block position is prepared including the promise items of breaks in the processing program, and is executed during processing and during automatic running in addition to running other than the automatic running. For example, it is possible to use, as the breaks, ① signals of tool replacement, ② discontinuity of sequence numbers, ③ every one of fixed cycles, ④ connection between program links, ⑤ previous time of the finish-start block of the lap cycle, and the like. In the case where the interruption is possible, the program proceeds to a step S 4-209, while in the case where the interruption is impossible, the program is returned to the step S 4-207 so that judgment on advisability is or propriety of the interruption repeated.

In a step S 4-208, displacement of the workpiece-mounting reference-block position is measured (measurement of the workpiece-mounting reference-block position, and error operation are executed). In the step S 4-209, the workpiece-mounting reference-block position is corrected on the basis of the results in which the displacement of the workpiece-mounting reference-block position is measured. The variety of the thermal displacement data at the workpiece-mounting reference-block position is rewritten to this-time data, and the machine is again activated. If this processing is completed, the program is returned to the step S 4-202 where the processing is repeated (in the case where correction is made, the data of the workpiece-mounting reference-block position are automatically rewritten to data after correction).

In the step S 4-06, a workpiece setup is executed in which a workpiece is mounted on the workpiece-mounting reference-block position. In a step S 4-07, program check is executed. Pass check and machine lock by means of CRT are performed so that trace check every one block and trace check of continuous blocks are conducted. In a step S 4-08, single-block processing is executed by a first step tool. In a step S 4-09, locations processed in the first step are measured on the machine. In a step S 4-10, the results measured in the step S 4-09 are compared with the designated dimensions, and errors therebetween are corrected by the tool correction and the coordinate correction. If there are no errors, the program proceeds to a step S 4-17.

In a step S 4-11, good or bad judgment is executed. It is judged whether or not the measuring results are within the permissible value. In the case of "good", the program proceeds to the step S 4-19, while, in the case of "bad", the program proceeds to subsequent steps. In a step S 4-12, judgment of presence of a finish margin is executed. In the case where there is the finish margin, the program proceeds to subsequent steps, while, in the case where there is no finish margin, the program proceeds to a step S 4-19. In a step S 4-13, program search is conducted
to search a start sequence number of the first step. In a step S 4-14, only the processing by the first step tool continues. In a step S 4-15, the reprocessed locations are measured on the machine. In a step S 4-16, the results measured in the step S 4-14 are compared with designated dimensions, and errors therebetween are corrected by tool correction and coordinate correction.

In the step S 4-17, good or bad judgment is executed. If the measuring results are "good", the program proceeds to the step S 4-19, while, if the measuring results are "bad", the program proceeds to subsequent steps. In a step S 4-18, judgment of presence of a finish margin is executed. In the case where there is the finish margin, the processing is repeated from the step S 4-13. In this connection, if loops exceed n times, the processing is brought to alarm processing. On the contrary, in the case where there is no finish margin, the program proceeds to subsequent steps. In the step S 4-19, it is judged whether or not there are subsequent steps. If there are the subsequent steps, the program proceeds to subsequent steps, while, if there are no subsequent steps, the program proceeds to a step S 4-21.

In a step S 4-20, the step S 4-08 ~ the step S 4-19 are repeated every nth step tool from the second step tool. Since processing of a first item is completed, operation continues by the following procedure for next but one processing. In the step S 4-21, the workpiece is demounted. In a step S 4-22, the workpiece mounting location is cleaned. In a step S 4-23, presence of a non-processed workpiece is judged. In the case where there is the non-processed workpiece, the program proceeds to subsequent steps, while, in the case where there is no non-processed workpiece, the program is completed. In a step S 4-24, a setup of the workpiece is executed, and a second workpiece is mounted. In a step S 4-25, setting is made so as to be capable of entirely automatic running by operation such as single step-off, optional step-off or the like. Further, in a step S 4-26, a cycle start button is depressed whereby the automatic running starts.

In a step S 4-27, one cycle entire processing is performed. In a step S 4-28, a measurement designated location of processing locations is measured. In a step S 4-29, the results measured in the step S 4-27 are compared with the designated dimensions, and errors therebetween are corrected by the tool correction and the coordinate correction. In a step S 4-30, good or bad judgment is executed. If the measurement results are "good", the program proceeds to a step S 4-38, while, in the case where the measurement results are "bad", the program proceeds to subsequent steps. In a step S 4-31, judgment on presence of a finish margin is executed. In the case where there is the finish margin, the program proceeds to subsequent steps, while, in the case where there is no finish margin, the program proceeds to the step S 4-38. In a step S 4-32, program search is conducted to call or invoke a sequence number of the reprocessed program. In a step S 4-33, the processing program searched in the step S 4-32 starts, and locations defective in dimension accuracy are again finish-processed.

In a step S 4-34, the reprocessed locations are measured on the machine. In a step S 4-35, the results measured in the step S 4-34 are compared with the designated dimensions, and errors therebetween are corrected by the tool correction and the coordinate correction. In a step S 4-36, good or bad judgment is executed. If the measuring results are "good", the program proceeds to the step S 4-38, while, if the measuring results are "bad", the program proceeds to subsequent steps. In a step S 4-37, judgment on presence of a finish margin is executed. In the case where there is the finish margin, the program is repeated from the step S 4-32. In this connection, if loops exceed n times, the processing is brought to alarm processing. In the case where there is no finish margin, the program proceeds to subsequent steps. In the step S 4-38, the workpiece is demounted. In a step S 4-39, cleaning is made to a mark where the workpiece is demounted, and to chips scattering toward each section. If this processing is completed, the program is returned to the step S 4-23 so that the processing is repeated.

Figure 15:
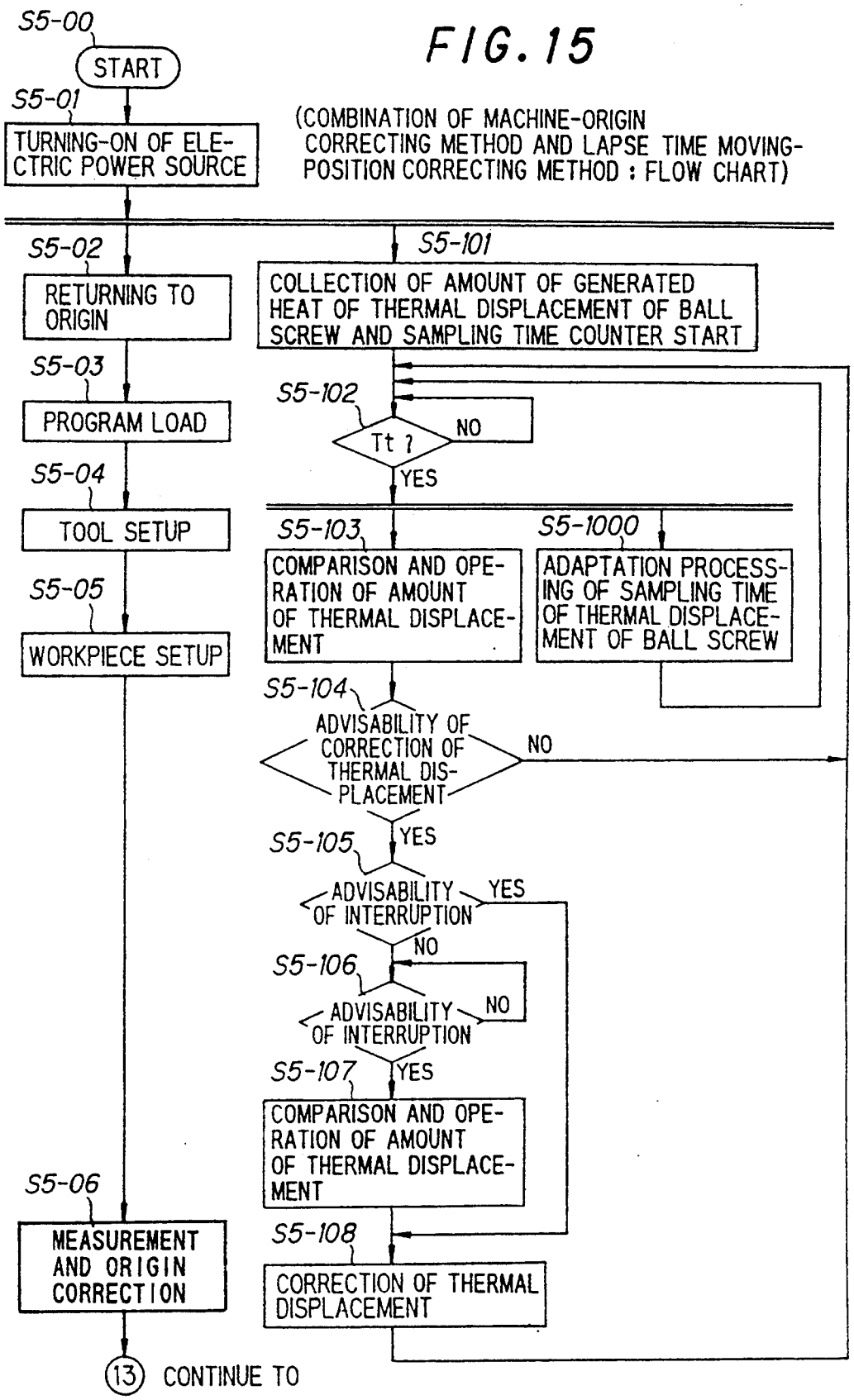
FIG. 15 is a flow chart showing operation due to combination of the machine-origin correcting method-1 and a lapse-time moving-position correcting method, according to an embodiment of the invention.
Figure 16:
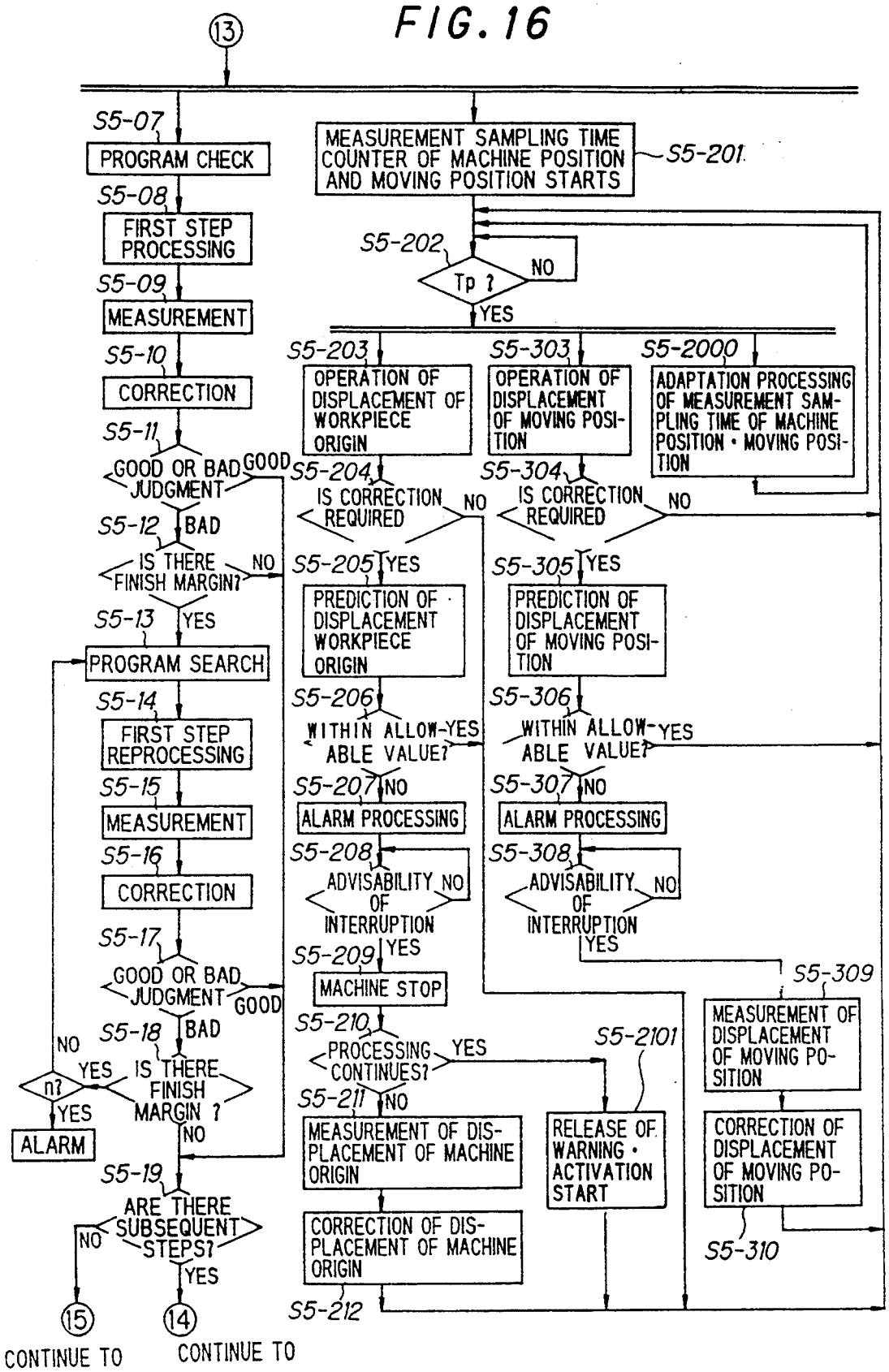
FIG. 16 is a flow chart showing operation due to combination of the machine-origin correcting method-1 and a lapse-time moving-position correcting method, according to an embodiment of the invention.
Figure 17:
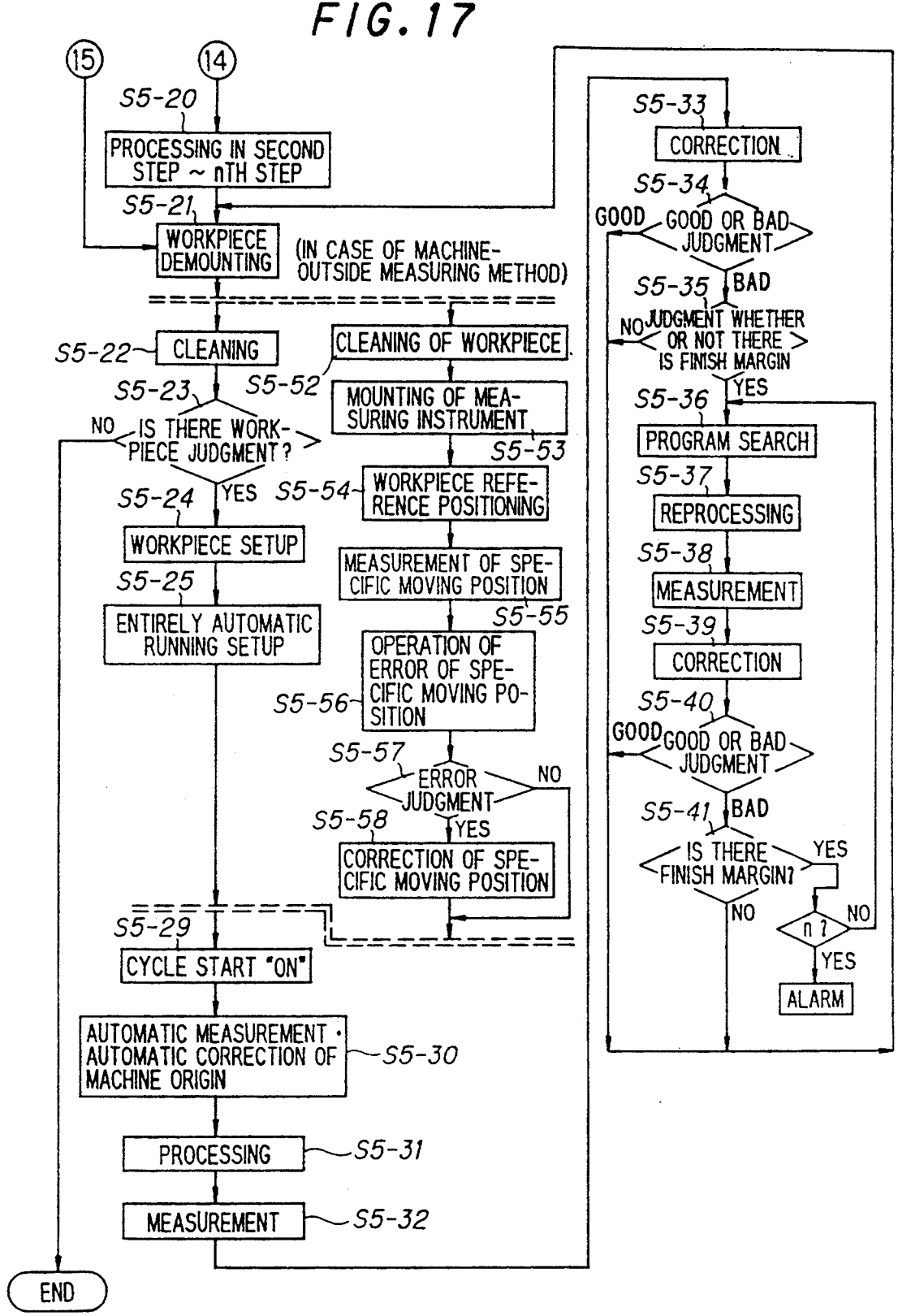
FIG. 17 is a flow chart showing operation due to combination of the machine-origin correcting method-1 and a lapse-time moving-position correcting method, according to an embodiment of the invention.

In the moving-position correction method, actual operation is executed in combination with conducting the lapse-time moving-position correction method or the every-processing moving-position correction method, in addition to each processing of the aforesaid machine-origin correcting method-1, the aforesaid machine-origin correcting method-2, the aforementioned workpiece reference-position correcting method, and the aforementioned workpiece-mounting reference-block position correcting method. Description will be made in combination with the machine-origin correcting method-1 with description of all combinations summarized. (5) combination of Machine Origin-Position Correcting Method-1 And Lapse-Time Moving-Position Correcting Method The machine origin is checked before every processing, and the position of the specific processing section is corrected every time. Operation procedure is executed as follows in accordance with the procedure shown in flow charts illustrated respectively in FIGS. 15~17.

Operation starts in a step S 5-00. An electric power source is turned on in a step S 5-01. A numerical control apparatus and a programmable logic controller are initialized and readied up. The step S 5-01 is completed, and a step S 5-02~ and a step S 5-101 101 ~ are processed in parallel relation to each other. From the step S 5-101~ a step S 5-108, processing is repeated until the electric power source is turned off, regardless of the main processing.

In the step S 5-101, collection of the data of the amount of generated heat of the thermal displacement of the ball screw and sampling time counter of the thermal displacement start. In a step S 5-102, it is judged whether or not the sampling time of the thermal displacement is coincident with "Tt". In the case where the sampling time is coincident with "Tt", the program proceeds to subsequent step S 5-103 and step S 5-1000. In the case where the sampling time is not coincident with "Tt", the program is returned to the step S 5-102, and judgment on counting-up is repeated. The sampling time of the thermal displacement is coincident with "Tt" in the step S 5-102, and the step S 5-103~ and the step S 5-1000~ are processed in parallel relation to each other. The step S 5-1000 repeats the processing until the electric power source is turned off, regardless of the main processing.

In the step S 5-1000, adaptation processing of the aforesaid sampling time "Tt" of the thermal displacement of the ball screw is executed. If this processing is completed, the program is returned to the step S 5-102. In the step S 5-103, the amounts of thermal displacement are compared with each other and are operated by the aforesaid method. In a step S 5-104, judgment on advisability or propriety of the thermal-displacement correction is decided by the following equation. That is, in the case of the error<the minimum movement setting unit, no correction is made. On the contrary, in the case of the error≧the minimum movement setting unit, the program proceeds to subsequently steps in order to execute correction (due to the aforementioned processing procedure of correction of the thermal displacement). In a step S 5-105, it is judged whether or not correction interruption can be made. A judgment standard is due to the aforesaid "processing timing of correction interruption". In the case where the interruption is possible, the program proceeds to the step S 5-108, while, in the case where the interruption is impossible, the program continues to subsequent steps where judgment on whether or not the interruption is possible is repeated.

In a step S 5-106, it is judged whether or not the correction interruption is possible. The judging standard is due to the above-described step S 5-105. In the case where the interruption is possible, the program proceeds to subsequent steps, while in the case where the interruption is impossible, the program is returned to the step S 5-106 where judgment on advisability or propriety of interruption is repeated. The amounts of thermal displacement are compared with each other and are operated in a step S 5-107. In the step S 5-108, the position data of each axis are corrected by the correction value, and the variety of thermal displacement data is rewritten to this-time data. If the processing is completed, the program is returned to the step S 5-102, and the step S 5-102~ the step S 5-108 are repeated.

In the step S 5-02, entirely automatic returning to the origin or returning to the origin due to manual operation by an operator is executed. In a step S 5-03, a program load is executed in which a processing program is recorded into the memory device of the numerical control apparatus. In a step S 5-04, a tool setup is executed in which tools required for the processing are mounted respectively on predetermined pots of a magazine on the basis of instructions from a processing program list or a tool list. Further, in a step S 5-05, a workpiece setup is executed in which a workpiece is mounted on a reference position on a table. In a step S 5-06, initialization of machine-origin measurement/automatic correction is executed. The step S 5-06 is completed, and a step S 5-07~ and a step S 5-201~ and the machine origin-position displacement processing: a step S 5-203~ and the moving-position displacement processing: a step S 5-303 are processed in parallel relation to each other. Till the step S 5-201~ a step S 5-212 and the step S 5-303~ a step S 5-308, the processing is repeated until the electric power source is turned off, regardless of the main processing.

In the step S 5-201, the measurement sampling-time counter of the machine position and the is moving position starts. In a step S 5-202, it judged whether or not the measurement sampling time of the machine position and the moving position is coincident with "Tp". In the case where the measurement sampling time is coincident with "Tp", the program is returned to the step S 5-203 and the step S 5-2000, while, in the case where the measurement sampling time is not coincident with "Tp", the program is returned to the step S 5-202 where the judgment on the counting-up is repeated. In the step S 5-202, the measurement sampling time of the machine position and the moving position is coincident with "Tp", and the step S 5-203~, the step S 5-303~ and a step S 5-2000~ are processed in parallel relation to each other. In the step S 5-203~ the step S 5-212, the step S 5-303~ a step S 5-310 and the step S 5-2000, the processing is repeated until the electric power source is turned off, regardless of the main processing.

In the step S 5-2000, adaptation processing of the aforesaid measurement sampling time "Tp" of the machine position and the moving position is executed. If this processing is completed, the program is returned to the step S 5-202. In the step S 5-203, the thermal displacement of the machine origin is operated by the aforementioned method. In a step S 5-204, judgment on which displacement correction of the machine origin is required or not is decided on the basis of the following equation. That is, in the case of the error<the permissible error value per time, no correction is made. The program is returned to the step S 5-202, and the steps 5-202~ the step S 5-204 are repeated. On the contrary, in the case of the error≧the permissible error value per time, the program continues to subsequent steps for judgment on presence of necessity of the correction.

In a step S 5-205, operation is made in order to predict displacement of the machine origin until the entire processing is completed, on the basis of the aforesaid equation (MotTcf). In a step S 5-206, it is judged whether or not the permissible value is exceeded. That is, in the case of MotTcf<D in which the permissible value is not exceeded, the program is returned to the step S 5-202, and the steps 5-202~204 are repeated. In the case of MotTcf>D in which the permissible value is exceeded, the program continues to subsequent steps. In a step S 5-207, a warning suggesting the fact that the error exceeds the permissible value is exhibited, and a warning sound is generated. In a step S 5-208, it is judged whether or not halt interruption is possible. A judgment standard is due to the aforesaid "processing timing of the halt interruption". In the case where the interruption is possible, the program proceeds to a step S 5-209, while in the case where the interruption is impossible, the program is returned to the step S 5-208 where judgment on advisability or propriety of the interruption is repeated.

In the step S 5-209, the machine is halted. In a step S 5-210, it is judged whether or not the processing continues by the operator. In the case where the processing continues, the program proceeds to a step S 5-2101. In the case where the processing is interrupted to execute correction of the machine origin, the program proceeds to subsequent steps. In a step S 5-211, displacement of the machine origin is measured (measurement of the machine origin, and operation of the error are executed). In the step S 5-212, the machine origin is corrected on the basis of the results in which displacement of the machine origin is measured. The variety of the thermal displacement data of the machine origin is rewritten to the this time data, and the machine is again activated. If this processing is completed, the program is returned to the step S 5-202 to repeat the processing (in the case where correction is executed, the data of the machine origin are automatically rewritten to data after correction). In the step S 5-2101, release of the warning and start of reactivation are executed. If this processing is completed, the program is returned to the step S 5-202 where the processing is repeated.

In the step S 5-303, the thermal displacement of the moving position is operated. In a step S 5-304, judgment as to whether or not the moving-position displacement correction is required is decided on the basis of the following equation. That is, the amounts of thermal displacement are compared with each other. In the case of errors of $|(\text{previous time}) - (\text{this time})|/(Tt)^P < (D/k1) <$ the permissible error value per time, no correction is made. The program is returned to the step S 5-202 where the step S 5-202~ the step S 5-304 are repeated. On the contrary, in the case of errors of $|(\text{previous time}) - (\text{this time})|/(Tt)^P \geq (D/k1) \geq$ the permissible error value per time, the program proceeds to subsequent steps for judgment as to whether or not there is necessity that correction is executed. In a step S 5-305, operation is practiced in order to predict displacement of the non-processed entire specific moving position until the entire processing is completed. The displacement of the moving position until the entire processing is completed: MmtTcf is obtained by the following equation:

$$\text{MmtTcf} \propto \{|(\text{previous time}) - (\text{this time})|/(Tp)^P\} \cdot k\{Tc - (\text{processing running time until now})\}^P$$

The equation of MmtTsf, which will be described later, is due to the above equation.

In a step S 5-306, it is judged whether or not an permissible value is exceeded. In the case of MmtTcf<D, which does not exceed the permissible value, the program is returned to the step S 5-202 where the step S 5-202~ the step S 5-304 are repeated. On the contrary, in the case of MmtTcf>D, which exceeds the permissible value, the program continues to subsequent steps in which the aforesaid processing of "Mmt: Moving-position correction" is executed. In a step S 5-307, warning indicating that the error exceeds the permissible value is exhibited, and a warning sound is generated. In the step S 5-308, it is judged whether or not measuring interruption is possible. A judging standard is due to the aforesaid "processing timing of measuring interruption". In the case where the interruption is possible, the program proceeds to a step S 5-309, while, the interruption is impossible, the program is returned to the step S 5-308 where judgment as to whether or not the interruption is possible is repeated.

In the step S 5-309, displacement of the moving position is measured. In the step S 5-310, the moving position is corrected by the results in which the displacement of the moving position is measured. The variety of the thermal displacement data of the moving position is rewritten to this-time data, and the machine is again activated. If this processing is completed, the program is returned to the step S 5-202 where the processing is repeated (in the case where correction is made, the data of the moving position are automatically rewritten to data after correction). In this parallel processing, simultaneous processing is impossible because a measuring device for measuring the machine origin and a measuring device which executes measuring of the moving position are the same as each other. Accordingly, the moving-position measurement is executed after correction of the machine origin, as a promise in which the machine-origin measurement has priority.

In the step S 5-07, program check is executed. Pass check and machine lock by means of CRT are performed so that trace check every one block and trace check of continuous blocks are conducted. In a step S 5-08, single-block processing is executed by a first step tool. In a step S 5-09, locations processed in the first step are measured on the machine. In a step S 5-10, the results measured in the step S 5-09 are compared with the designated dimensions, and errors therebetween are corrected by the tool correction and the coordinate correction. If there are no errors, the program proceeds to a step S 5-17. In a step S 5-11, good or bad judgment is executed. It is judged whether or not the measuring results are within the permissible value. In the case of "good", the program proceeds to a step S 5-19, while, in the case of "bad", the program continues to subsequent steps.

In a step S 5-12, judgment of presence of a finish margin is executed. In the case where there is the finish margin, the program proceeds to subsequent steps, while, in the case where there is no finish margin, the program proceeds to the step S 5-19. In a step S 5-13, program search is conducted to search a start sequence number in the first step. In a step S 5-14, only the processing by the first step tool continues. In a step S 5-15, the reprocessed locations are measured on the machine. In a step S 5-16, the results measured in the step S 5-15 are compared with designated dimensions, and errors therebetween are corrected by tool correction and coordinate correction.

In the step S 5-17, good or bad judgment is executed. If the measuring results are "good", the program proceeds to the step S 5-19, while, if the measuring results are "bad", the program proceeds to subsequent steps. In a step S 5-18, judgment of presence of a finish margin is executed. In the case where there is the finish margin, the is program is repeated from the step S 5-12. In this connection, if loops exceed n times, the processing is brought to alarm processing. On the contrary, in the case where there is no finish margin, the program proceeds to subsequent steps. In the step S 5-19, it is executed to judge presence of the subsequent steps. If there are the subsequent steps, the program proceeds to subsequent steps, while, if there are no subsequent steps, the program proceeds to a step S 5-21.

In a step S 5-20, the step S 5-08 ~ the step S 5-19 are repeated every nth step tool from the second step tool. Since processing of a first item is completed, operation continues by the following procedure for next but one processing. In the step S 5-21, the workpiece is demounted (in the case of the machine-outside measuring method). In a step S 5-52, the workpiece is cleaned. In a step S 5-53, the workpiece is mounted on a measuring unit. In a step S 5-54, a reference position of the workpiece is decided, which serves as a reference point of measurement. In a step S 5-55, a specific moving position is measured by machine-outside measurement. In a step S 5-56, the errors of the specific moving position are operated on the basis of the results measured in the step S 5-55. In a step S 5-57, it is judged whether or not the position correction is required by the errors. In the case where it is necessary to execute correction, the program proceeds to subsequent steps, while, in the case where no correction is required, the program proceeds to a step S 5-29. In a step S 5-58, the specific moving position data of the numerical control apparatus are corrected.

In connection with the above, the machine-outside measurement includes a method in which a conventional measuring instrument such as a micrometer, an indicator side-calipers or the like is used to conduct the measurement, in addition to the method described here.

Subsequent step S 5-22 ~ step S 5-25 can be processed in parallel relation to the aforesaid step S 5-52 ~ step S 5-58. In the step S 5-22, a location where the workpiece is mounted is cleaned. In the step S 5-23, it is judged whether or not there are non-processed workpieces. In the case where there are the non-processed workpieces, the program proceeds to subsequent steps, while, in the case where there are no non-processed workpieces, the program is completed. In the step S 5-24, workpiece setup is conducted, and a second workpiece is mounted. In the step S 5-25, setting is made so as to be capable of entirely automatic running by operation such as single step-off, optional step-off or the like.

In the step S 5-29, a cycle start button is depressed whereby the automatic running starts. Together with the cycle start, ① the amount of thermal displacement is compared. That is, in the case where $|(this\ time)-(previous\ time)|/(Tp)^p$ is equal to or larger than $D/k1$, the program proceeds to subsequent steps, while, $|(this\ time)-(previous\ time)|/(Tp)^p$ is smaller than $D/k1$, the program proceeds to a step S 5-31.

In a step S 5-30, the machine origin is automatically measured and, subsequently, operation is made on the basis of the following equation to execute correction and rewriting of the data. ① In the case of measurement and operation: errors < the minimum movement unit, no correction is made. In the case of errors-the minimum movement unit, correction is made as a rule. In the case, however, where the results in which the displacement of the machine origin until the entire processing is completed is operated by the equation of MotTcf are within the permissible value D, no correction is made (in the case where correction is made, the machine position data are automatically rewritten to data after correction). ② In the case where correction is made, the variety of thermal displacement data is rewritten to this-time data.

In the step S 5-31, the one-cycle entire processing is executed. In a step S 5-32, the measurement designated location of the processing locations is measured. In a step S 5-33, the results measured in the step S 5-32 are compared with designated dimensions, and errors therebetween are corrected by tool correction and coordinate correction. In a step S 5-34, good or bad judgment is executed. If the measurement results are "good", the program proceeds to the step S 5-21, while, if the measurement results are "bad", the program proceeds to subsequent steps. In a step S 5-35, judgment of presence of a finish margin is executed. In the case where there is the finish margin, the program proceeds to subsequent steps, while, in the case where there is no finish margin, the program proceeds to the step S 5-21. In a step S 5-36, program search is conducted to call or invoke a sequence number of the reprocessed program. In a step S 5-37, the processing program searched in the step S 5-36 starts, and locations defective in dimension accuracy are again finish-processed. In a step S 5-38, the reprocessed locations are measured on the machine. In a step S 5-39, the results measured in the step S 5-38 are compared with the designated dimensions, and errors therebetween are corrected by the tool correction and the coordinate correction.

In a step S 5-40, good or bad judgment is executed. If the measuring results are "good", the program proceeds to the step S 5-21, while, if the measuring results are "bad", the program proceeds to subsequent steps. In a step S 5-41, judgment on presence of a finish margin is executed. In the case where there is the finish margin, processing is repeated from the step S 5-36. In this connection, if loops exceed n times, the processing is brought to alarm processing. On the contrary, in the case where there is no finish margin, the program is returned to the step S 5-21 where processing is repeated.

Figure 18:
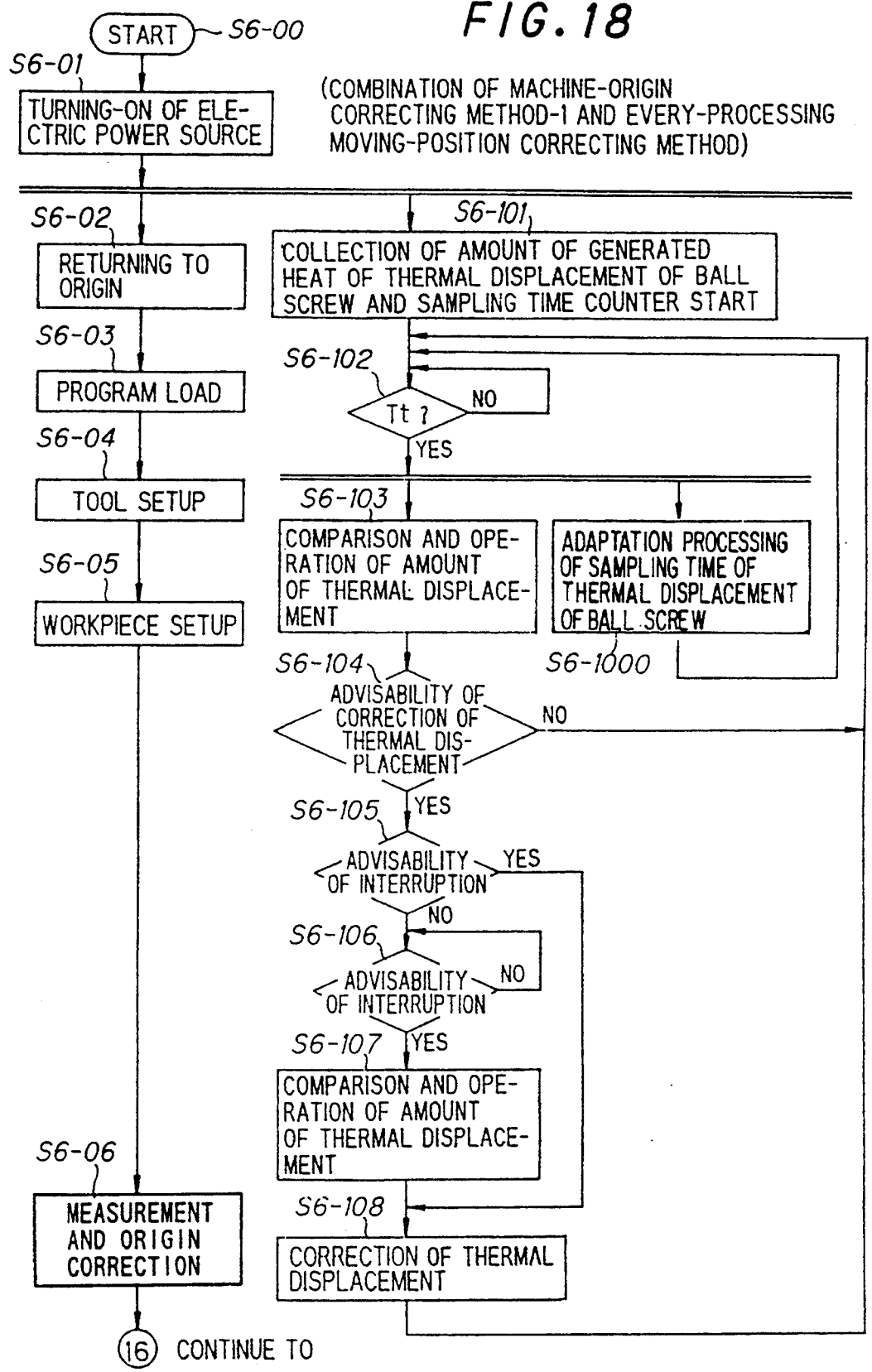
FIG. 18 is a flow chart showing operation due to combination of the machine-origin correcting method-1 and an every-processing moving-position correcting method, according to an embodiment of the invention.
Figure 19:
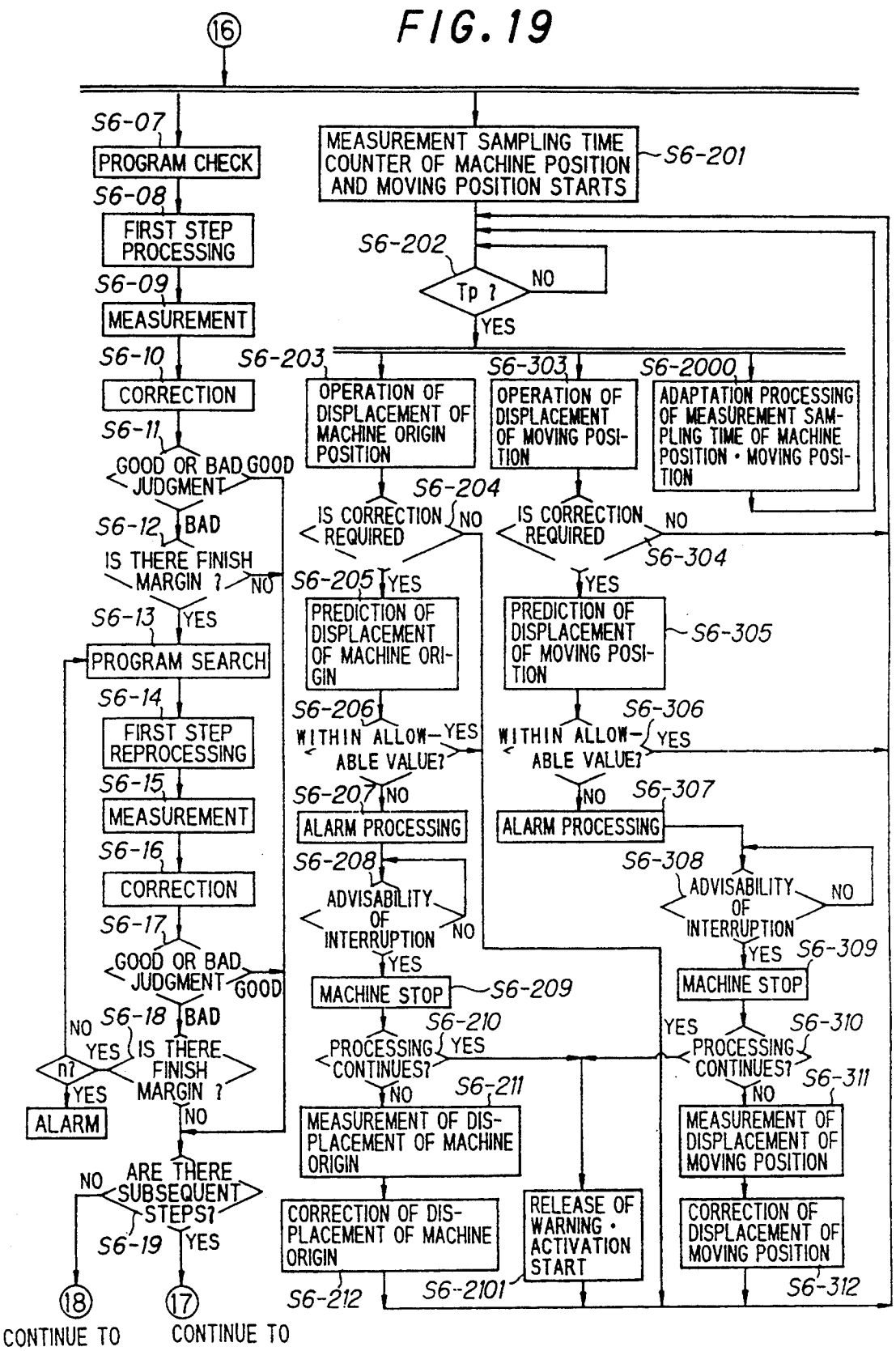
FIG. 19 is a flow chart showing operation due to combination of the machine-origin correcting method-1 and an every-processing moving-position correcting method, according to an embodiment of the invention.
Figure 20:
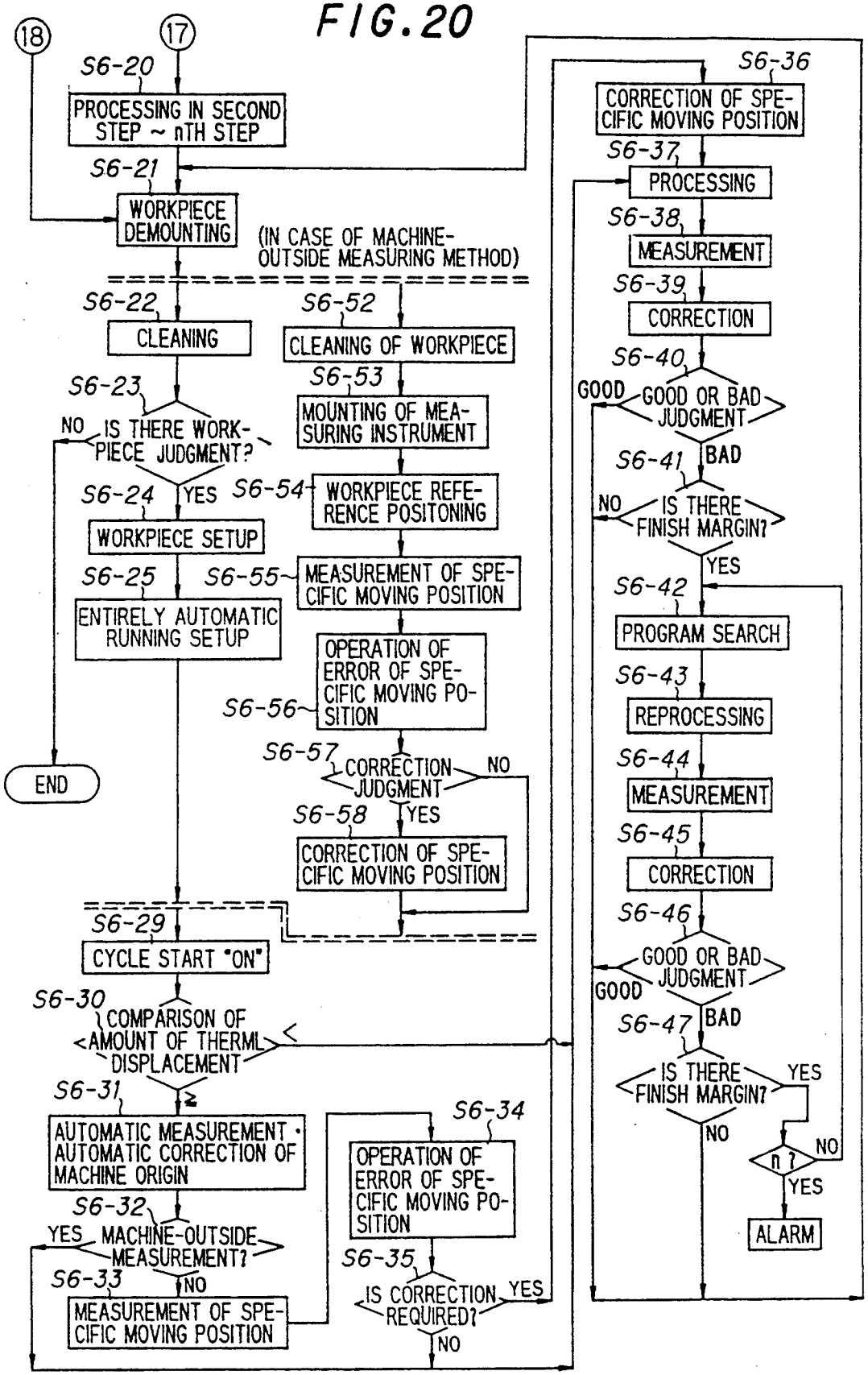
FIG. 20 is a flow chart showing operation due to combination of the machine-origin correcting method-1 and an every-processing moving-position correcting method, according to an embodiment of the invention.
Figure 21A:
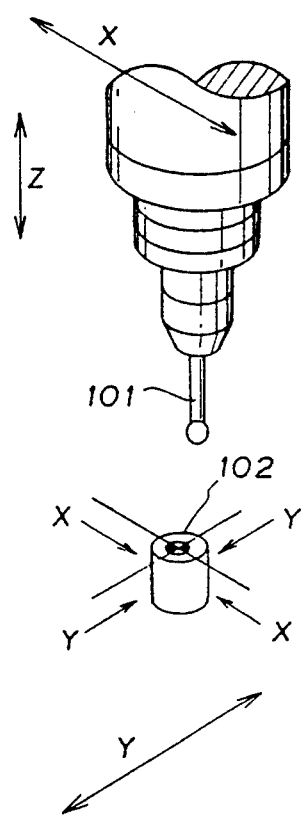
FIGS. 21(a) and 21(b) show the gist or summary of a measurement of a workpiece reference position.
Figure 21B:
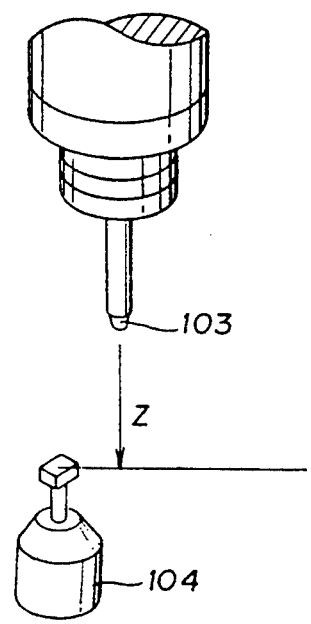
Figure 22:
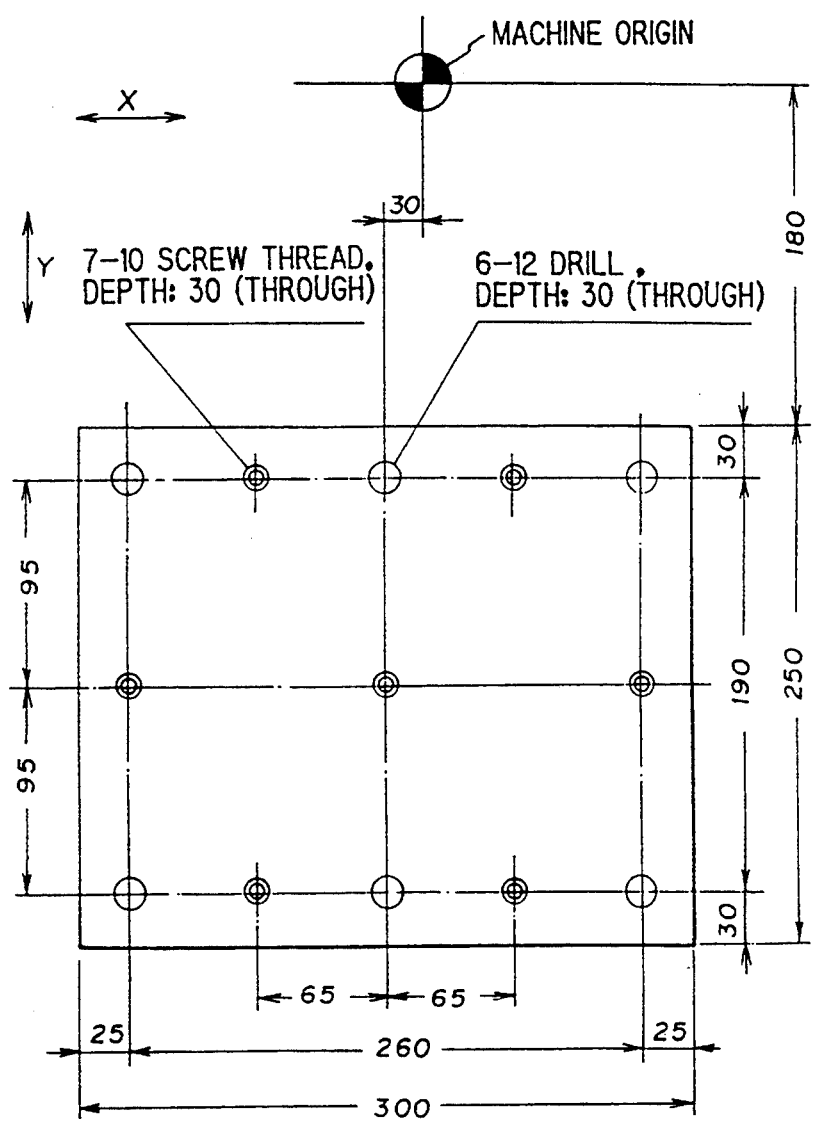
FIG. 22 is a top plan view showing a workpiece which is the subject of a in simulated processing in order to measure thermal displacement due to a conventional method.
Figure 23:
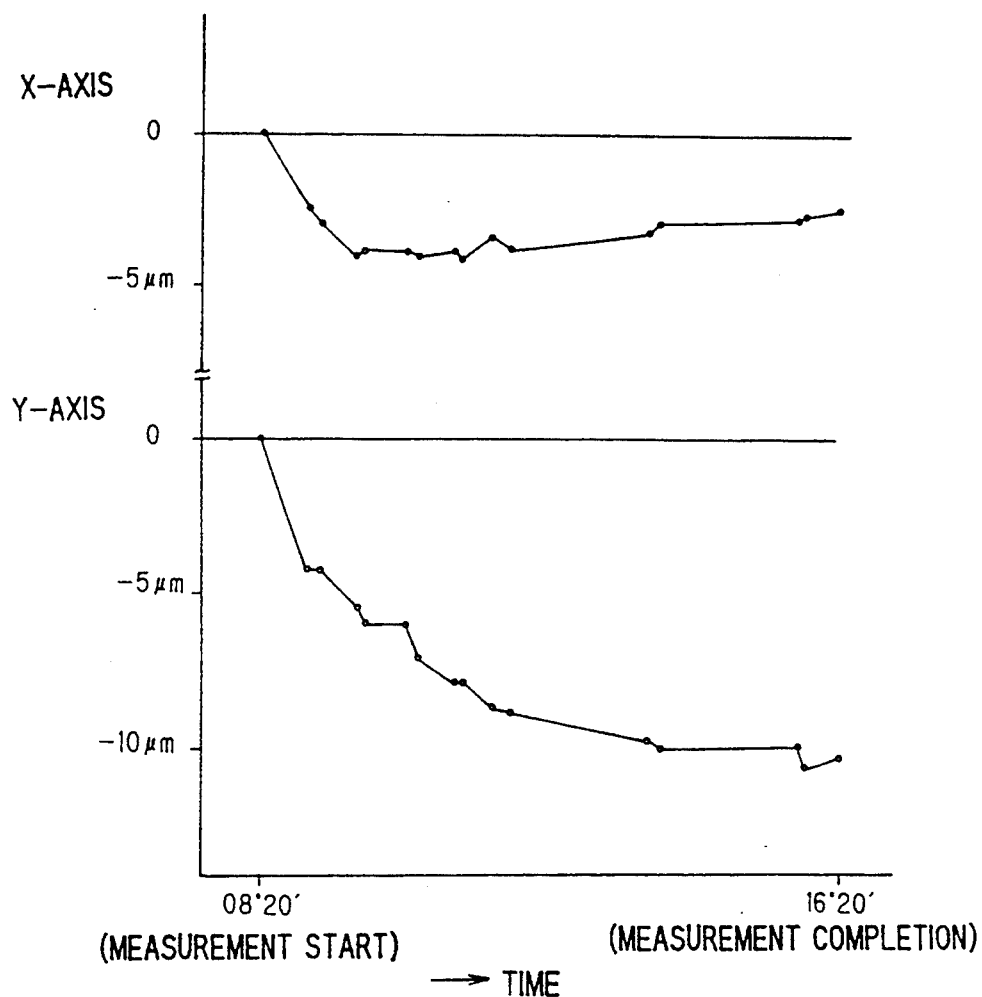
FIG. 23 is a graphical representation showing a change or variation of machine 0-point position accuracy, which results from measurement of thermal displacement when using the conventional method.
Figure 24:
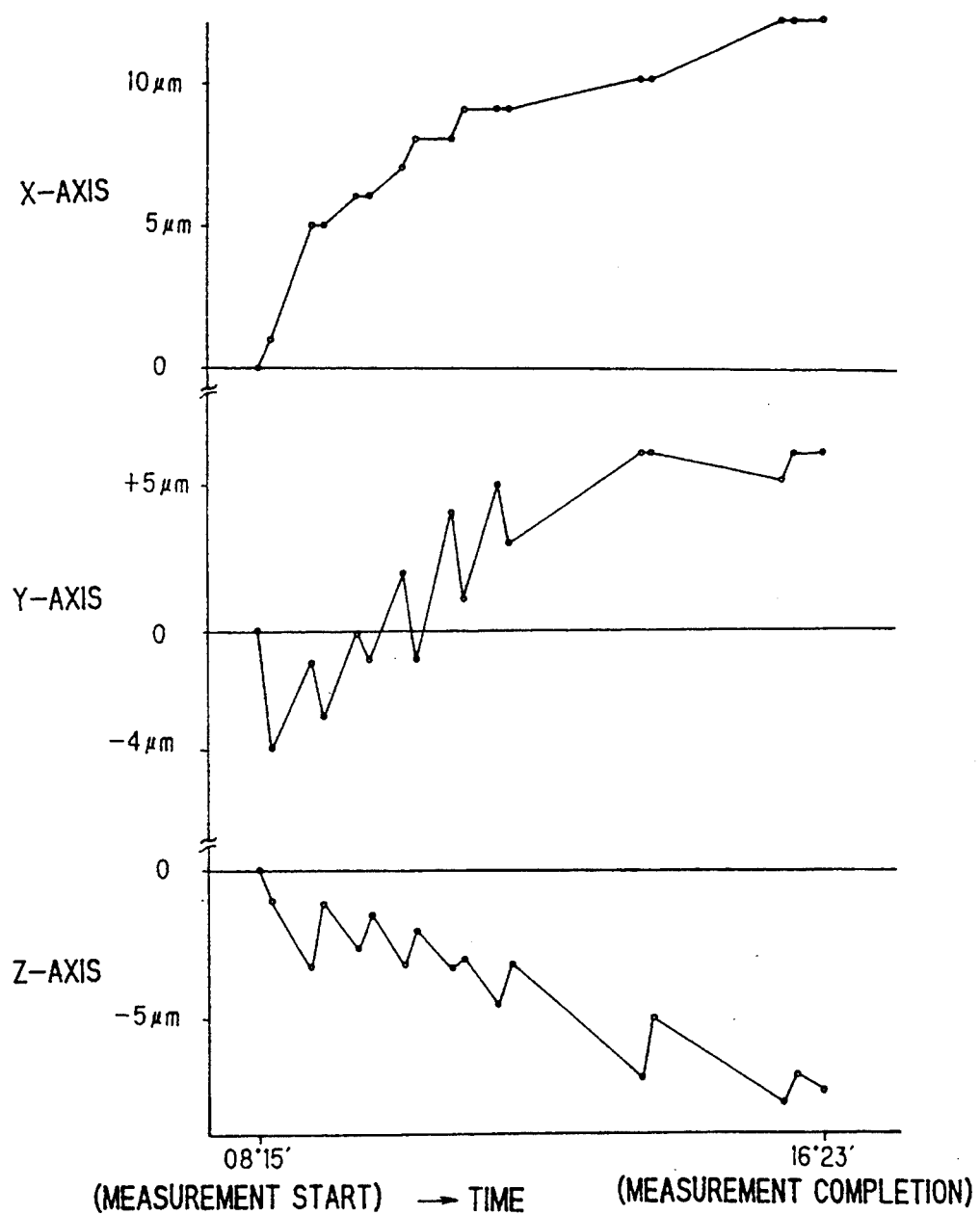
FIG. 24 is a graphical representation showing a change of X, Y and Z workpiece reference position, which results from measurement of thermal displacement when using the conventional method.
Figure 25:
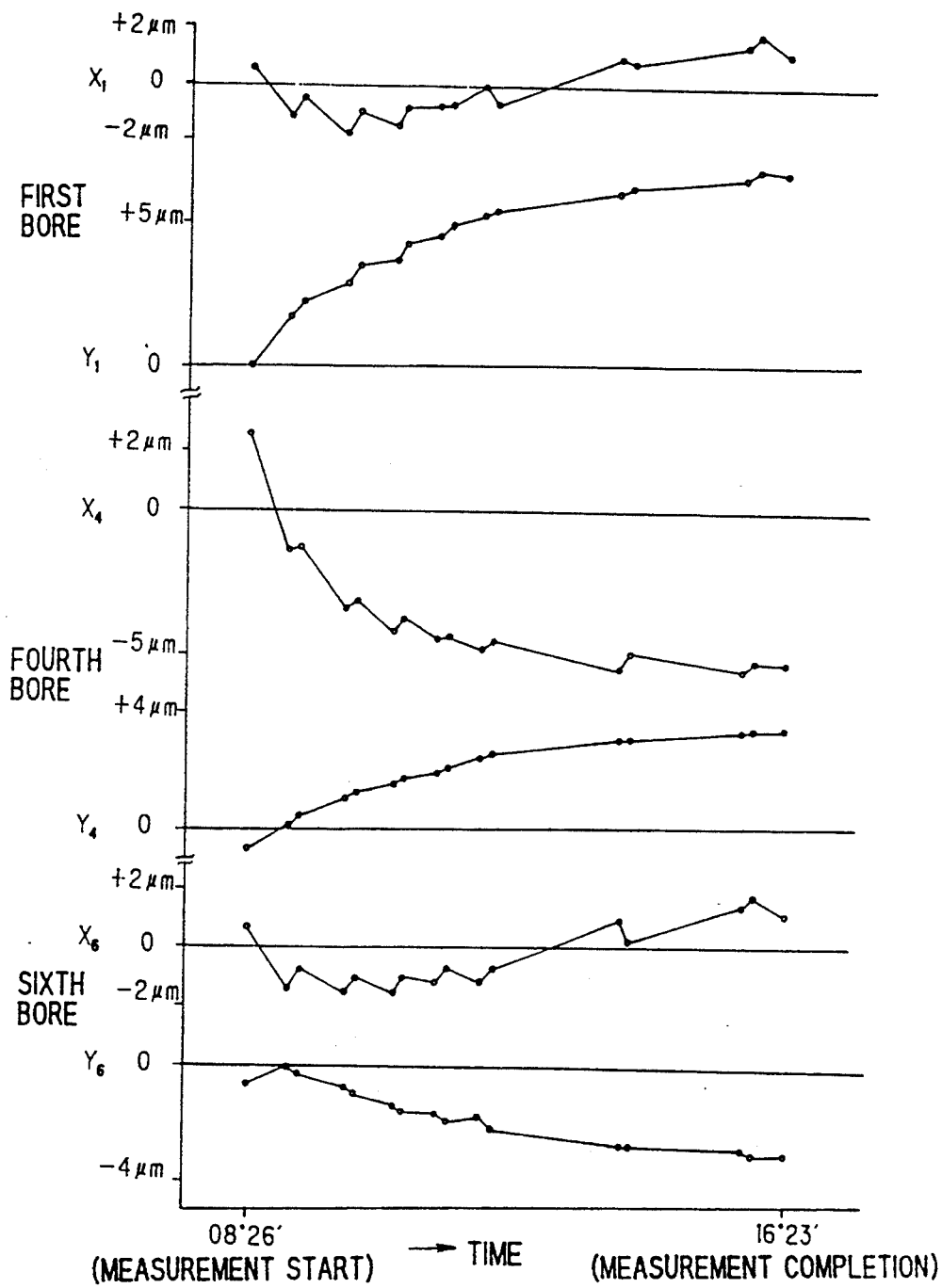
FIG. 25 is a graphical representation showing a change of a 6-12 drilled bore and first, fourth and sixth bore positions, which results from measurement of thermal displacement when using the conventional method.
Figure 26:
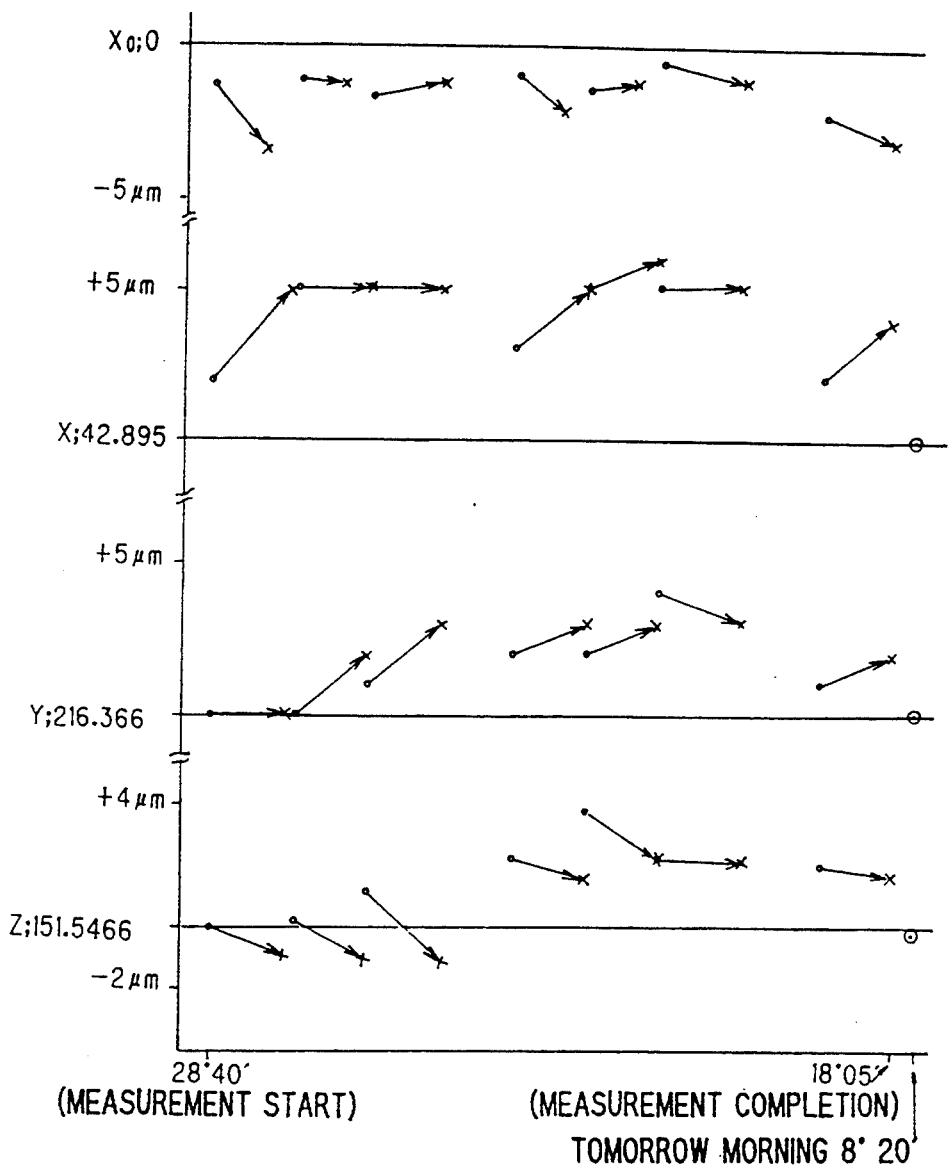
FIG. 26 is a graphical representation showing a change of a workpiece reference position which results from measurement of thermal displacement when using the conventional method.
Figure 27:
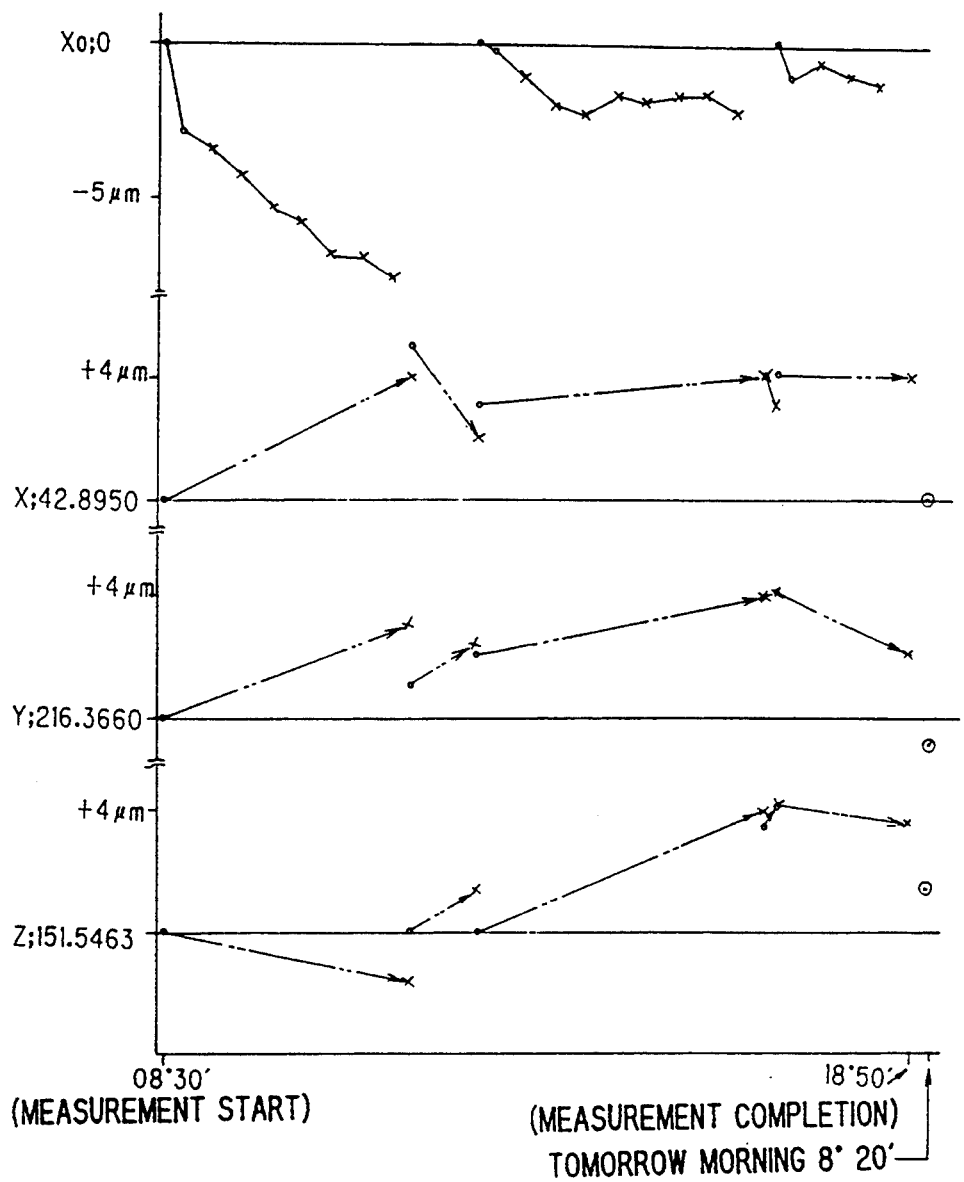
FIG. 27 is a graphical representation showing a change of X-axis machine 0-point position accuracy which results from measurement of thermal displacement when using the conventional method.
Figure 28:
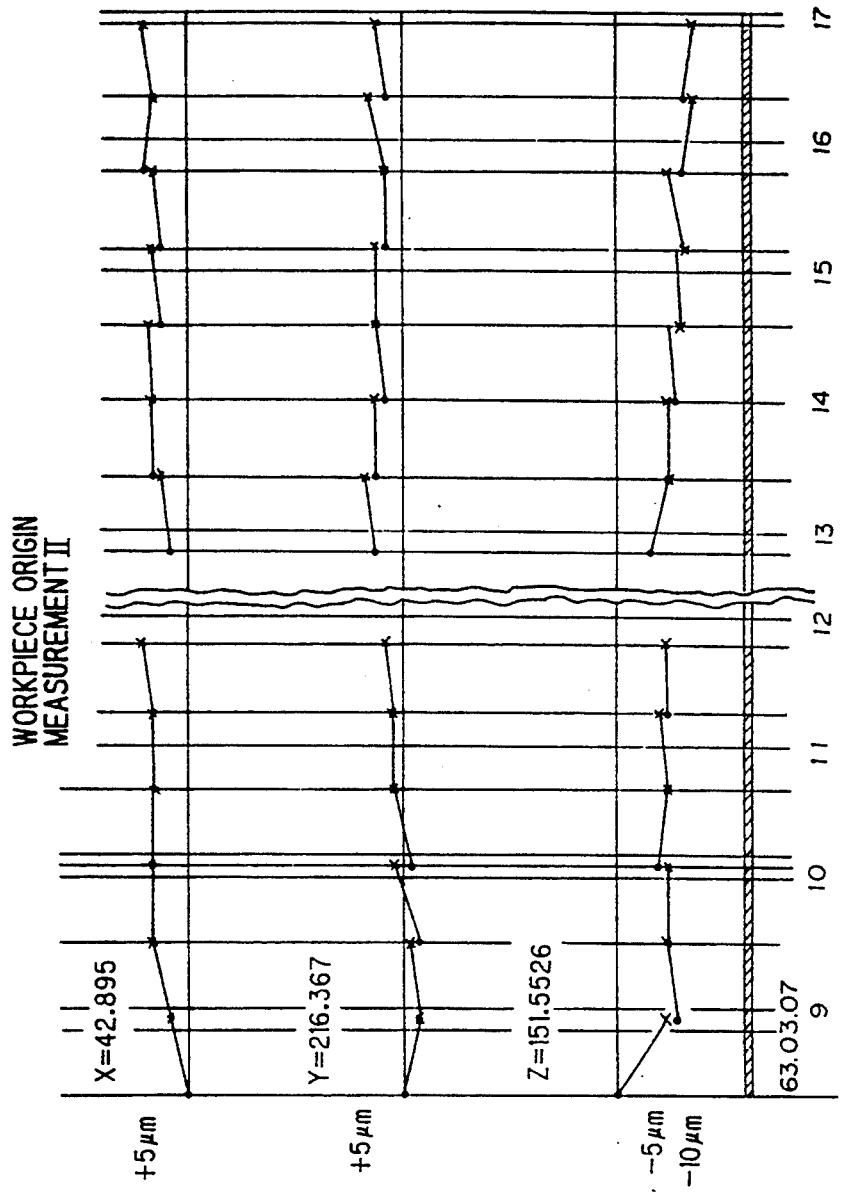
FIG. 28 is a graphical representation showing a change of a position every moving point which results from measurement of thermal displacement when using the conventional method.
Figure 29:
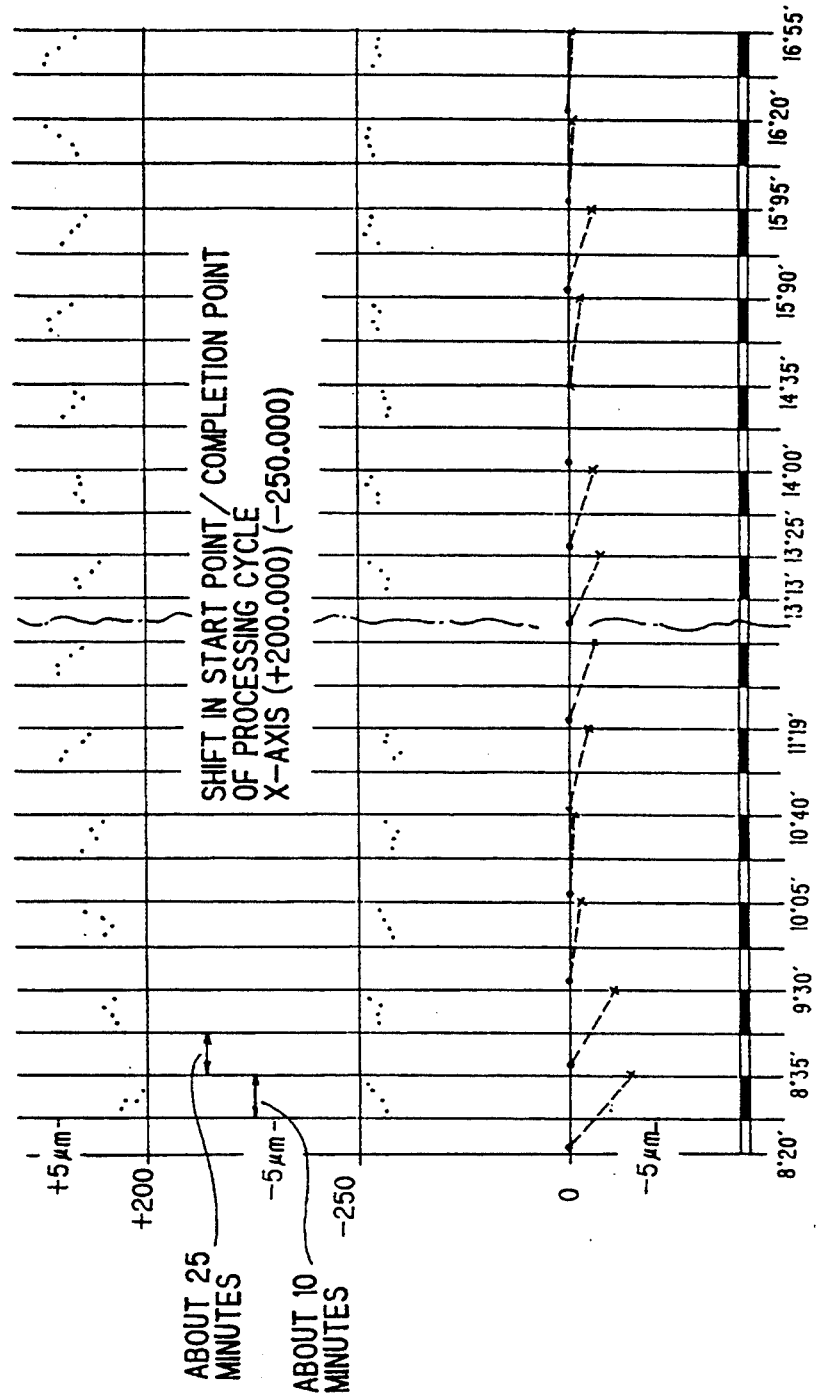
FIG. 29 is a graphical representation showing a change of a position every moving point which results from measurement of thermal displacement when using the conventional method.
Figure 30:
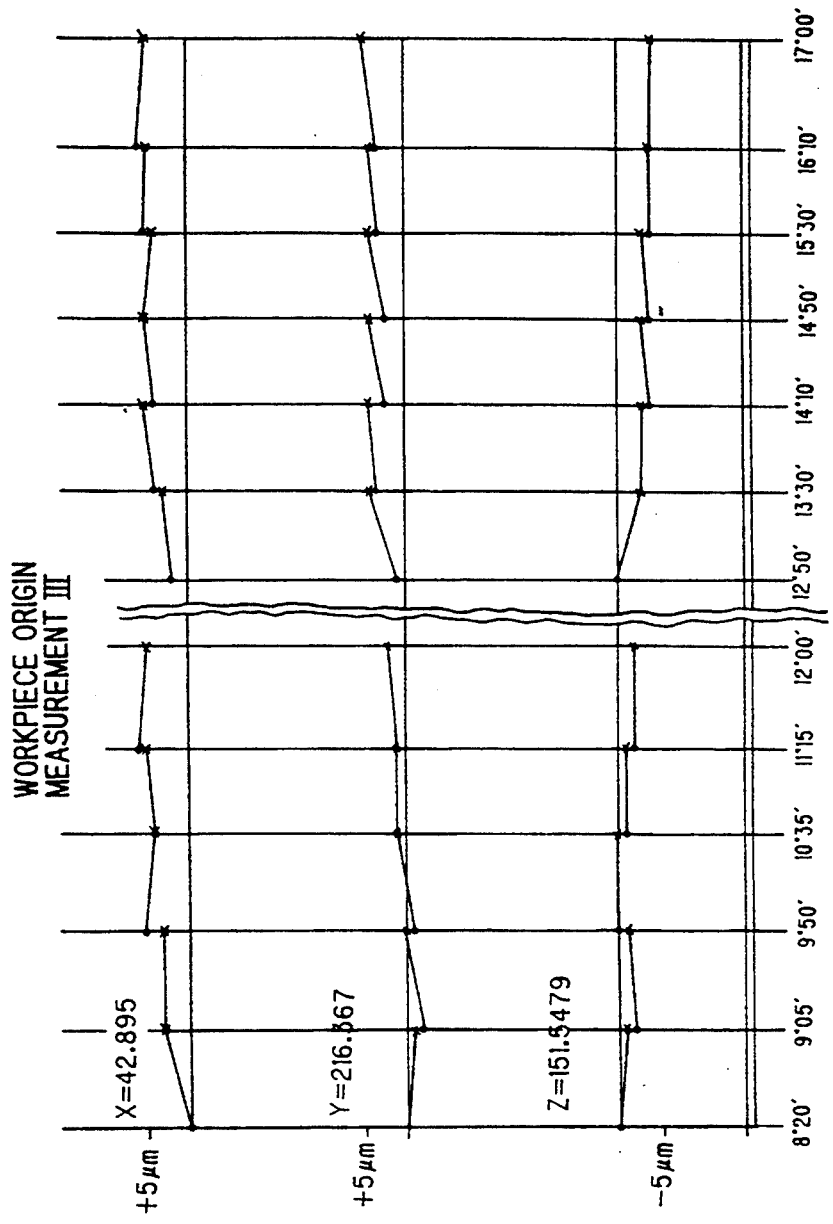
FIG. 30 is a graphical representation showing a change of a position every moving point which results from measurement of thermal displacement when using the conventional method.
Figure 31:
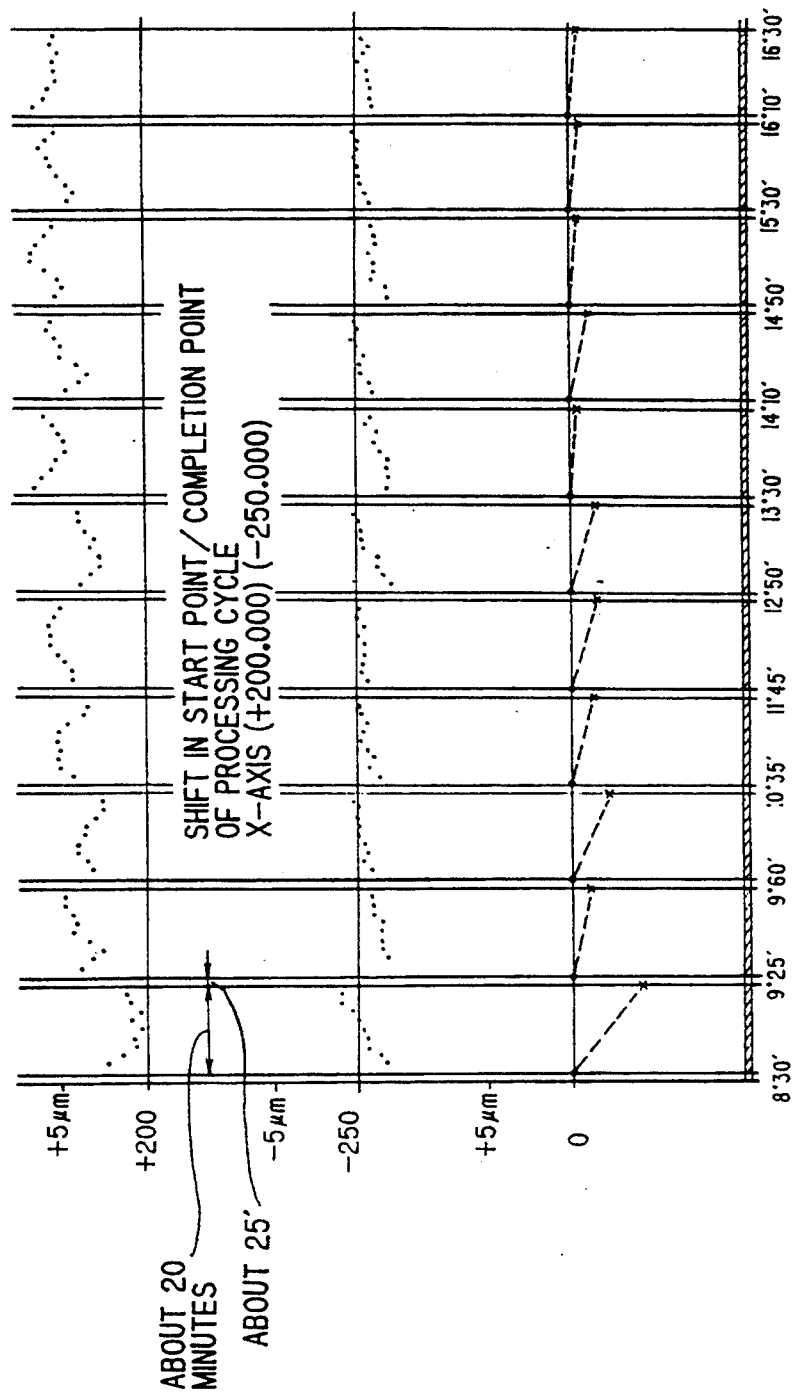
FIG. 31 is a graphical representation showing a change of a position every moving point which results from measurement of thermal displacement when using the conventional method.

(6) Combination of Machine Origin Position Correcting Method-1 And Every-Processing Moving-Position Correcting Method The machine origin is checked before every processing, and correction of the specific moving position is also executed every processing operation procedure is practiced as follows by procedure shown in flow charts illustrated respectively in FIGS. 18~20.

Operation starts in a step S 6-00. An electric power source is turned on in a step S 6-01. A numerical control apparatus and a programmable logic controller are initialized and readied up. The step S 6-01 is completed, and a step S 6-02~ and a step S 6-101~ are processed in parallel relation to each other. From the step S 6-101~ a step S 6-108, processing is repeated until the electric power source is turned off, regardless of the main processing.

In the step S 6-101, collection of the data of the amount of generated heat of the thermal displacement of the ball screw and sampling time counter of the thermal displacement start. In a step S 6-102, it is judged whether or not the sampling time of the thermal displacement is coincident with "Tt". In the case where the sampling time is coincident with "Tt", the program proceeds to subsequent steps 6-103 and step S 6-1000. In the case where the sampling time is not coincident with "Tt", the program is returned to the step S 6-102, and judgment on counting-up is repeated. The sampling time of the thermal displacement is coincide With "Tt" in the step S 6-102, and the step S 6-103~ and the step S 6-1000~ are processed in parallel relation to each other. The step S 6-1000 repeats the processing until the electric power source is turned off, regardless of the main processing.

In the step S 6-1000, adaptation processing of the aforesaid sampling time "Tt" of the thermal displacement of the ball screw is executed. If this processing is completed, the program is returned to the step S 6-102. In the step S 6-103, the amounts of thermal displacement are compared with each other and are operated by the aforementioned method. In a step S 6-104, judgment on advisability or propriety of the thermal-displacement correction is decided by the following equation. That is, in the case of the error<the minimum movement setting unit, no correction is made. On the contrary, in the case of the error≧the minimum movement setting unit, the program proceeds to subsequently steps in order to execute correction (due to the aforesaid processing procedure of the thermal displacement correction). In a step S 6-105, it is judged whether or not correction interruption can be made. A judgment standard is due to the aforesaid "processing timing of the correction interruption". In the case where the interruption is possible, the program proceeds to the step S 6-108, while in the case where the interruption is impossible, the program continues to subsequent steps where judgment on advisability or propriety of the interruption is repeated.

In a step S 6-106, it is judged whether or not the correction interruption is possible. The judging standard is due to the above-described step S 6-105. In the case where the interruption is possible, the program proceeds to subsequent steps, while in the case where the interruption is impossible, the program is returned to the step S 6-106 where judgment on advisability or propriety of the interruption is repeated. In a step S 6-107, the amounts of thermal displacement are compared with each other and are operated by the aforementioned method. In the step S 6-108, the position data of each axis are corrected by the correction value, and the variety of thermal displacement data is rewritten to this-time data. If the processing is completed, the program is returned to the step S 6-102, and the step S 6-102~ the step S 6-108 are repeated.

In the step S 6-02, entirely automatic returning to the origin or returning to the origin due to manual operation by an operator is executed. In a step S 6-03, a program load is executed in which a processing program is recorded into the memory device of the numerical control apparatus. In a step S 6-04, a tool setup is executed in which tools required for the processing are mounted respectively on predetermined pots of a magazine on the basis of instructions of a processing program list or a tool list. In a step S 6-05, a workpiece setup is executed in which a workpiece is mounted on a reference position on a table. In a step S 6-06, initialization of machine-origin measurement/automatic correction is executed. The step S 6-06 is completed, and a step S 6-07~, a step S 6-201~, a step S 6-203~ and a step S 6-303~ are processed in parallel relation to each other. From the step S 6-201~ a step S 6-212 and the step S 6-303~ a step S 6-312, processing is repeated until the electric power source is turned off, regardless of the main processing.

In the step S 6-201, the sampling time counter of measurement of the machine position and the moving position starts. In the step S 6-202, it is judged whether or not the sampling time of measurement of the machine position and the moving position is coincident with "Tp". In the case where the sampling time is coincident with "Tp", the program proceeds to the step S 6-203 and a step S 6-2000. In the case where the sampling time is not coincident with "Tp", the program is returned to the step S 6-202, and judgment on counting-up is repeated. The sampling time of measurement of the machine position and the moving position is coincide with "Tp" in the step S 6-202, and the step S 6-202~ and the step S 6-2000~ are processed in parallel relation to each other. The step S 6-2000 repeats the processing until the electric power source is turned off, regardless of the main processing.

In the step S 6-2000, adaptation processing of the aforesaid measurement sampling time "Tp of the machine position and the moving position is executed. If this processing is completed, the program is returned to the step S 6-202. In the step S 6-203, the displacement of the machine origin is operated by the aforesaid method. In a step S 6-204, judgment on advisability or propriety of correction of the machine origin displacement is decided by the following equation. That is, in the case of the error<the minimum movement setting unit, no correction is made and the program is returned to the step S 6-202 so that the step S 6-202~ the step S 6-204 are repeated. On the contrary, in the case of the error≧ the permissible error value per time, the program proceeds to subsequently steps for judgment on whether or not correction is required. In a step S 6-205, operation is made on the basis of the aforesaid equation (MotTcf) in order to predict the displacement of the machine origin until the entire processing is completed.

Subsequently, in a step S 6-206, it is judged whether or not an permissible value is exceeded. In the case of MotTcf<D, which does not exceed the permissible value, the program is returned to the step S 6-202 where the step S 6-202~ the step S 6-204 are repeated. On the contrary, in the case of MotTcf>D, which exceeds the permissible value, the program continues to subsequent steps. In a step S 6-207, a warning suggesting the fact that the error exceeds the permissible value is exhibited, and a warning sound is generated. In a step S 6-208, it is judged whether or not the measuring interruption is possible. A judging standard is due to the aforesaid "processing timing of the measuring interruption". In the case where the interruption is possible, the program proceeds to a 6-209, while, in the case where the interruption is impossible, the program is returned to the step S 6-208, and good or bad judgment of the interruption is repeated.

In the step S 6-209, the machine is halted. In a step S 6-210, it is judged whether or not the processing continues by the operator. In the case where the processing continues, the program proceeds to a step S 6-2101. In the case where the processing is interrupted to execute correction of the machine origin, the program proceeds to subsequent steps. In a step S 6-211, displacement of the machine origin is measured (measurement of the machine origin, and operation of the error are executed). In the step S 6-212, the machine origin is corrected on the basis of the results of the measurement of displacement of the machine origin. The variety of the thermal displacement data of the machine origin is rewritten to the this-time data, and the machine is again activated. If this processing is completed, the program is returned to the step S 6-202 where the processing is repeated (in the case where correction is executed, the data of the machine origin are automatically rewritten to data after correction). In the case where the interruption is possible, the program proceeds to the step S 6-207, while, in the case where the interruption is impossible, the program continues to subsequent steps where good or bad judgment of the interruption is repeated. In the step S 6-2101, release of the warning and start of activation are executed. If this processing is completed, the program is returned to the step S 6-202 where the processing is repeated.

In the step S 6-303, the thermal displacement of the moving position is operated by the above-described method. In a step S 6-304, judgment as to whether or not the moving-position displacement correction is required is decided on the basis of the following equation. That is, in the case where the amounts of thermal displacement are compared with each other, and errors of $|(\text{previous time}) - (\text{this time})|/(Tt)^P < (D/k1) <$ the permissible error value per time, no correction is made. The program is returned to the step S 6-202 where the step S 6-202~ the step S 6-304 are repeated. On the contrary, in the case of errors of $|(\text{previous time}) - (\text{this time})|/(Tt)^P \geqq (D/k1) \geqq$ the permissible error value per time, the program proceeds to subsequent steps for judgment as to whether or not there is necessity that correction is executed. In a step S 6-305, operation is practiced on the basis of the above-described equation (MmtTcf) in order to predict displacement of the moving position until the entire processing is completed.

In a step S 6-306, it is judged whether or not an permissible value is exceeded. In the case of MmtTcf<D, which does not exceed the permissible value, the program is returned to the step S 6-202 where the steps 6-202~ the step S 6-304 are repeated. On the contrary, in the case of MmtTcf>D, which exceeds the permissible value, the program continues to subsequent steps in which the aforesaid processing of "Mmt: Moving-position correction" is executed. In a step S 6-307, warning indicating that the error exceeds the permissible value is exhibited, and a warning sound is generated. In a step S 6-308, it is judged whether or not measuring interruption is possible. A judging standard is due to the aforesaid "processing timing of measuring interruption". In the case where the interruption is possible, the program proceeds to a step S 6-309, while, the interruption is impossible, the program is returned to the step S 6-308 where judgment as to whether or not the interruption is possible is repeated.

In the step S 6-309, the machine is halted. In a step S 6-310, it is judged whether or not the processing continues by the operator. In the case where the processing continues, the program proceeds to the step S 6-2101. In the case where the processing is interrupted to execute correction of the moving position, the program proceeds to subsequent steps. In a step S 6-311, displacement of the moving position is measured. In the step S 6-312, the moving position is corrected on the basis of the results of the measurement of the displacement of the moving position. The variety of the thermal displacement data of the moving position is rewritten to the this-time data, and the machine is again activated. If this processing is completed, the program is returned to the step S 6-202 where the processing is repeated (in the case where correction is executed, the data of the moving position are automatically rewritten to data after correction). In this parallel processing, simultaneous processing is impossible because a measuring unit for measuring the machine origin and a measuring unit which executes measuring of the moving position are the same as each other. Accordingly, the moving-position measurement is executed after correction of the machine origin, as a promise in which the machine-origin measurement has priority.

In the step S 6-07, program check is executed. Pass check and machine lock by means of CRT are performed so that trace check every one block and trace check of continuous blocks are conducted. In a step S 6-08, single-block processing is executed by a first step tool. In a step S 6-09, locations processed in the first step are measured on the machine. In a step S 6-10, the results measured in the step S 6-09 are compared with the designated dimensions, and errors therebetween are corrected by the tool correction and the coordinate correction. In a step S 6-11, good or bad judgment is executed. It is judged whether or not the measurement results are within the permissible value. If the measurement results are "good", the program proceeds to a step S 6-19, while, if the measurement results are "bad", the program proceeds to subsequent steps. In a step S 6-12, judgment of presence of a finish margin is executed. In the case where there is the finish margin, the program proceeds to a subsequent step, while, in the case where there is no finish margin, the program proceeds to the step S 6-19.

In a step S 6-13, program search is conducted to search a start sequence number of the first step. In a step S 6-14, only the processing by the first step tool continues. In a step S 6-15, the reprocessed locations are measured on the machine. In a step S 6-16, the results measured in the step S 6-15 are compared with designated dimensions, and errors therebetween are corrected by tool correction and coordinate correction. In a step S 6-17, good or bad judgment is executed. If the measurement results are "good", the program proceeds to the step S 6-19, while, if the measurement results are "bad", the program proceeds to subsequent steps. In a step S 6-18, judgment of presence of a finish margin is executed. In the case where there is the finish margin, the processing is repeated from the step S 6-13. In this connection, if loops exceed n times, the processing is brought to alarm processing. On the contrary, in the case where there is no finish margin, the program proceeds to subsequent steps.

In the step S 6-19, it is judged whether or not there are subsequent steps. If there are the subsequent steps, the program proceeds to the subsequent steps, while, if there are no subsequent steps, the program proceeds to a step S 6-21. In a step S 6-20, the step S 6-08~ the step S 6-19 are repeated every nth step tool from the second step tool. Since processing of a first item is completed, operation continues by the following procedure for next but one processing.

Moreover, in the step S 6-21, the workpiece is demounted (in the case of the machine-outside measurement). This is due to the aforesaid "Mmt: Moving-position correction". In a step S 6-52, the workpiece is cleaned. In a step S 6-53, the workpiece is mounted to a measuring unit. In a step S 6-54, the reference position of the workpiece reference-positioning workpiece is decided, and serves as a reference position. In a step S 6-55, a specific moving position is measured by machine-outside measurement. In a step S 6-56, the errors of the specific moving position are operated on the basis of the results measured in the step S 6-55. In a step S 6-57, it is judged whether or not the position correction is required by the errors. Here, in the case where it is necessary to execute correction, the program proceeds to subsequent steps, while, in the case where no correction is required, the program proceeds to a step S 6-29. In a step S 6-58, the specific moving position data of the numerical control apparatus are corrected. In this connection, the machine-outside measurement includes a method in which a conventional measuring instrument such as a micrometer, an indicator side-calipers or the like is used to conduct the measurement, in addition to the method described here.

Subsequent step S 6-22~step S 6-25 can be processed in parallel relation to the aforesaid step S 6-52~step S 6-58. In the step S 6-22, a location where the workpiece is mounted is cleaned. In the step S 6-23, it is judged whether or not there are non-processed workpieces. In the case where there are the non-processed workpieces, the program proceeds to subsequent steps, while, in the case where there are no non-processed workpieces, the program is completed. In the step S 6-24, workpiece setup is conducted, and a second workpiece is mounted. In the step S 6-25, setting is made so as to be capable of entirely automatic running by operation such as single step-off, optional step-off or the like.

In the step S 6-29, a cycle start button is depressed whereby the automatic running starts. In a step S 6-30, together with the cycle start, the amount of thermal displacement is compared. In the case where $|(\text{this time}) - (\text{previous time})|/(Tp)^p$ is equal to or larger than $D/k1$, the program proceeds to subsequent steps. On the contrary, in the case where $|(\text{this time}) - (\text{previous time})|/(Tp)^p$ is smaller than $D/k1$, the program proceeds to a step S 6-36. In a step S 6-31, in the case where the specific moving position relies upon the machine-outside measuring method, the program proceeds to a step S 6-37, while, the machine-outside measurement is not used, the program proceeds to subsequent steps.

In a step S 6-32, the machine origin is automatically measured and, subsequently, operation is made on the basis of the following equation to execute correction and rewriting of the data. ① In the case of measurement and operation: errors<the minimum movement unit, no correction is made. In the case of errors≧the minimum moving unit, correction is made as a rule. In the case, however, where the results in which the displacement of the machine origin until the entire processing is completed is operated by the equation of MotTcf are within the permissible value p, no correction is made (in the case where correction is made, the machine position data are automatically rewritten to data after correction). ② In the case where correction is made, the variety of thermal displacement data is rewritten to this-time data.

In a step S 6-33, the specific moving position is measured on the basis of the measurement on the machine. In a step S 6-34, errors of the specific moving position are operated. In a step S 6-35, it is judged whether or not position correction is required by the errors. That is, in the case of the errors<the minimum movement unit, no correction is made, while, in the case of the errors-≧the minimum movement unit, correction is made as a rule. However, in the case where the results in which the displacement of the machine origin until the entire processing is completed is operated on the basis of the equation of MmtTcf are within the permissible value D, no correction is made. If the position correction is required, the program proceeds to subsequent steps, while, if the position correction is not required, the program proceeds to the step S 6-37.

In the step S 6-36, the data of the specific moving position of the numerical control apparatus are corrected. In the case where the correction is made, the variety of the thermal displacement data is rewritten to this-time data. In this processing, since a measuring unit for measuring the machine origin and a measuring unit for measuring the moving position are the same as each other, simultaneous processing cannot be done. Accordingly, the moving-position measurement is executed after correction of the machine origin, as a promise in which the machine-origin measurement has priority. In the step S 6-37, one cycle entire processing is performed. In a step S 6-38, a measurement designated location of processing locations is measured. In a step S 6-39, the results measured in the step S 6-37 are compared with the designated dimensions, and errors therebetween are corrected by the tool correction and the coordinate correction. In a step S 6-40, good or bad judgment is executed. If the measurement results are "good", the program proceeds to the step S 6-21, while, in the case where the measurement results are "bad", the program proceeds to a subsequent step.

In a step S 6-41, judgment of presence of a finish margin is executed. In the case where there is the finish margin, the program proceeds to subsequent steps, while, in the case where there is no finish margin, the program proceeds to the step S 6-21. In a step S 6-42, program search is conducted to call a sequence number of the reprocessed program. In a step S 6-43, the processing program searched in the step S 6-41 starts to again finish and process the defective locations of the dimension accuracy. In a step S 6-44, the reprocessed locations are measured on the machine. In a step S 6-45, the results measured in the step S 6-43 are compared with designated dimensions, and errors therebetween are corrected by tool correction and coordinate correction.

In a step S 6-46, good or bad judgment is executed. If the measurement results are "good", the program proceeds to the step S 6-21, while, if the measurement results are "bad", the program proceeds to subsequent steps. In the step S 6-47, judgment of presence of a finish margin is executed. In the case where there is the finish margin, the program is repeated from the step S 6-42. In this connection, if loops exceed n times, the processing is brought to alarm processing. In the case where there is no finish margin, the program proceeds to the step S 6-21. If this processing is completed, repeating is made in the step S 6-21~ the step S 6-47, or in the step S 6-52~ the step S 6-58 in the case of the machine-outside measurement.

Since the processing is made as described above, it is possible to cover disadvantages until now.

(7) Other embodiments:

In the above-described embodiments, combinations are partially described in which the thermal displacement is measured and corrected each time before every processing regarding the machine positions (the machine origin, the workpiece reference position, and the workpiece-mounting reference-block position), every each processing regarding the moving position, or every sampling time and, in addition thereto, every timing at which correction of the sampling time can be interrupted regarding the ball screw.

If these corrections of the thermal displacement of the machine position, the moving position and the ball screw are combined with each other, the following embodiments shown in the below table 1 can be formed. Further, in addition to the following combinations, processing in which the thermal displacement is predicted, warned and corrected is derived in items before every processing and items every processing. Furthermore, the moving-position correction described until now includes a constant deciding method, a reference-block three-point method, and thermal-displacement operation and measurement due to the machine-outside measuring method. Moreover, the method of correcting the thermal displacement can be realized not only in the numerical control apparatus, but also in an electronic computer including a personal computer and an electronic computer system.

TABLE 1

| CORRECTION OF MACHINE POSITION | CORRECTION OF MOVING POSITION | CORRECTION OF BALL SCREW |
|---|---|---|
| NONE | NONE | EVERY SAMPLING |
| NONE | EVERY PROCESSING | EVERY SAMPLING |
| MACHINE ORIGIN POSITION-BEFORE EVERY PROCESSING | NONE | NONE |
| MACHINE ORIGIN POSITION-BEFORE EVERY PROCESSING | NONE | EVERY SAMPLING |
| MACHINE ORIGIN POSITION-BEFORE EVERY PROCESSING | EVERY PROCESSING | NONE |
| MACHINE ORIGIN POSITION-BEFORE EVERY PROCESSING | EVERY PROCESSING | EVERY SAMPLING |
| MACHINE ORIGIN POSITION-BEFORE EVERY PROCESSING | EVERY SAMPLING | NONE |
| MACHINE ORIGIN POSITION-BEFORE EVERY PROCESSING | EVERY SAMPLING | EVERY SAMPLING |
| MACHINE ORIGIN POSITION-EVERY SAMPLING | NONE | NONE |
| MACHINE ORIGIN POSITION-EVERY SAMPLING | NONE | EVERY SAMPLING |
| MACHINE ORIGIN POSITION-EVERY SAMPLING | EVERY PROCESSING | NONE |
| MACHINE ORIGIN POSITION-EVERY SAMPLING | EVERY PROCESSING | EVERY SAMPLING |
| MACHINE ORIGIN POSITION-EVERY SAMPLING | EVERY SAMPLING | NONE |
| MACHINE ORIGIN POSITION-EVERY SAMPLING | EVERY SAMPLING | EVERY SAMPLING |
| WORKPIECE REFERENCE POSITION-BEFORE EVERY PROCESSING | NONE | NONE |
| WORKPIECE REFERENCE POSITION-BEFORE EVERY PROCESSING | NONE | EVERY SAMPLING |
| WORKPIECE REFERENCE POSITION-BEFORE EVERY PROCESSING | EVERY PROCESSING | NONE |
| WORKPIECE REFERENCE POSITION-BEFORE EVERY PROCESSING | EVERY PROCESSING | EVERY SAMPLING |
| WORKPIECE REFERENCE POSITION-BEFORE EVERY PROCESSING | EVERY SAMPLING | NONE |
| WORKPIECE REFERENCE POSITION-BEFORE EVERY PROCESSING | EVERY SAMPLING | EVERY SAMPLING |
| WORKPIECE REFERENCE POSITION-. EVERY SAMPLING | NONE | NONE |
| WORKPIECE REFERENCE POSITION- EVERY SAMPLING | NONE | EVERY SAMPLING |
| WORKPIECE REFERENCE | EVERY | NONE |

TABLE 1-continued

| CORRECTION OF MACHINE POSITION | CORRECTION OF MOVING POSITION | CORRECTION OF BALL SCREW |
|---|---|---|
| POSITION-EVERY SAMPLING | PROCESSING | |
| WORKPIECE REFERENCE POSITION-EVERY SAMPLING | EVERY PROCESSING | EVERY SAMPLING |
| WORKPIECE REFERENCE POSITION-EVERY SAMPLING | EVERY SAMPLING | NONE |
| WORKPIECE REFERENCE POSITION-EVERY SAMPLING | EVERY SAMPLING | EVERY SAMPLING |
| WORKPIECE-MOUNTING REFERENCE BLOCK POSITION-BEFORE EVERY PROCESSING | NONE | NONE |
| WORKPIECE-MOUNTING REFERENCE BLOCK POSITION-BEFORE EVERY PROCESSING | NONE | EVERY SAMPLING |
| WORKPIECE-MOUNTING REFERENCE BLOCK POSITION-BEFORE EVERY PROCESSING | EVERY PROCESSING | NONE |
| WORKPIECE-MOUNTING REFERENCE BLOCK POSITION-BEFORE EVERY PROCESSING | EVERY PROCESSING | EVERY SAMPLING |
| WORKPIECE-MOUNTING REFERENCE BLOCK POSITION-BEFORE EVERY PROCESSING | EVERY SAMPLING | NONE |
| WORKPIECE-MOUNTING REFERENCE BLOCK POSITION-BEFORE EVERY PROCESSING | EVERY SAMPLING | EVERY SAMPLING |
| WORKPIECE-MOUNTING REFERENCE BLOCK POSITION-EVERY SAMPLING | NONE | NONE |
| WORKPIECE-MOUNTING REFERENCE BLOCK POSITION-EVERY SAMPLING | NONE | EVERY SAMPLING |
| WORKPIECE-MOUNTING REFERENCE BLOCK POSITION-EVERY SAMPLING | EVERY PROCESSING | NONE |
| WORKPIECE-MOUNTING REFERENCE BLOCK POSITION-EVERY SAMPLING | EVERY PROCESSING | EVERY SAMPLING |
| WORKPIECE-MOUNTING REFERENCE BLOCK POSITION-EVERY SAMPLING | EVERY SAMPLING | NONE |
| WORKPIECE-MOUNTING REFERENCE BLOCK POSITION-EVERY SAMPLING | EVERY SAMPLING | EVERY SAMPLING |

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A numerical control method for controlling a numerical control (NC) machine having an electrical power source for providing power to operate said numerical control machine, a tool means comprising a machine tool and a drive means for effecting the machining of a workpiece, a measuring means for measuring machine tool position, a memory means for storing data including at least previous-time thermal displacement data and this-time thermal displacement data, and a processing means, said processing means being operative by periodic processing to execute a processing program, comprising the steps of:

turning on said electrical power source;
storing a thermal-displacement sampling time (Tt) and a processing cycle time (Tc), in said memory means;
selecting a measurement reference position to serve as a machine origin;
storing data identifying said machine origin with said memory means;
measuring the shift of an absolute position of said machine origin as a measurement reference position before every processing, so that said shift of said absolute position serves as an initial value;

collecting data of an amount of heat generated thermal displacement of said drive means for a duration of said stored thermal-displacement sampling time and storing said displacement data in said memory means as this-time data;

upon reaching said stored thermal displacement sampling time, concurrently (i) executing adaptation processing which changes the sampling time of the thermal displacement of said drive means, depending upon whether or not the thermal displacement of said drive means is within a range of an allowable error within said processing cycle time, and (ii) comparison computation processing of the amount of thermal displacement;

comparing said thermal displacement of said drive means and a minimum movement setting unit with each other to determine whether or not said thermal displacement is within a first allowable error;

executing a correction of said thermal displacement if said displacement is not within said first allowable error;

rewriting said previous-time thermal-displacement data as this-time data after correction of the thermal displacement; and executing thermal-displacement correction for said drive means.

2. A numerical control method according to claim 1, further comprising determining whether an interruption for correction is possible and, if possible, interrupting said correction of the thermal displacement of said drive means, including promise items of breaks in said processing program of processing locations and processing groups during processing;

wherein, interrupting the correction of the thermal displacement of said drive means always takes place at times other than said breaks or during running other than automatic running.

3. A numerical control method according to claim 1, including the steps of:

storing a machine position and moving position measurement time (Tp) in said memory means;

initializing automatic correction after measurement of said machine origin;

counting said measurement sampling time of the machine position and the moving position and comparing said count to said stored machine position and moving position measurement time;

upon expiration of said stored measurement time, concurrently:

(i) executing an adaptation processing which changes the measurement sampling time of the machine position and the moving position depending upon whether or not computation processing of the displacement of the machine origin and the thermal displacement are within a second allowable error within said processing cycle time; and (ii) performing a machine origin displacement operation and comparing the resulting error and an allowable error value per time with each other to decide whether or not the machine origin is required to be measured and corrected;

if correction is required, predicting the displacement of the machine origin (MotTcf) on the basis of the following equation:

$$MotTcf = \{|(\text{previous time measurement}) - (\text{this time measurement})|/(Tp)P\} \cdot k\{Tc - (\text{processing running time until now})\}P$$

where P is a power exponent representing heat generation with respect to heat emission; and where k is a machining constant;

comparing (i) a prediction value of the displacement of the machine origin until the entire processing is completed and (ii) said second allowable error with each other;

executing at least one of a warning during the automatic operation, automatic judgement on interruption of machine halt, and the machine halt, on the basis of said comparison.

4. The method of claim 3, further comprising executing the adaptation processing of the measurement sampling time of the machine position and the moving position so as to be repeated until an electric power source is turned off, regardless of a main processing.

5. A numerical control method according to claim 3, including the steps of:

executing the measurement and correction of said machine origin every time interval sampling;

executing automatic judgement on the measurement interruption, the machine halt, and the displacement measurement and correction of the machine origin on the basis of the predicted displacement of the machine origin;

measuring a shift of the absolute position of the machine origin every measurement sampling time (Tp) of the machine position and the moving position; and executing the thermal-displacement correction including correction processing of the machine origin on the basis of said measured shift.

6. The method of claim 1, further comprising allocating said memory means such that a correction parameter can be input to said memory means in order to execute zero-point correction of said measuring means.

7. A numerical control method according to claim 1, further including the steps of:

judging reprocessing after measurement and correction depending upon presence of a finish margin;

bringing the reprocessing to alarm processing after n times; and executing correction of the thermal displacement including processing in which position displacement is predicted, warned, measured and corrected.

8. A numerical control method for controlling a numerical control (NC) machine having an electrical power source for providing power to operate said numerical control machine, a tool means comprising a machine tool and a drive means for effecting the machining of a workpiece, a measuring means for measuring said machine tool position, a memory means for storing data including at least previous-time thermal displacement data and this-time thermal displacement data, and a processing means, said processing means being operative by periodic processing to execute a processing program, comprising the steps of:

turning on said electrical power source;

selecting a measurement reference position to serve as a workpiece reference position;

storing at least data of a machine origin and said workpiece reference position in said memory means;

executing zero-point correction of said measuring means;

measuring said workpiece reference position with said measuring means when said electric power source is turned on;

bringing correction values entirely to zero with a value of the measurement by said measuring means serving as an initial value;

measuring the shift of an absolute position of the workpiece reference position every processing cycle;

correcting for thermal displacement, comprising correction processing of the workpiece reference position, during possible interruptions of said program;

storing a thermal-displacement sampling time (Tt) and a processing cycle time (Tc), in said memory means;

following said turning-on of said electric power source, collecting data of an amount of heat generated thermal displacement of said drive means for a duration of said stored thermal-displacement sampling time and storing said displacement data in said memory means as this-time data;

upon reaching said stored thermal displacement sampling time, concurrently executing (i) adaptation processing in which the thermal-displacement sampling time of said drive means is changed, depending upon whether or not the thermal displacement of said drive means is within a range of a first allowable error within a processing cycle time, and (ii) comparison computation processing of the amount of thermal displacement; and executing correction of the thermal displacement of said drive means on the basis of a comparison of the thermal displacement error and a minimum movement setting unit with each other.

9. The numerical control method as set forth in claim 8, wherein said method further comprises:

preparing for correction interruption of the thermal displacement of said drive means, including promise items of breaks in a processing program of processing locations and processing groups during processing;

executing an interruption for correction of the thermal displacement of said drive means at time other than said breaks or during running other than automatic running; and storing in said memory means a plurality of thermal-displacement data to this-time data after said thermal displacement correction of said drive means.

10. A numerical control method for controlling a numerical control (NC) machine having an electrical power source for providing power to operate said numerical control machine, a tool means comprising a machine tool and a drive means for effecting the machining of a workpiece, a measuring means for measuring said machine tool position, a memory means for storing data including at least previous-time thermal displacement data and this-time thermal displacement data, and a processing means, said processing means being operative by periodic processing to execute a processing program, comprising the steps of:

turning on said electrical power source;

selecting a measurement reference position to serve as a workpiece reference position;

storing at least data of a machine origin and said workpiece reference position in said memory means;

executing zero-point correction of said measuring means;

measuring said workpiece reference position with said measuring means when said electric power source is turned on;

bringing correction values entirely to zero with a value of the measurement by said measuring means serving as an initial value;

measuring the shift of an absolute position of the workpiece reference position every processing cycle;

correcting for thermal displacement, comprising correction processing of the workpiece reference position, during possible interruptions of said program;

storing the measurement sampling time (Tp) of an allowable value of a position error (D) for a machine position and a moving position in said memory means; initializing automatic correction after measurement of a workpiece reference position;

counting the measurement sampling time of the machine position and the moving position;

upon reaching said value Tp, executing adaptation processing which changes the measurement sampling time of the machine position and the moving position if said counted sampling time is not within said time (Tp) of an allowable position error;

repeating said counting and adaptation processing of the measurement sampling time of the machine position and the moving position until an electric power source is turned off, regardless of a main processing;

executing the correction of the workpiece reference position such that the measured error and a second allowable error value per time are compared with each other to decide whether or not the workpiece reference position is required to be measured and corrected;

executing prediction of the displacement of the workpiece reference position (MwtTcf) on the basis of the following equation:

$MwtTcf = \{|(\text{previous time measurement}) = (\text{this time measurement})|/(Tp)P\} \cdot k\{Tc - (\text{processing running time until now})\}P$ where P is a power exponent representing heat generation with respect to heat emission; and where k is a machining constant;

comparing a prediction value of the displacement of the workpiece reference position with a measured value until the difference is within a third allowable error;

executing at least one of a warning during the automatic operation, automatic judgment on interruption of machine halt, and machine halt on the basis of the results in which the prediction value of the displacement of the workpiece reference position and said third allowable error are compared with each other.

11. The numerical control method of claim 10, further including executing said thermal-displacement correction, including processing in which prediction, warning, measurement and correction are executed, with respect to the displacement of the workpiece reference position.

12. A numerical control method for controlling a numerical control (NC) machine having an electrical power source for providing power to operate said numerical control machine, a tool means and a drive means for effecting the machining of a workpiece, a measuring means for measuring machine tool position, a memory means for storing data including at least previous-time thermal displacement data and this-time thermal displacement data, and a processing means, said processing means being operative by periodic processing to execute a processing program, comprising the steps of:

turning on said electrical power source;

selecting a measurement reference position to serve as a workpiece-mounting reference-block position;

storing at least data of a machine origin and said workpiece reference position in said memory means;

executing zero-point correction of said measuring means;

measuring said workpiece-mounting reference-block position with said measuring means when said electric power source is turned on;

bringing correction values entirely to zero with a value of the measurement by said measuring means serving as an initial value;

measuring the shift of an absolute position of the workpiece-mounting reference-block position every processing cycle;

correcting for thermal displacement, comprising correction processing of the workpiece-mounting reference-block position, during possible interruptions of said program;

storing a thermal-displacement sampling time (Tt) and a processing cycle time (Tc), in said memory means;

following said turning-on of said electric power source, collecting data of an amount of heat generated thermal displacement of said drive means for a duration of said stored thermal-displacement sampling time and storing said displacement data in said memory means as this-time data;

upon reaching said stored thermal displacement sampling time, concurrently executing (i) adaptation processing in which the thermal-displacement sampling time of said drive means is changed, depending upon whether or not the thermal displacement of said drive means is within a range of a first allowable error within a processing cycle time, and (ii) comparison computation processing of the amount of thermal displacement;

executing correction of the thermal displacement of said drive means on the basis of a comparison of the thermal displacement error and a minimum movement setting unit with each other.

13. The numerical control method as set forth in claim 12, wherein said method further comprises:

preparing for correction interruption of the thermal displacement of said drive means, including promise items of breaks in a processing program of processing locations and processing groups during processing;

executing an interruption for correction of the thermal displacement of said drive means at time other than said breaks or during running other than automatic running; and storing in said memory means a plurality of thermal-displacement data to this-time data after said thermal displacement correction of said drive means.

14. A numerical control method for controlling a numerical control (NC) machine having an electrical power source for providing power to operate said numerical control machine, a tool means and a drive means for effecting the machining of a workpiece, a measuring means for measuring machine tool position, a memory means for storing data including at least previous-time thermal displacement data and this-time thermal displacement data, and a processing means, said processing means being operative by periodic processing to execute a processing program, comprising the steps of:

turning on said electrical power source;

selecting a measurement reference position to serve as a workpiece-mounting reference-block position;

storing at least data of a machine origin and said workpiece reference position in said memory means;

executing zero-point correction of said measuring means;

measuring said workpiece-mounting reference-block position with said measuring means when said electric power source is turned on;

bringing correction values entirely to zero with a value of the measurement by said measuring means serving as an initial value;

measuring the shift of an absolute position of the workpiece-mounting reference-block position every processing cycle;

correcting for thermal displacement, comprising correction processing of the workpiece-mounting reference-block position, during possible interruptions of said program;

storing the measurement sampling time (Tp) of an allowable value of a position error (D) for a machine position and a moving position in said memory means;

initializing automatic correction after measurement of a workpiece-mounting reference-block position;

counting the measurement sampling time of the machine position and the moving position;

upon reaching said stored value Tp, executing adaptation processing which changes the measurement sampling time of the machine position and the moving position if said counted sampling time is not within said time (Tp) of an allowable position error, said adaptation processing being conducted repeatedly until said electric power source is turned off, regardless of a main processing;

executing the correction of the workpiece-mounting reference-block position such that the measured error and a first allowable error value per time are compared with each other to decide whether or not the workpiece-mounting reference-block position is required to be measured and corrected;

executing prediction of the displacement of the workpiece-mounting reference-block position (MwbtTcf) on the basis of the following equation:

$$MwbtTcf = \{|(\text{previous time measurement}) - (\text{the time measurement})|/(Tp)^P\} \cdot k\{Tc - (\text{processing running time until now})\}^P$$

where P is a power exponent representing heat generating with respect to heat emission; and where k is a machining constant;

comparing a prediction value of the displacement of the workpiece-mounting reference-block position with a measured value until the difference is within a second allowable error;

executing at least one of a warning during the automatic operation, automatic judgment on interruption of machine halt, and machine halt on the basis of the results in which the prediction value of the displacement of the workpiece-mounting reference-block position and the allowable error are compared with each other.

15. The numerical control method of claim 14, further including executing said thermal-displacement correction, including processing in which prediction, warning, measurement and correction are executed, with respect to the displacement of the workpiece-mounting reference-block position.

16. A numerical control method for controlling a numerical control (NC) machining having an electrical power source for providing power to operate said numerical control machine, a tool means and a drive means for effecting the machining a workpiece, a measuring means for measuring machine tool position, an electric power source for providing power to operate said machine, a memory means for storing data including at least previous-time thermal displacement data, this-time thermal displacement data and correction values, and a processing means, said processing means being operative by periodic processing to execute a processing program, comprising the step of:

turning on said electrical power source;

storing a machine origin, a specific moving position, an allowable value of position errors, each of a plurality of thermal-displacement data, a plurality of sampling time data, and processing cycle time, in memory means;

thereupon, (i) collecting data defining an amount of heat generated thermal displacement of said drive means, (ii) counting of a sampling time of thermal displacement, and (iii) measuring the machine position, comprising one of the machine origin, the workpiece reference position, and the workpiece-mounting reference-block position;

executing adaptation processing in which the thermal-displacement sampling time of said drive means is changed, depending upon whether the thermal displacement is within a range of a first allowable error within a processing cycle time;

after measurement of said machine position, which is used as a reference position, initializing an automatic correction;

counting the measurement sampling time of the machine position and the moving position;

upon counting to a stored measurement sampling time Tp, concurrently (i) executing adaptation processing of measurement sampling time of the machine position and the moving position, (ii) executing computation processing of the displacement of the moving position and (iii) executing computation of the thermal displacement of the machine origin;

on the basis of said corresponding execution step, deciding whether or not measurement and correction of the moving position and machine position are required;

if correction of moving position is required, executing prediction of displacement of the moving position (MmtTcf) on the basis of the following equation:

$$MmtTcf = \{|(\text{previous time measurement}) - (\text{this time measurement})|/(Tp)P\} \cdot k\{Tc - (\text{processing running time until now})\}P$$

where P is a power exponent representing heat generation with respect to heat emission; and where k is a machining constant;

if correction of machine position is required, predicting the displacement of the machine position on the basis of the following equation:

$$\text{machine position displacement} = \{|(\text{previous time measurement}) - (\text{this time measurement})|/(Tp)P\} \cdot k\{Tc - (\text{processing running time until now})\}P$$

where P is a power exponent representing heat generation with respect to heat emission; and where k is a machining constant;

if correction of machine position is requried, predicting the displacement of the machine position on the basis of the following equation:

$$\text{machine position} = \{|(\text{previous time measurement}) - (\text{this time measurement})|/(Tp)P\} \cdot k\{Tc|(\text{processing running time until now})\}P$$

where P is a power exponent representing heat generation with respect to heat emission; and where k is a machining constant;

comparing the prediction value of the displacement of the moving position and the allowable value with each other;

executing no correction in the case where the allowable value is not exceeded;

executing at least one of warning during the automatic operation, automatic judgment of whether interruption of the measurement is possible, and measurement and correction of the displacement of the machine origin, on the basis of the results in which the prediction of the displacement of the machine origin is executed.

17. The numerical control method as set forth in claim 16, further comprising:

using, as the moving-position measurement, at least one or in combination of a reference-block three-fixed point method, a constant deciding method due to actually measured data and a machine-outside measuring method;

after correction of the thermal displacement, rewriting the plurality of thermal displacement data to this-time data;

measuring the shift of the absolute position of the moving position at each measurement sampling time of the machine position and the moving position;

alternatively, operating a correction value of the moving position by the constant deciding method;

reading the operated correction value; and executing correction of the thermal displacement, including correction processing of the moving position from a subsequent machine operation.

18. A numerical control method according to claim 16, further comprising the steps of:

counting up the sampling time of the thermal displacement;

concurrently executing adaptation processing which changes the sampling time of the thermal displacement of said drive means, depending upon a fact that the thermal displacement of said drive means is within a range of the allowable error within the processing cycle time, and the comparative computation processing of the amount of thermal displacement;

continuing said adaption processing until said electric power source is turned off, regardless the main processing;

executing the correction of the thermal displacement of said drive means by comparing the thermal-displacement error and the minimum movement setting unit with each other;

preparing the interruption of the correction of the thermal displacement of said drive means, including promise items of breaks in the processing program of the processing locations and the processing group during processing; and executing correction of the thermal displacement at time other than the breaks or during running other than automatic running to execute correction of the thermal displacement including correction processing of the thermal displacement of said drive means.

19. A numerical control method according to claim 16, further comprising the steps of:

storing a machine origin, a workpiece reference position, a workpiece-mounting reference block position, and a plurality of thermal displacement data, in said memory means;

dividing an interior of the memory means so that input of a correction parameter can be executed with respect to the memory means in order to execute zero-point correction of measuring means;

measuring the machine position, comprising at least one of the machine origin, the workpiece reference position, and the workpiece-mounting reference-block position, when said electric power source is turned on;

bringing a correction value entirely to zero with a value of the measurement serving as an initial value;

counting up the measurement sampling time of the machine position and the moving position;

executing the displacement correction processing of said machine position and the correction processing of the displacement of the moving position, in parallel relation to each other;

performing measurement processing with said machine position having priority;

executing the correction of the machine origin such that, in the case where the error is smaller than the error allowable value per time, no correction is made;

executing prediction of the displacement of the machine origin (MotTcf) on the basis of the following $MwbtTcf = \{|(\text{previous time measurement}) - (\text{this time measurement})|/(Tp)P\} \cdot k\{Tc - (\text{processing running time until now})\}P$ executing at least one of warning during the automatic operation, automatic judgment on interruption of the measurement, and measurement and correction of the displacement of the moving position, on the basis of the results in which the prediction of the displacement of the moving position is executed.

20. A numerical control method according to claim 16, further including the steps of:

judging reprocessing after measurement and correction depending upon presence of a finish margin;

bringing the reprocessing to alarm processing after n times; and executing correction of the thermal displacement including processing in which position displacement is predicted, warned, measured and corrected.

21. The numerical control method as set forth in claim 20, further comprising:

judging processing continuation by an operator, after the machine halt is automatically executed on the basis of the results in which the prediction of the displacement of said machine position;

after correction of the thermal displacement, rewriting the plurality of thermal displacement data to this-time data;

using means corresponding to each of the machine positions to measure shift of the absolute position of said machine position before every processing;

reading the shift; and executing correction of the thermal displacement, including correction processing of said machine position from a subsequent machine operation.

22. A numerical control method for controlling a numerical control (NC) machine having an electrical power source for providing power to operate said numerical control machine, a tool means and a drive means for effecting the machining of a workpiece, a measuring means for measuring machine tool position, a memory means for storing data including at least previous time thermal displacement data, this time thermal displacement data and correction values, and a processing means, said processing means being operative by periodic processing to execute a processing program, comprising the steps of:

turning-on said electric power source;

storing a machine origin, a specific moving position, an allowable value of position errors, each of a plurality of thermal-displacement data, a plurality of sampling time data, and processing cycle time, in memory means;

thereupon, (i) collecting data defining an amount of generated heat of thermal displacement of said drive means, (ii) counting of a sampling time of thermal displacement, and (iii) measuring the machine position, comprising one of the machine origin, the workpiece reference position, and the workpiece-mounting reference-block position and (iv) bringing said correction values entirely to zero and storing a value of the measurement as an initial value;

executing adaptation processing in which the thermal-displacement sampling time of said drive means is changed, depending upon whether the thermal displacement is within a range of an allowable error within a processing cycle time;

after measurement of said machine position, comprising at least one of the machine origin, the workpiece reference position and the workpiece-mounting reference-block position, which is used as a reference position, initializing an automatic correction;

counting of the measurement sampling time of the machine position and the moving position;

upon counting to a stored measurement sampling time Tp, concurrently (i) executing adaptation processing of measurement sampling time of the machine position and the moving position, and (ii) executing computation processing of the displacement of the moving position;

executing the correction of the moving position such that the error and a first allowable error value per time are compared with each other, to decide whether or not the measurement and correction of the moving position are required;

if correction of moving position is required, executing prediction of displacement of the moving position (MmtTcf) on the basis of the following equation:

$MmtTcf = \{|(\text{previous time measurement}) - (\text{this time measurement})|/(Tp)P\} \cdot k\{Tc - (\text{processing running time until now})\}P$ where P is a power exponent representing heat generation with respect to heat emission; and where k is a machining constant;

comparing the prediction value of the displacement of the moving position and a second allowable value with each other;

executing no correction in the case where the prediction value does not exceed said second allowable value; and executing at least one of warning during the automatic operation, automatic judgment of whether interruption of the measurement is possible, and measurement and correction of the displacement of the moving position, on the basis of the results in which the prediction of the displacement of the moving position is executed.

23. The numerical control method as set forth in claim 22, further comprising:

using, as the moving-position measurement, any one or in combination of a reference-block three-fixed-point method, a constant deciding method due to actually measured data and a machine-outside measuring method;

judging processing continuation by an operator, after the machine halt is automatically executed on the basis of the prediction of the displacement of the moving position;

after correction of the thermal displacement, rewriting the plurality of thermal displacement data to this-time data;

operating the moving position or operating a correction value of the moving position by the constant deciding method, every processing, to correct the measured or operated moving position; and executing correction of the thermal displacement including prediction, warning, measurement, correction and the like of the displacement of the moving position.

24. A numerical control method according to claim 22, including the steps of:

counting up the sampling time of the thermal displacement;

concurrently executing adaptation processing which fluctuates the sampling time of the thermal displacement of said drive means, depending upon a fact that the thermal displacement of said drive means is within the range of the allowable error within the processing cycle time, and the comparative computation processing of the amount of generated heat;

processing the collection of the data of the amount of heat generated thermal displacement of said drive means, the counting of the thermal-displacement sampling time, and the adaptation processing of the sampling time of the thermal displacement of said drive means so as to be repeated until said electric power source is turned off, regardless the main processing;

executing the correction of the thermal displacement of said drive means such that the thermal-displacement error and the minimum movement setting unit are compared with each other to decide good or bad judgment of the processing;

interruption of the correction of the thermal displacement of said drive means, including promise items of breaks in the processing program of the processing locations and the processing groups during processing;

always executing the interruption of the correction of the thermal displacement at time other than the breaks or during running other than the automatic running; and executing correction of the thermal displacement, including processing of correction of the thermal displacement of said drive means.

25. A numerical control method according to claim 22, including the steps of:

storing a machine origin, a workpiece reference position, a workpiece-mounting reference block position, and a plurality of thermal displacement data, in memory means;

dividing an interior of the memory means so that input of a correction parameter can be executed with respect to the memory means in order to execute zero-point correction of measuring means;

measuring the machine position, comprising at least one of the machine origin, the workpiece reference position, and the workpiece-mounting reference-block position, when said electric power source is turned on;

bringing a correction value entirely to zero with a value of the measurement serving as an initial value;

counting up the measurement sampling time of the machine position and the moving position;

executing the displacement correction processing of said machine position and the correction processing of the displacement of the moving position, in parallel relation to each other;

performing measurement processing with said machine position having a priority;

executing the correction of the machine origin such that, in the case where the error is smaller than the error allowable value per time, no correction is made;

executing prediction of the displacement of the machine origin (MotTcf) on the basis of the following equation:

$MotTcf = \{|(\text{previous time measurement}) - (\text{this time measurement})|/(Tp)P\} \cdot k\{Tc - (\text{processing running time until now})\}P$ where P is a power exponent representing heat generation with respect to heat emission; and where k is a machining constant;

executing prediction of the displacement of the workpiece reference position (MwtTcf) on the basis of the following equation:

$$MwtTcf=\{|(\text{previous time measurement})-(\text{this time measurement})|/(Tp)P\}\cdot k\{Tc-(\text{processing running time until now})\}P$$

where P is a power exponent representing heat generation with respect to heat emission; and where k is a machining constant;

executing prediction of the workpiece-mounting reference-block position (MwbtTcf) on the basis of the following equation:

$$MwbtTcf=\{|(\text{previous time measurement})-(\text{this time measurement})|/(Tp)P\}\cdot k\{Tc-(\text{processing running time until now})\}P$$

executing at least one of warning during the automatic operation, automatic judgment on interruption of the measurement, and measurement and correction of the displacement of the moving position, on the basis of the results in which the prediction of the displacement of the moving position is executed.

26. The numerical control method as set forth in claim 25, further comprising:

judging processing continuation by an operator, after the machine halt is automatically executed on the basis of the results in which the prediction of the displacement of said machine position;

after correction of the thermal displacement, rewriting the plurality of thermal displacement data to this-time data;

using means corresponding to each of the machine positions to measure shift of the absolute position of said machine position before every processing;

reading the shift; and executing correction of the thermal displacement, including correction processing of said machine position from a subsequent machine operation.

27. A numerical control method according to claim 22, further including the steps of:

judging reprocessing after measurement and correction depending upon presence of a finish margin;

bringing the reprocessing to alarm processing after n times; and executing correction of the thermal displacement including processing in which position displacement is predicted, warned, measured and corrected.

28. A numerical control method for controlling a numerical control (NC) machine having an electrical power source for providing power to operate said numerical control machine, a tool means comprising a machine tool and a drive means for effecting the machining of a workpiece, a measuring means for measuring said machine tool position, a memory means for storing data including at least previous-time thermal displacement data and this-time thermal displacement data, and a processing means, said processing means being operative by periodic processing to execute a processing program, comprising the steps of:

turning on said electrical power source;

selecting a measurement reference position to serve as a workpiece reference position;

storing at least data of a machine origin and said workpiece reference position in said memory means;

executing zero-point correction of said measuring means;

measuring said workpiece reference position with said measuring means when said electric power source is turned on;

bringing correction values entirely to zero with a value of the measurement by said measuring means serving as an initial value;

measuring the shift of an absolute position of the workpiece reference position every processing cycle;

correcting for thermal displacement, comprising correction processing of the workpiece reference position, during possible interruptions of said program;

judging reprocessing after measurement and correction depending upon presence of a finish margin;

bringing the reprocessing to alarm processing after n times; and executing correction of the thermal displacement including processing in which position displacement is predicted, warned, measured and corrected.

29. A numerical control method for controlling a numerical control (NC) machine having an electrical power source for providing power to operate said numerical control machine, a tool means comprising a machine tool and a drive means for effecting the machining of a workpiece, a measuring means for measuring said machine tool position, a memory means for storing data including at least previous-time thermal displacement data and this-time thermal displacement data, and a processing means, said processing means being operative by periodic processing to execute a processing program, comprising the steps of:

turning on said electrical power source;

selecting a measurement reference position to serve as a workpiece reference position;

storing at least data of a machine origin and said workpiece reference position in said memory means;

executing zero-point correction of said measuring means;

measuring said workpiece reference position with said measuring means when said electric power source is turned on;

bringing correction values entirely to zero with a value of the measurement by said measuring means serving as an initial value;

measuring the shift of an absolute position of the workpiece reference position every processing cycle;

correcting for thermal displacement, comprising correction processing of the workpiece reference position, during possible interruptions of said program;

judging reprocessing after measurement and correction depending upon presence of a finish margin;

bringing the reprocessing to alarm processing after n times; and executing correction of the thermal displacement including processing in which position displacement is predicted, warned, measured and corrected.

* * * * *